United States Patent
Lee et al.

(10) Patent No.: US 12,370,564 B2
(45) Date of Patent: Jul. 29, 2025

(54) OUTDOOR SURFACE CLEANING APPARATUS WITH SPRAY MECHANISM

(71) Applicant: TECHTRONIC CORDLESS GP, Anderson, SC (US)

(72) Inventors: Wai Chung Lee, Kwai Chung (CN); Koon For Chung, Kwai Chung (CN); Weiwei An, Dongguan (CN); Wai For Wong, Kwai Chung (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 431 days.

(21) Appl. No.: 17/794,887

(22) PCT Filed: Jan. 21, 2021

(86) PCT No.: PCT/CN2021/073033
§ 371 (c)(1),
(2) Date: Jul. 22, 2022

(87) PCT Pub. No.: WO2021/151370
PCT Pub. Date: Aug. 5, 2021

(65) Prior Publication Data
US 2023/0053531 A1   Feb. 23, 2023

(30) Foreign Application Priority Data
Jan. 30, 2020   (HK) ............................ 22020002067.9

(51) Int. Cl.
*A46B 13/04*   (2006.01)
*A46B 5/00*   (2006.01)
(Continued)

(52) U.S. Cl.
CPC ............ *A46B 13/04* (2013.01); *A46B 5/0012* (2013.01); *A46B 5/0095* (2013.01);
(Continued)

(58) Field of Classification Search
CPC ..... A46B 13/04; A46B 13/001; A46B 5/0012; A46B 5/0095; B05B 7/2486;
(Continued)

(56) References Cited

U.S. PATENT DOCUMENTS

| 8,347,443 | B1 * | 1/2013 | Conrad | .................. | A46B 13/02 |
| | | | | | 15/24 |
| 2002/0066153 | A1 * | 6/2002 | Sclafani | ................ | A47L 7/0042 |
| | | | | | 134/21 |
| 2012/0189372 | A1 | 7/2012 | Burnett | | |

FOREIGN PATENT DOCUMENTS

| DE | 102018102964 A1 | 8/2019 |
| WO | WO2016008763 A2 | 1/2016 |

OTHER PUBLICATIONS

International Search Report for International Patent Application No. PCT/CN2021/073033; International Search Report; Apr. 9, 2021; (2 pages).

* cited by examiner

*Primary Examiner* — David J Walczak
(74) *Attorney, Agent, or Firm* — Dority & Manning, P.A.

(57) ABSTRACT

An outdoor cleaning device configured to clean outdoor surfaces using a variety of fluids and techniques. The outdoor cleaning device includes a brush head, a motor and a transmission for providing a driving force to the brush head, a fluid tank for storing a fluid (e.g., a cleaning solution or detergent), and a controller for controlling mixing (or not mixing) the fluid stored in the fluid tank during operation of the outdoor cleaning device. The controller may enable fluid from the cleaning tank to be mixed with a second fluid (e.g., water) prior to being dispensed via at least one nozzle. The at least one nozzle may be secured to a guard cover via grooves on an inner guard cover and an outer guard cover. The nozzle(s) enables the distribution of cleaning fluids in (Continued)

various directions, enhancing the brush head's cleaning capability.

20 Claims, 49 Drawing Sheets

(51) Int. Cl.
*A46B 13/00* (2006.01)
*A47L 11/08* (2006.01)
*A47L 13/22* (2006.01)
*B05B 7/24* (2006.01)
*B08B 1/12* (2024.01)
*B08B 1/16* (2024.01)
*B08B 1/32* (2024.01)
*B08B 3/02* (2006.01)
*E01H 1/05* (2006.01)

(52) U.S. Cl.
CPC .......... *A46B 13/001* (2013.01); *B05B 7/2443* (2013.01); *B05B 7/2486* (2013.01); *B08B 1/12* (2024.01); *B08B 1/165* (2024.01); *B08B 1/32* (2024.01); *B08B 3/024* (2013.01); *B08B 3/028* (2013.01); *E01H 1/056* (2013.01); *A47L 11/085* (2013.01); *A47L 13/22* (2013.01); *B08B 2203/0223* (2013.01); *H01M 2220/30* (2013.01)

(58) Field of Classification Search
CPC ....... B05B 7/2443; B08B 3/028; B08B 3/024; B08B 1/12; B08B 1/32; B08B 1/165; B08B 2203/0223; E01H 1/056; H01M 2220/30; A47L 13/20; A47L 13/22; A47L 13/23; A47L 11/08; A47L 11/085; A47L 11/26
USPC .......................... 401/137–139, 268, 270, 289
See application file for complete search history.

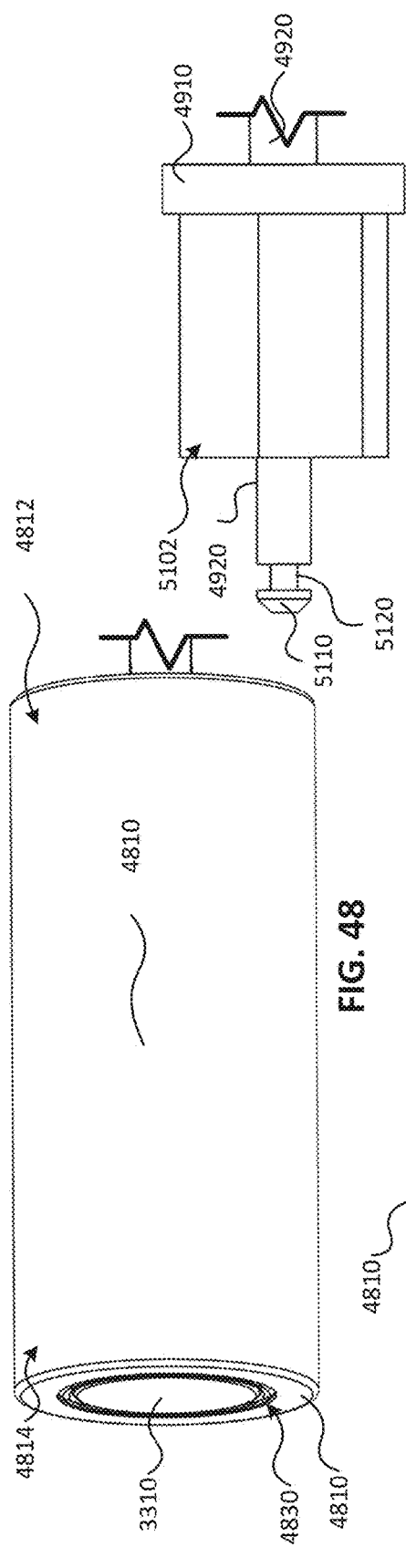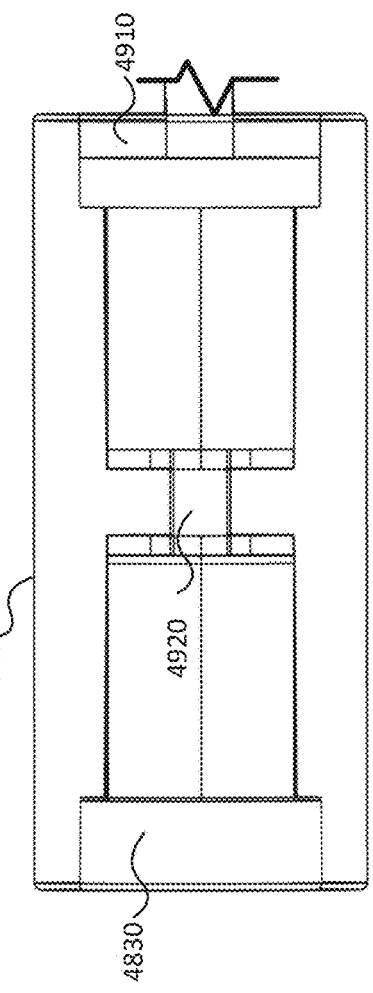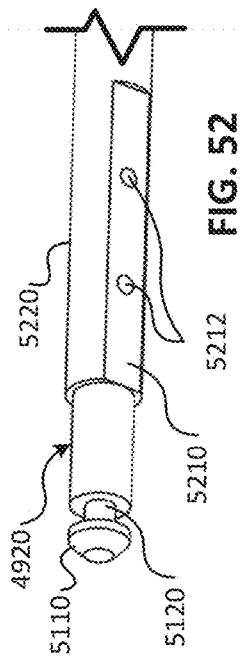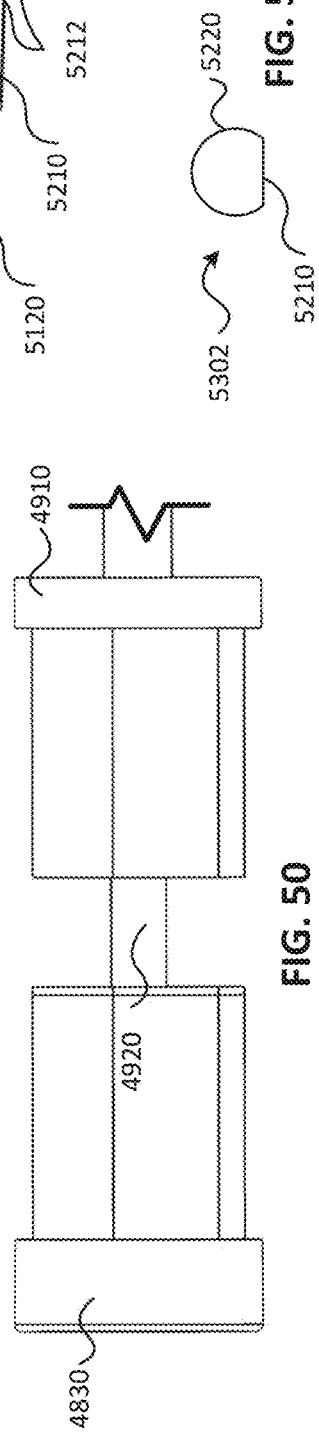

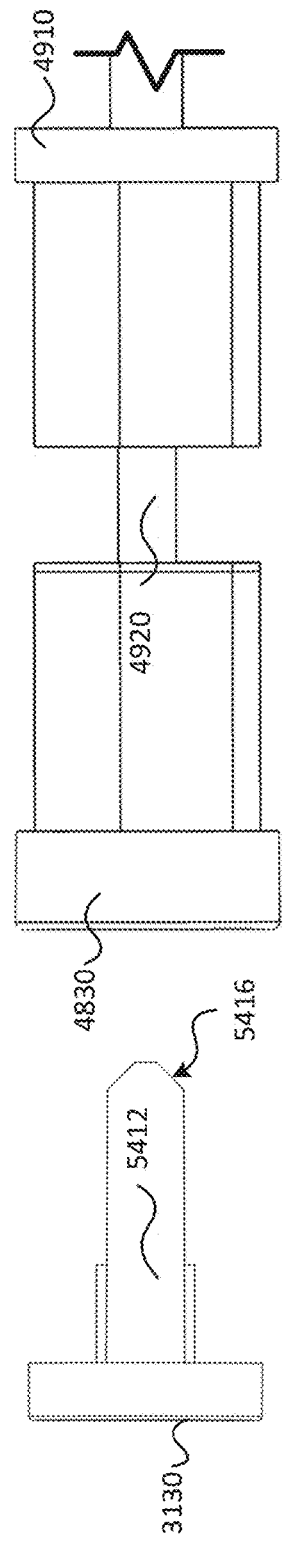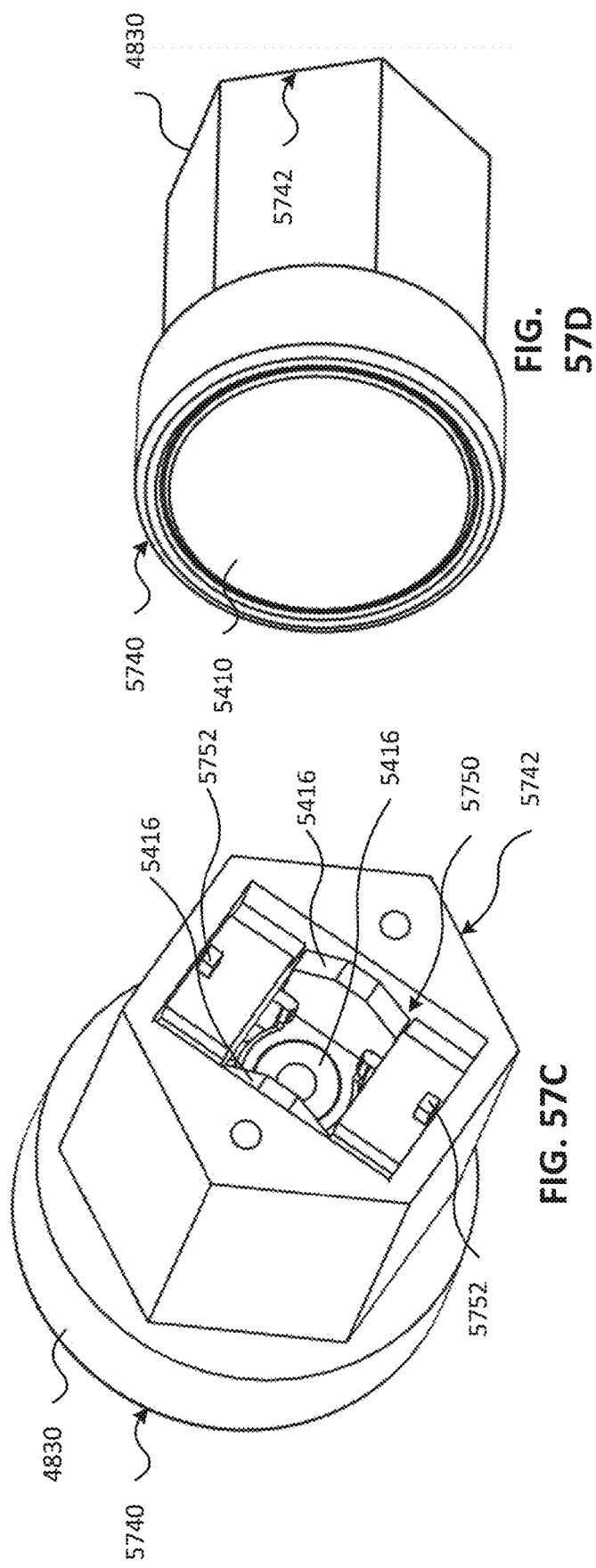

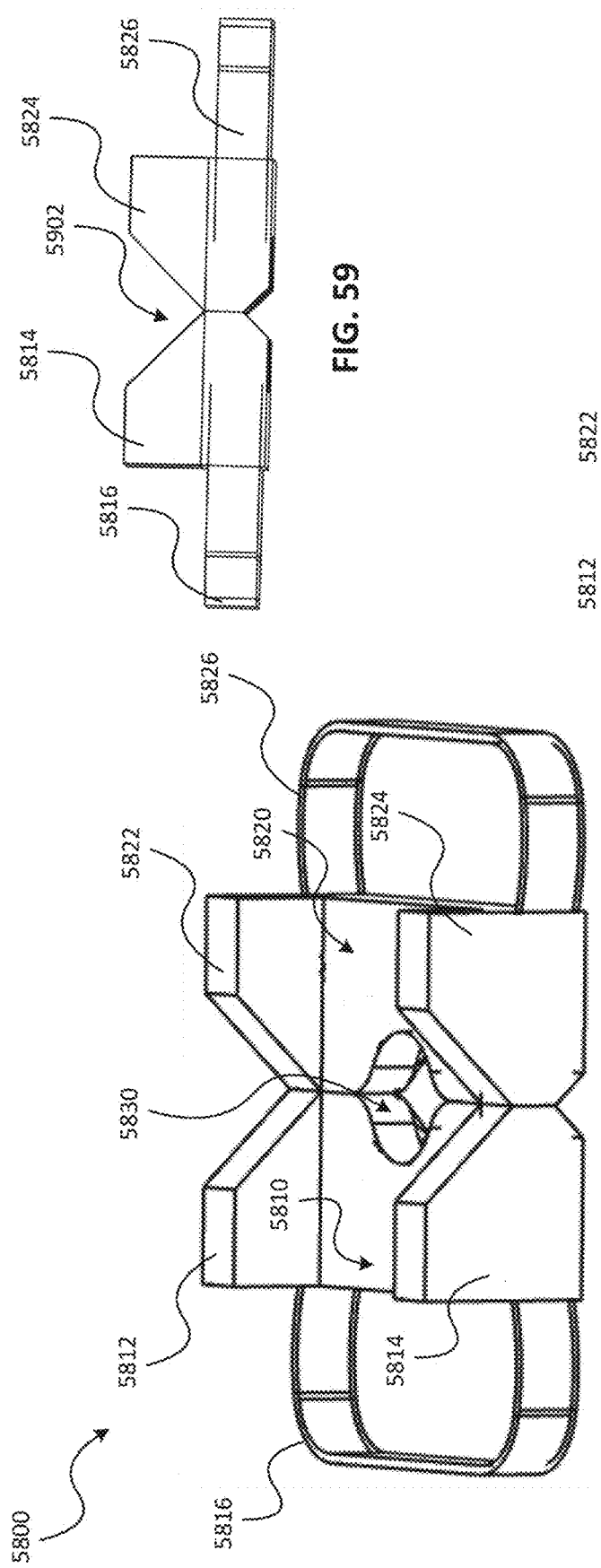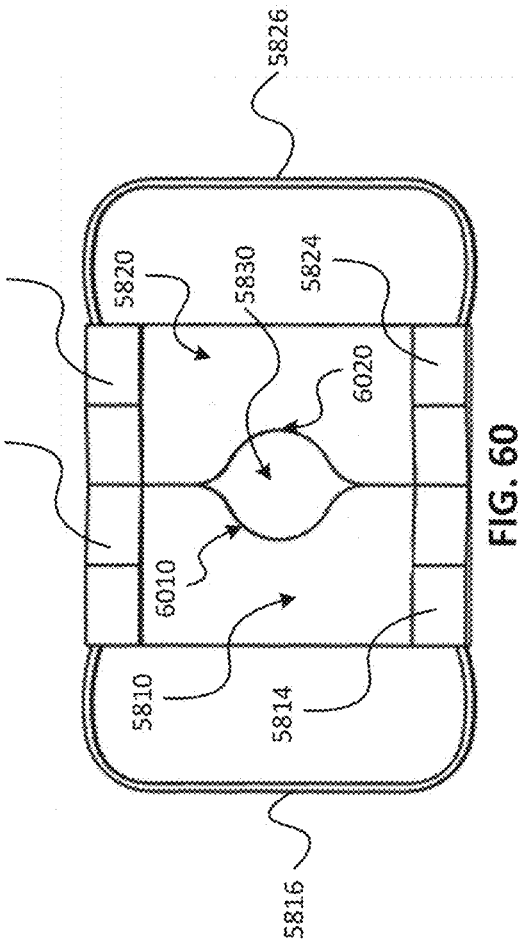

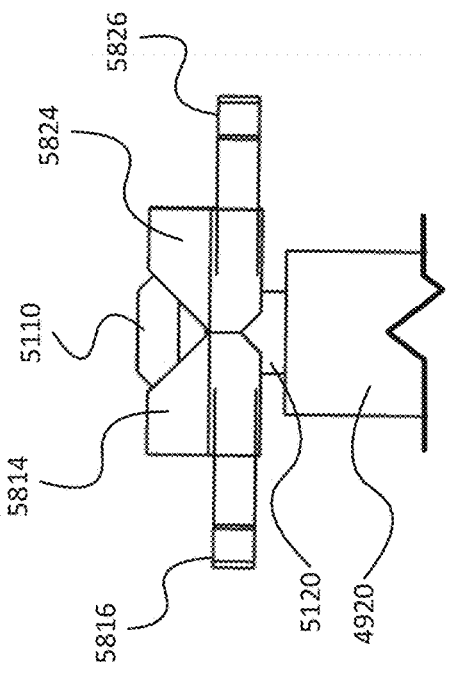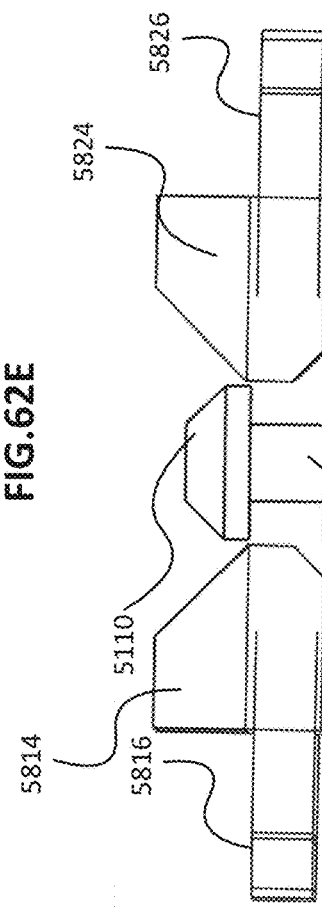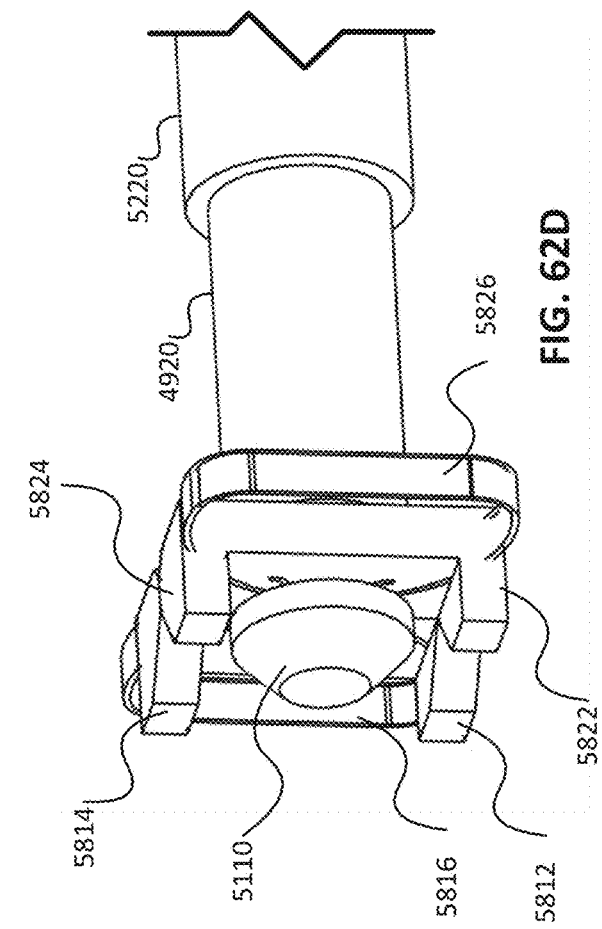

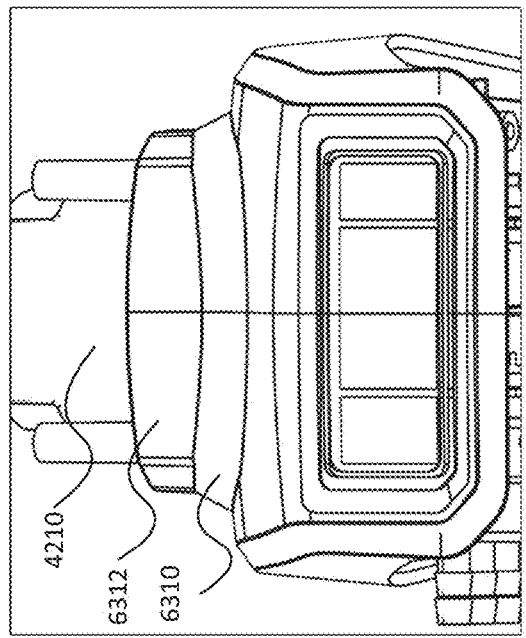
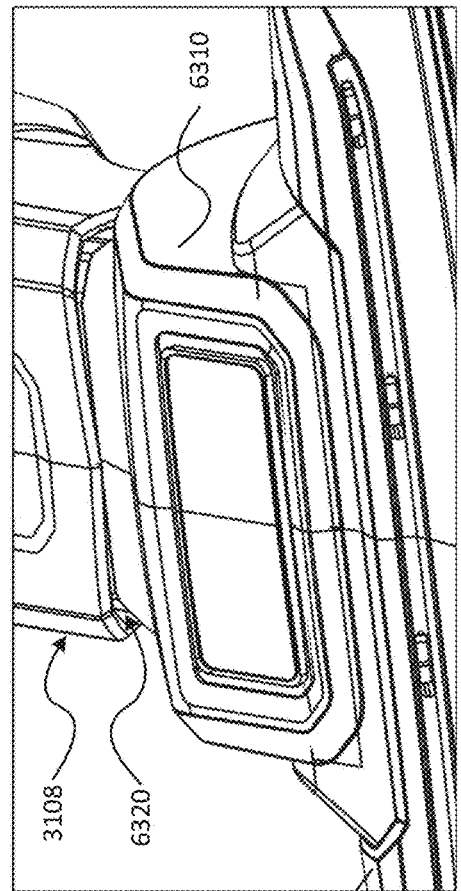
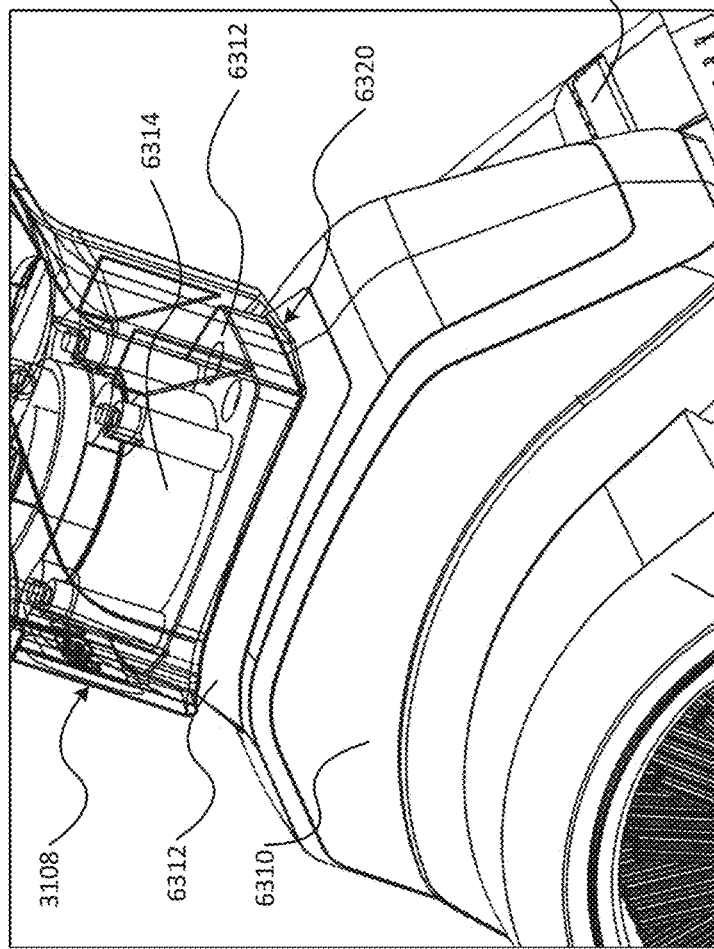
FIG. 63A
FIG. 63B
FIG. 63C

OUTDOOR SURFACE CLEANING APPARATUS WITH SPRAY MECHANISM

CROSS-REFERENCE TO RELATED APPLICATION

This application is a National Stage Patent Application of PCT/CN2021/073033, filed on Jan. 21, 2021, which claims the benefit of priority to Hong Kong patent application Ser. No. 22/020,0002067.9, filed on Jan. 30, 2020, the disclosures of all of which are incorporated by reference herein in their entireties.

TECHNICAL FIELD

The present disclosure generally relates to an outdoor surface cleaning apparatus. More particularly, the present disclosure relates to an outdoor cleaning device having a spray mechanism for discharging mixed fluids, such as water mixed with a cleaning solution.

BACKGROUND

Outdoor surface cleaning apparatuses are a specific class of outdoor products designed to treat outdoor surfaces, such as patio or paver surfaces and joints, which are more rugged and less delicate than indoor surfaces. These outdoor surfaces and joints can become soiled with stubborn dirt, weeds, and/or grease that are harder to remove than dirt on indoor surfaces.

Manually operated paver push brooms and electric pressure washers are examples of conventional outdoor surface cleaning apparatuses. A paver push broom generally includes a fixed brush with stiff bristles arranged at an end of a broom stick. Dirt on a surface can be removed by scrubbing the surface with the bristles, optionally with cleaning solution or powder manually applied to the outdoor surface prior to cleaning. A pressure washer, on the other hand, generally includes a nozzle that directs pressurized liquid to the surface to dislodge dirt and grease from the surface. These conventional outdoor surface cleaning apparatuses are usually dedicated outdoor apparatuses adapted specifically for only outdoor cleaning operations. These apparatuses are not readily convertible for different surface cleaning applications.

Some recently developed outdoor surface cleaning apparatuses include one or more brushing elements and water outlets. However, the water discharging mechanism typically discharges water unidirectionally to the front of the apparatus only. The power head (e.g., a motor) and the driving elements may not be sufficiently isolated so as to prevent contact with some of the water discharged during cleaning. As the power head and gearbox may not be waterproof, water may contact the power head and/or driving elements and cause damage to the power head or gearbox over time. Further, while conventional outdoor surface cleaning apparatuses can clean floors effectively, they may not be able to effectively clean the surface of walls, or the risers of stairs.

SUMMARY OF THE INVENTION

Provided herein is a surface cleaning apparatus having a spray mechanism adapted to spray different types of liquids. For example, the disclosed cleaning device may be configured to spray a mixture of different liquids, such as water mixed with a concentrated cleaning solution or water only.

The cleaning solution may be sprayed from the surface cleaning apparatus such that the cleaning solution is sprayed directly onto a surface to be cleaned by the surface cleaning apparatus, such as a patio or floor, rather than being sprayed on a portion of the cleaning apparatus (e.g., cleaning bristles, etc.). By providing the capability to spray mixed liquids, the surface cleaning apparatus may realize improved cleaning, which may include removal of more dirt or other undesired substances from the surface and/or faster removal of the dirt or other undesired substances. Moreover, the ability to spray only water may also provide additional capabilities, such as the ability operate the surface cleaning apparatus during a first cleaning cycle in which water mixed with a concentrated cleaner is utilized and then a second cleaning cycle may be performed in which only water is dispensed in order to remove excess cleaning solution that may remain on the surface after cleaning or for other reasons. Additionally, surface cleaning devices configured in accordance with aspects of the present disclosure may also be operated without dispensing any liquids (i.e., a dry mode of operation).

According to certain aspects, the surface cleaning apparatus may include a handle; a power head with a prime mover; an attachment head having a cleaning attachment; and a spray mechanism having a first fluid input, a second fluid input, and a cleaning fluid output. The spray mechanism may include a mixing assembly in fluid communication with the first fluid input, the second fluid input, and the cleaning solution output.

According to certain aspects, the cleaning solution output may include at least a brush nozzle and a side nozzle. The brush nozzle is configured to spray cleaning solution onto a surface in front of the cleaning attachment or directly onto the cleaning attachment; and the side nozzle is configured to spray cleaning solution onto the surface in front of the cleaning attachment or an adjacent surface.

According to certain aspects, the cleaning solution output comprises at least a discharging bar having holes arranged horizontally along a longitudinal length of the discharging bar so as to discharge the cleaning solution onto a surface to be cleaned by the cleaning attachment.

According to certain aspects, the first fluid input is a water inlet assembly and may include a hose dock and a control panel. The control panel may include a controller configured to control output of liquids during operation of the surface cleaning apparatus. For example, the controller may include lever, a switch, or a knob that is configurable (e.g., rotatable, slideable, etc.) for selecting between a waterless mode of operation, a water only mode of operation, or a diluted detergent mode of operation in which water mixed with a cleaning solution or detergent is dispensed.

According to certain aspects, the mixing assembly is positioned at the handle. In additional or alternative aspects, the mixing assembly may be positioned at a location other than the handle, such as on a housing attached to a longitudinal shaft, where the handle is located at a first end of the longitudinal shaft and the housing may be positioned at a location along the length of the longitudinal shaft.

According to certain aspects, the second fluid input further comprises a detergent dock configured for attaching a detergent bottle or a fluid tank. A detergent or concentrated cleaning solution may be stored in the detergent bottle of fluid tank.

According to certain aspects, the mixing assembly is positioned along a tube assembly, wherein the tube assembly is arranged between the handle and the power head. The mixing assembly may include an integrated tank arranged in-line with the tube assembly. A transparent window may be provided on a wall of the integrated tank with volume indicators, and a hinged cap and a stopper may be provided at top of the integrated tank or at side of the integrated tank so that the tank may be filled with a detergent or cleaning solution.

According to certain aspects, the mixing assembly further comprises a venturi tube having a contraction section, a diffusion section, and a throat section. The contraction section may be coupled to a first hose connecting to the first fluid input. The diffusion section is coupled to a second hose connecting to the cleaning fluid output, and the throat section is configured to draw detergent from the second fluid input using the venturi effect, thereby causing water flowing through the venturi tube to become mixed with the detergent to obtain a mixed fluid (e.g., diluted detergent or cleaning solution).

According to certain aspects, the second hose has an inner diameter in a range between 7 mm and 12 mm, and an outer diameter in a range between 10.5 mm and 16 mm.

According to certain aspects, the control panel may include valves and two outlet ports. The first outlet port may be coupled to a first inlet port of a Y-shape connector for transporting water, and the second outlet port may be coupled to a second inlet port of the Y-shape connector via the venturi tube and a check valve.

According to certain aspects, the cleaning attachment is at least partially covered by a guard arranged between a left lateral end portion and a right lateral end portion of the power head. The guard is attached to a rubber squeegee that is extended from a back side of the guard with an adjustable height for controlling a flow of cleaning solution on a surface.

According to certain aspects, the surface cleaning apparatus further comprises a rotary knob for adjusting a flow of cleaning solution.

According to certain aspects, the surface cleaning apparatus further comprises a side brush attachable to a side of the cleaning attachment that is perpendicular to an axis of rotation of the cleaning attachment, thereby allowing the side brush to clean a second surface in a lateral direction, such as a portion of a wall or stair perpendicular to the surface upon which the outdoor cleaning apparatus is resting upon.

According to certain aspects, the cleaning attachment may include a brush head and a circular side brush attachable to the brush head. The cleaning attachment may be coupled to the power head for transferring a torque such that the circular side brush allows brushing of a surface in a lateral direction, such as a portion of a wall or stair perpendicular to the surface upon which the outdoor cleaning apparatus is resting upon.

According to certain aspects, the cleaning attachment comprises a brush head and a dome-shaped brush attachable to the brush head, which is coupled to the power head for transferring a torque such that the dome-shaped brush allows brushing of a surface in a lateral direction, such as a portion of a wall or stair perpendicular to the surface upon which the outdoor cleaning apparatus is resting upon.

According to certain aspects, the dome-shaped brush further comprises an inner dome, a plurality of bristles arranged circumferentially around the inner dome, and a roller ball supported by a socket which is mounted on top of the inner dome.

According to certain aspects, the surface cleaning apparatus further comprises a rotatable joint, wherein the power head and the attachment head at a horizontal state are rotatable clockwisely by 90 degrees to a vertical state using the rotatable joint.

According to certain aspects, the brush head includes a removable side brush. The removable side brush may facilitate cleaning of a surface that would otherwise be difficult to clean, such as a stair.

In an aspect, a driving means may be provided. The driving means may include a motor for generating a driving force and a mechanism for transferring the driving force to the brush head. For example, the mechanism for transferring the driving force may include a gear chain or may include a gear an shaft. The gear chain or gear and shaft allows the driving means to be moved further from the brush head and to a position where the likelihood that the motor is damaged by fluid splashing is minimized.

In some aspects, a plurality of nozzles are provided to spray fluid onto a surface to be cleaned. The plurality of nozzles may be positioned on a guard or cover that at least partially surrounds the brush head. The guard may be a multi-part guard formed from an inner cover and an outer cover. The inner cover may have a plurality of grooves that may form fluid channels when covered by the outer cover. The fluid channels may be used to transport fluids to the plurality of nozzles where the fluids are sprayed onto the surface to be cleaned.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other aspects and advantages of the present invention are disclosed as illustrated by the embodiments hereinafter.

BRIEF DESCRIPTION OF THE DRAWINGS

The appended drawings contain figures to further illustrate and clarify the above and other aspects, advantages, and features of the present disclosure. It will be appreciated that these drawings depict only certain embodiments of the present disclosure and are not intended to limit its scope. It will also be appreciated that these drawings are illustrated for simplicity and clarity and have not necessarily been depicted to scale. The present disclosure will now be described and explained with additional specificity and detail through the use of the accompanying drawings in which:

FIG. 48 is a fragmentary perspective views illustrating aspects of a roller brush of an outdoor surface cleaning apparatus in accordance with aspects of the present disclosure;

FIG. 49 is a fragmentary perspective views illustrating aspects of a roller brush of an outdoor surface cleaning apparatus in accordance with aspects of the present disclosure;

FIG. 50 is a fragmentary perspective views illustrating aspects of a roller brush of an outdoor surface cleaning apparatus in accordance with aspects of the present disclosure;

FIG. 51 is a fragmentary perspective views illustrating aspects of a rotational locking mechanism and output shaft of an outdoor surface cleaning apparatus in accordance with certain embodiments of the present disclosure;

FIG. 52 is a fragmentary perspective views illustrating aspects of an output shaft of an outdoor surface cleaning apparatus in accordance with certain embodiments of the present disclosure;

FIG. 53 is a fragmentary perspective views illustrating a cross-section of portion of an output shaft of an outdoor surface cleaning apparatus in accordance with certain embodiments of the present disclosure;

FIGS. 57A-57D illustrate various fragmentary views of roller brush components of an outdoor surface cleaning apparatus in accordance with certain embodiments of the present disclosure;

FIG. 58 is a perspective view illustrating aspects of a clamp of an outdoor surface cleaning apparatus in accordance with certain embodiments of the present disclosure;

FIG. 59 is a side view illustrating aspects of a clamp of an outdoor surface cleaning apparatus in accordance with certain embodiments of the present disclosure;

FIG. 60 is a top view illustrating aspects of a clamp of an outdoor surface cleaning apparatus in accordance with certain embodiments of the present disclosure;

FIGS. 62A-62G show images illustrating aspects of securing components to a roller brush of an outdoor surface cleaning apparatus in accordance with certain embodiments of the present disclosure;

FIGS. 63A-63C show fragmentary views illustrating a motor cover of an outdoor surface cleaning apparatus in accordance with aspects of the present disclosure;

Skilled artisans will appreciate that elements in the figures are illustrated for simplicity and clarity and have not necessarily been depicted to scale.

DETAILED DESCRIPTION OF THE INVENTION

The following detailed description is merely exemplary in nature and is not intended to limit the disclosure or its application and/or uses. It should be appreciated that a vast number of variations exist. The detailed description will enable those of ordinary skilled in the art to implement an exemplary embodiment of the present disclosure without undue experimentation, and it is understood that various changes or modifications may be made in the function and structure described in the exemplary embodiment without departing from the scope of the present disclosure as set forth in the appended claims.

Figures 1, 2:
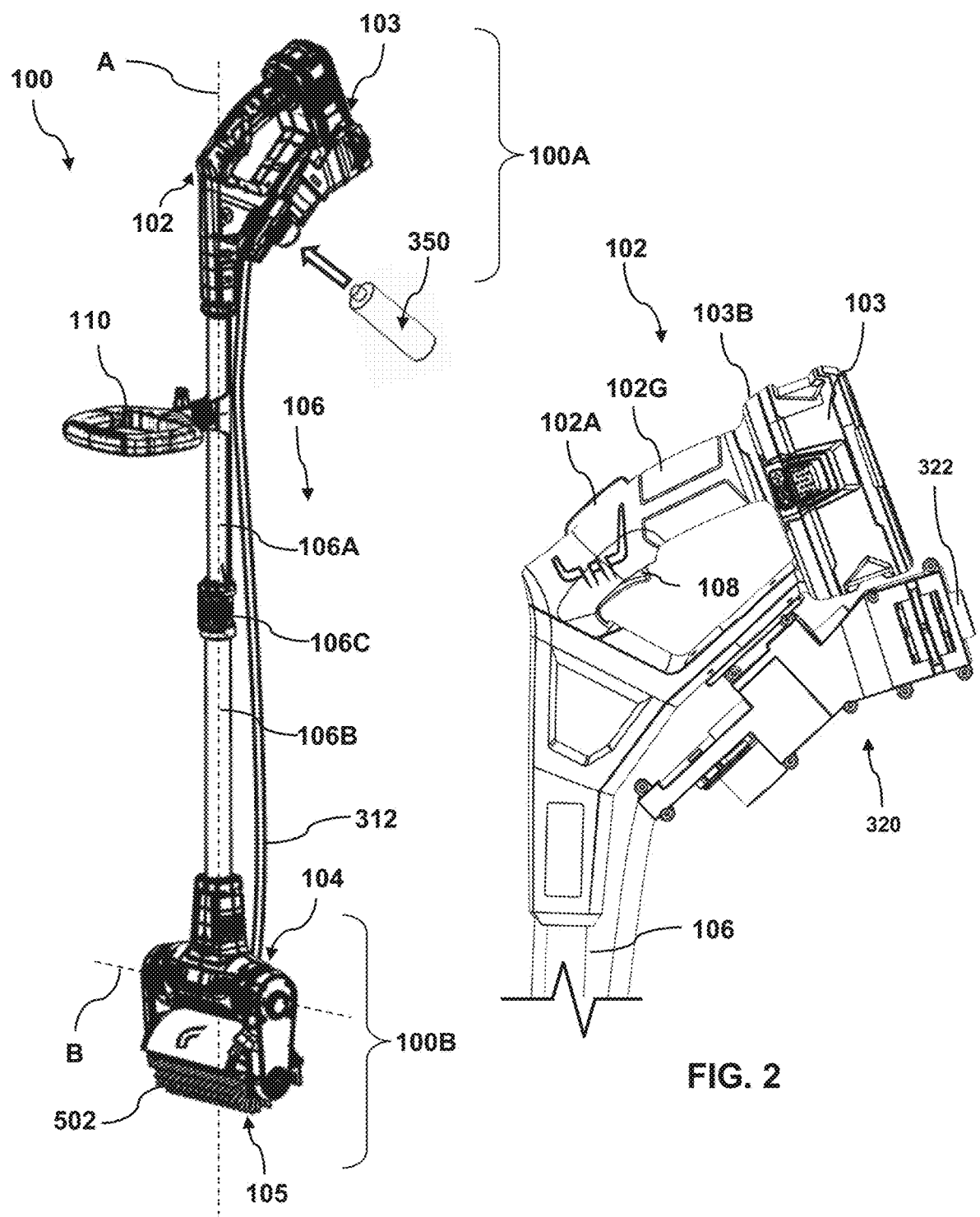
FIG. 1 is a perspective view of an outdoor surface cleaning apparatus in a first configuration in accordance with certain embodiments of the present disclosure.
FIG. 2 is a side view of the handle of the outdoor surface cleaning apparatus of FIG. 1.
Figure 3:
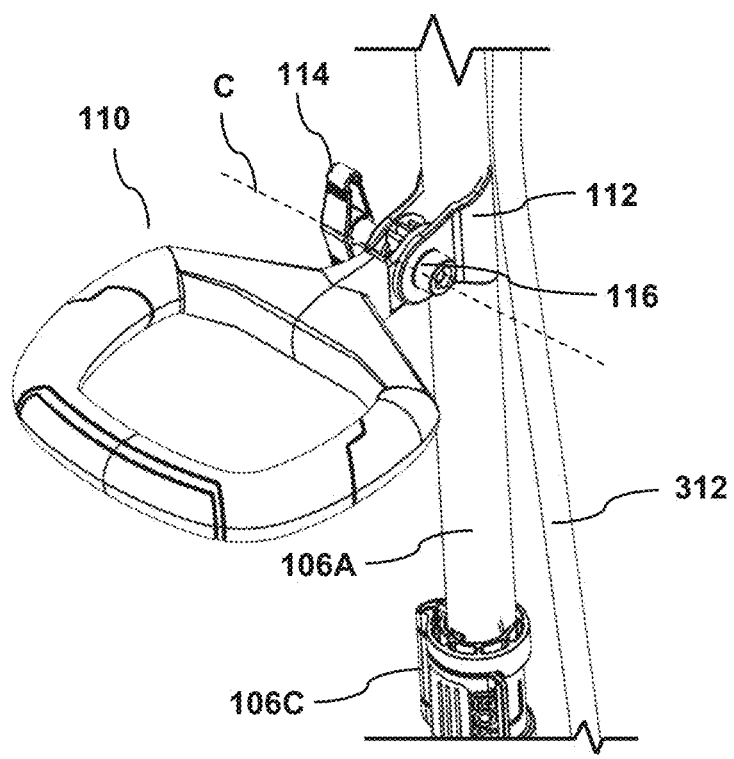
FIG. 3 is a perspective view of the auxiliary handle and the telescopic adjustment mechanism of the outdoor surface cleaning apparatus of FIG. 1.
Figure 14:
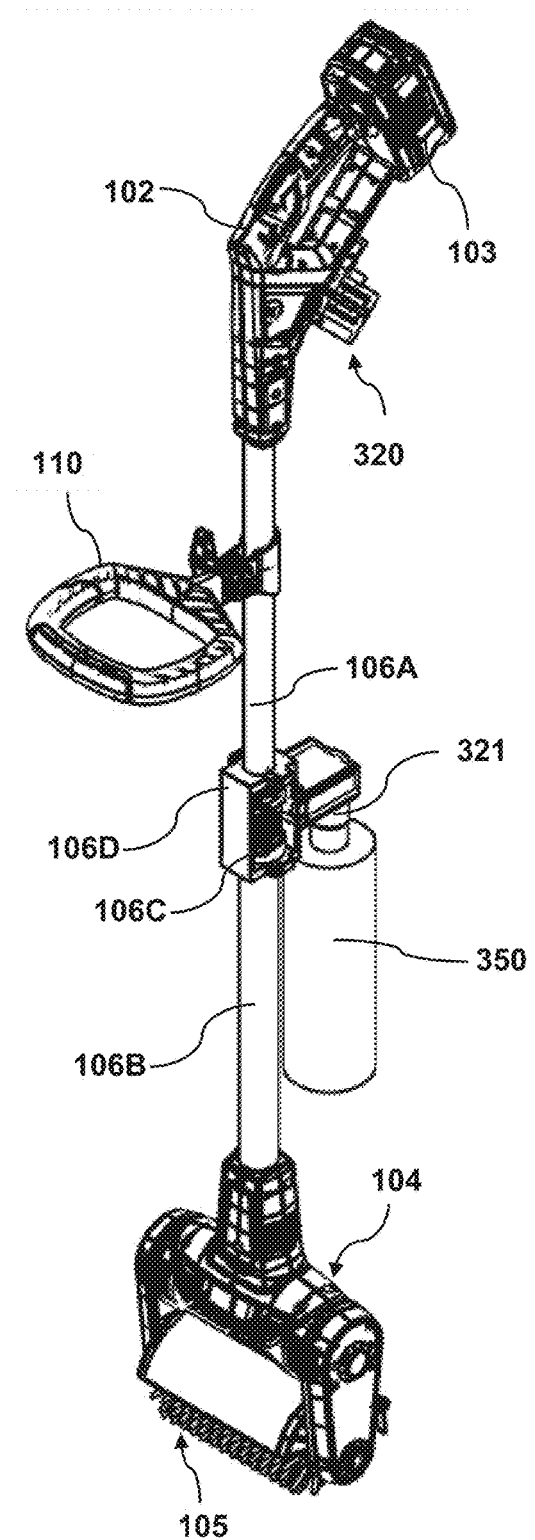
FIG. 14 is a perspective view of an outdoor surface cleaning apparatus in a second configuration with the mixing assembly positioned at the tube assembly in accordance with certain embodiments of the present disclosure.
Figure 24:
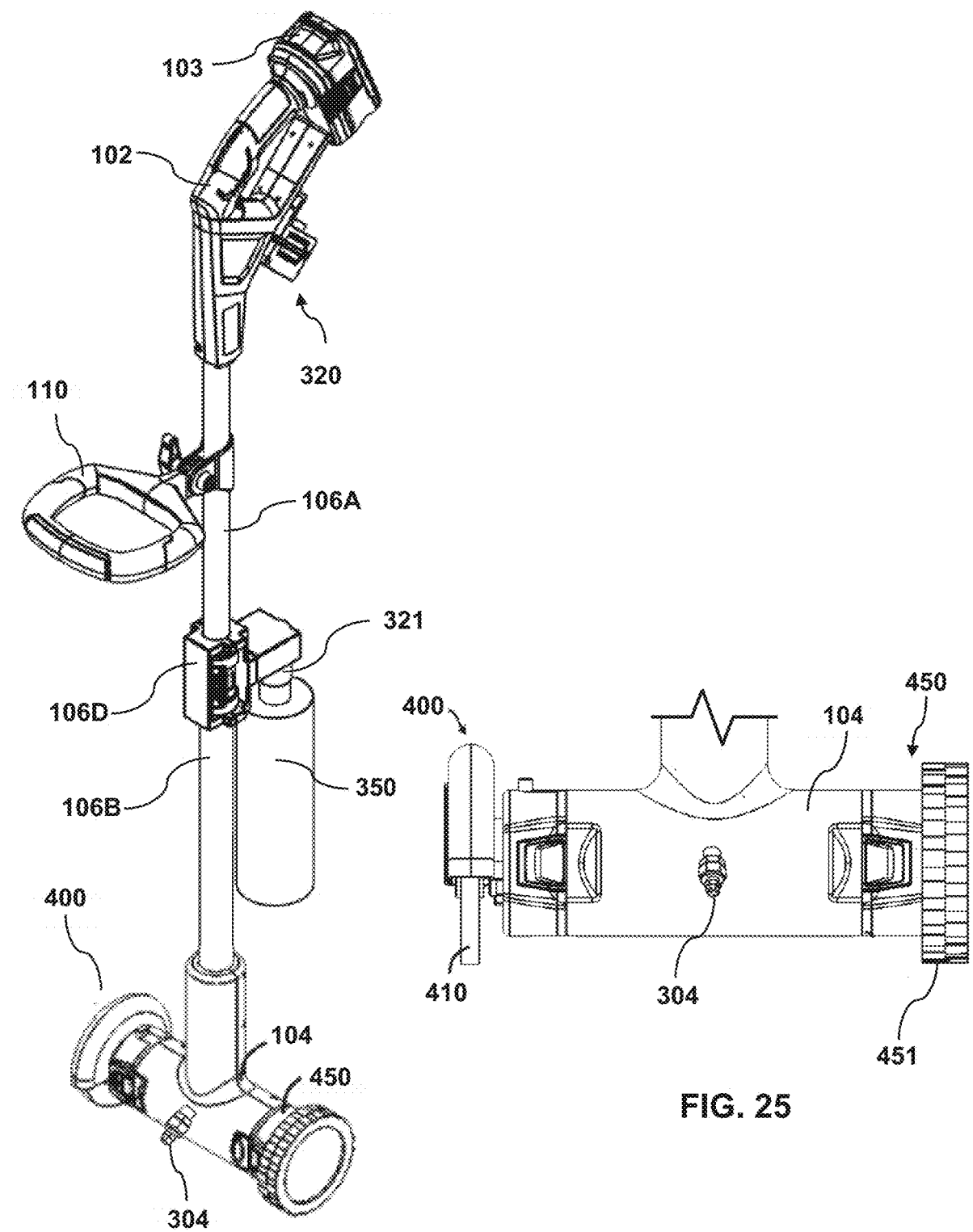
FIG. 24 is a perspective view of an outdoor surface cleaning apparatus in a third configuration with the mixing assembly positioned at the tube assembly in accordance with certain embodiments of the present disclosure.
Figure 27:
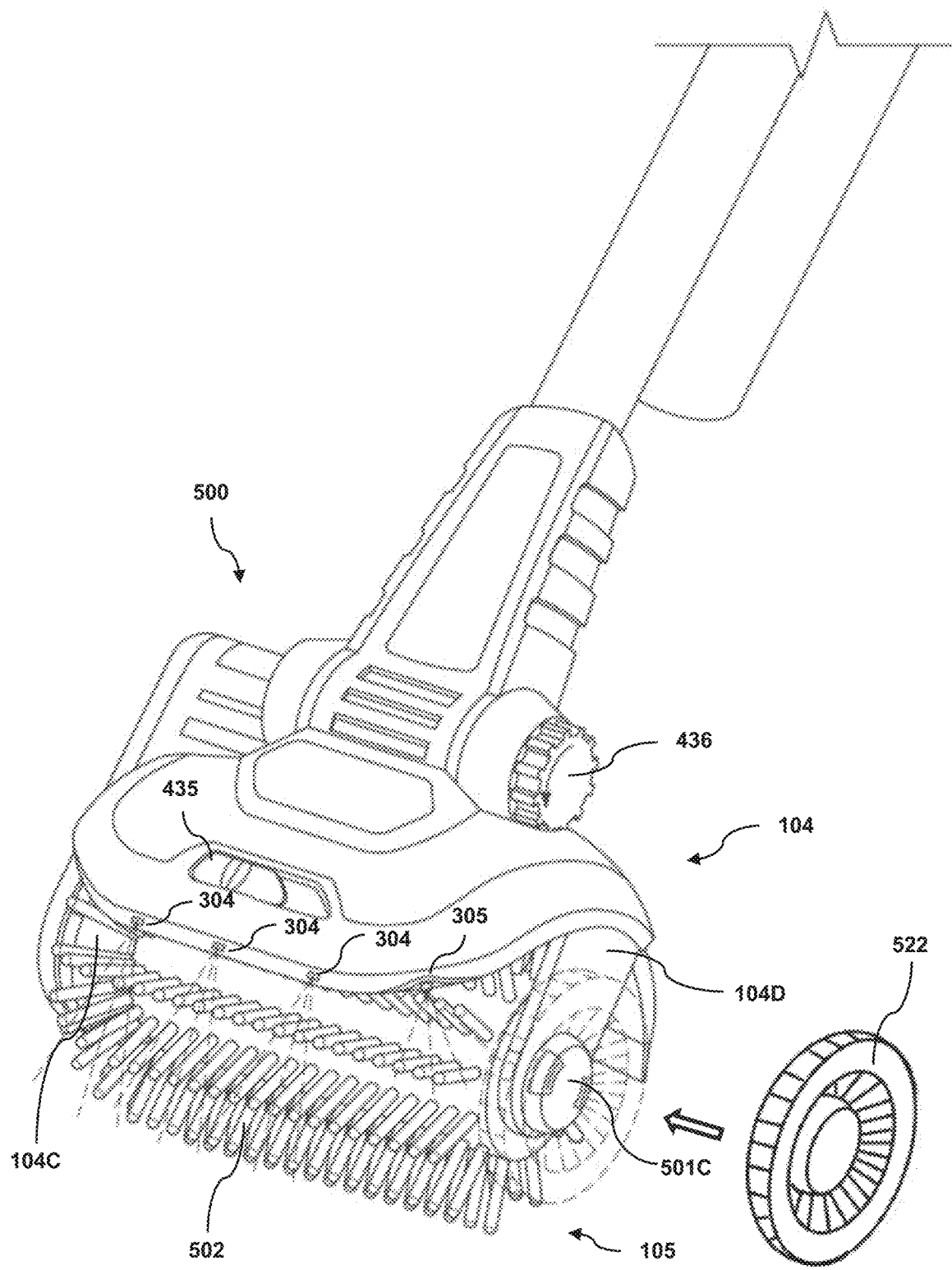
FIG. 27 is a perspective view of the front end showing a circular side brush attachable to an outdoor surface cleaning apparatus in a fourth configuration in accordance with certain embodiments of the present disclosure.

Referring to FIGS. 1 to 3, there is shown an outdoor surface cleaning apparatus 100 in a first configuration in accordance with certain embodiments. The apparatus 100 includes a handle 102 at the rear end 100A, and a power head 104 and an attachment head at the front end 100B. A tube assembly 106 is arranged between the handle 102 and the power head 104. The tube assembly 106 defines a longitudinal axis A along which the apparatus 100 generally extends. In certain embodiments, the tube assembly 106 is an elongated tube assembly formed by an inner tube 106A and an outer tube 106B in slidable arrangement, with a clamp 106C therebetween for locking the inner and outer tubes 106A, 106B with respect to each other. In other words, the tube assembly 106 is a telescopic tube assembly, the length of which can be adjusted to suit the height of different users. In the first configuration, a first fluid input and a second fluid input are positioned at the handle 102 for receiving water and detergent respectively. The apparatus 100 comprises an attachment head having a brush head 105 as a cleaning attachment. In a second configuration as shown in FIG. 14, the apparatus 100 may comprise a first fluid input positioned at the handle 102 for receiving water and a second fluid input positioned along the tube assembly 106 for receiving detergent. The third configuration as shown in FIG. 24 is similar to the second configuration, but the apparatus 100 comprises an attachment head having a disc brush assembly 400 as a cleaning attachment. In a fourth configuration as shown in FIG. 27, a circular side brush 522 or a dome-shaped brush 523 is attachable to the apparatus 100.

In certain embodiments, the power head 104 includes a long axis B that extends generally horizontally and perpendicular to the longitudinal axis A of the tube assembly 106. The power head 104 includes a motor and a gear transmission. The motor is arranged with a shaft oriented generally horizontally along the long axis B. In certain embodiments, the attachment head has a brush head 105, comprising roller brush 502, as a cleaning attachment. The brush head 105 may be arranged below the power head 104 and the roller brush 502 is driven to rotate by the power head 104. In some examples, the roller brush 502 may advantageously include bristles arranged in different patterns, with different lengths, diameters, materials, and/or hardness, for example, alternatively along one or both of the circumferential surface or the long axis of the roller brush 502, to provide an improved cleaning effect.

As shown in FIG. 2, the handle 102 includes a hand grip portion 102G that extends generally rearwardly with respect to the tube assembly 106 and the power head 104. The hand grip portion 102G includes a trigger 108 and a speed control switch 102A. In certain embodiments, the handle 102 further comprises a forward-reverse button to switch the rotation direction of the roller brush 502. The base part of the hand grip portion 102G, i.e., the rear-most end of the handle 102, may include a base 103B with a battery receptacle for receiving a battery 103. The battery 103 may be a single battery, a battery pack, or other form factors. The battery 103 is installed above the hose socket 322 of the water inlet assembly 320, which can minimize the risk of water logging of battery by cleaning solution. The term "cleaning solution," as used herein, may include water, detergent, diluted detergent, alcohol, and other cleaning solvents. Electrical connections are arranged inside the handle 102, the tube assembly 106, and the power head 104, for electrically connecting the battery 103 with the motor in the power head 104. The apparatus 100 is preferably a cordless DC electric apparatus but it may alternatively be a corded AC electric apparatus or a hybrid AC-DC electric apparatus. The apparatus 100 can be operated with any number of battery packs 103. In one example, the apparatus 100 is operated with an 18V lithium-based battery pack. The base part defines a plane that is generally angled with respect to a vertical plane. Actuating the trigger 108 in the handle 102 activates the motor in the power head 104 and hence the brush head 105 is driven to rotate. The speed control switch 102A can adjust the rotational speed of the roller brush 502, and may reverse the direction of rotation of the roller brush 502 using the same switch or alternatively with a separate control switch.

As shown in FIG. 3, an auxiliary handle 110 is mounted to the tube assembly 106 at a position between the clamp 106C and the handle 102. In certain embodiments, the position of the auxiliary handle 110 may be adjustable along the tube assembly 106 or otherwise fixed thereon. The auxiliary handle 110 is mounted to the tube assembly 106 using a U-shaped coupler 112 that surrounds the tube 106A and defines a mouth for receiving a coupling part of the auxiliary handle 110. The U-shaped coupler 112 and the coupling part of the auxiliary handle 110 include correspondingly aligned through-openings through which a knob 114 extends. A nut 116 is used to tighten the mouth of the U-shaped coupler 112 to clamp onto and secure the auxiliary handle 110. The auxiliary handle 110 is rotatable with respect to the tube assembly 106 about a rotation axis C (defined by the knob 114) substantially transverse to the longitudinal axis A of the tube assembly 106.

Figure 4:
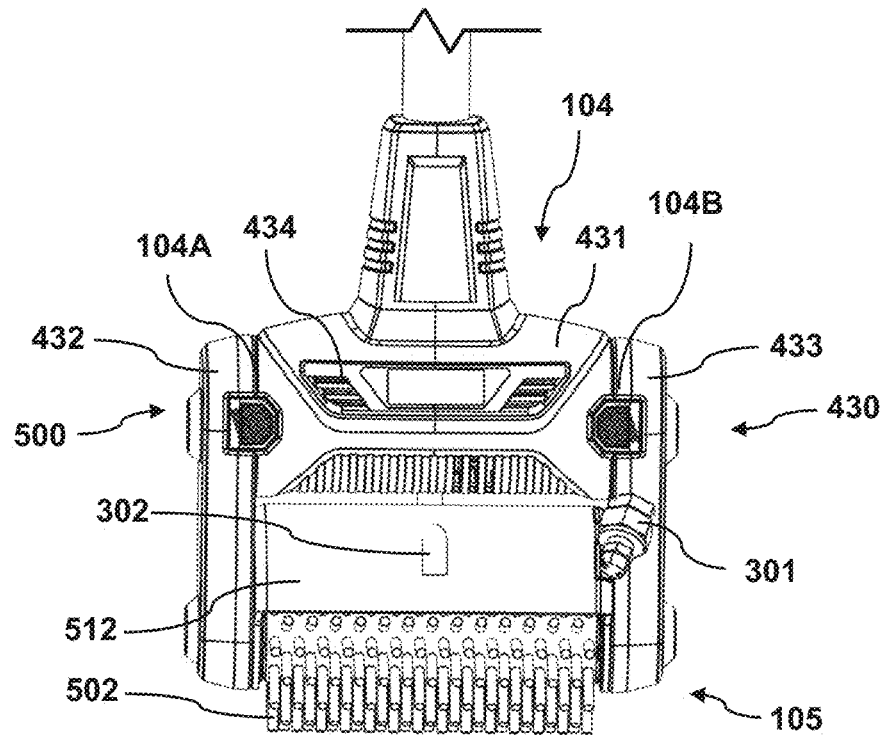
FIG. 4 is a front view of the front end of the outdoor surface cleaning apparatus of FIG. 1.

FIG. 4 shows the front end 100B of the apparatus 100 of FIG. 1. The power head 104 includes two lateral end portions 104A, 104B and each may be arranged to be coupled with an attachment head having a cleaning attachment directly or indirectly. In the first configuration, the attachment head may comprise a brush head 105 connected to the power head 104 indirectly through a transmission assembly 500. The transmission assembly 500 is arranged to transfer the torque from the power head 104 to the attachment head, wherein the attachment head is the brush head 105 as the cleaning attachment. One of the lateral end portions 104A, 104B allows for mechanical coupling between the drive assembly in the power head 104 and the transmission assembly 500, while the other lateral end portion 104A, 104B may be covered by a side cover 430. Each of the end portions 104A, 104B includes an engagement arrangement for releasably engaging with the corresponding engagement arrangement of the transmission assembly 500 or the side cover 430, which may be attached or detached thereto with or without using a tool. If the transmission assembly 500 is engaged to the right side of the power head 104, the shaft from the drive assembly is arranged to extend horizontally out from the left lateral end 104A, and the side cover 430 is engaged to the left side of the power head 104. In other words, the left lateral end portion 104A includes a coupling member arranged to couple with the corresponding coupling member of the transmission assembly 500. The drive assembly in the power head 104 is arranged to couple with the transmission assembly 500, and the lower part of the transmission assembly 500 is coupled to a first end of the brush head 105 for driving the roller brush 502 in the brush head 105.

As viewed from the front of the apparatus 100, the power head 104 may be covered by a housing 431 having a plurality of ventilation openings 434. The plurality of ventilation openings 434 are characterized in that water ingress is prevented and the air ventilation is guaranteed to avoid overheating of the power head 104. In particular, each of the plurality of ventilation openings 434 is a gap suitably arranged on the housing 431 for an air inlet that runs horizontally towards the center line of symmetry of the power head 104. In certain embodiments, the ventilation openings 434 are at least partially covered by covers or water shields.

Figure 5:
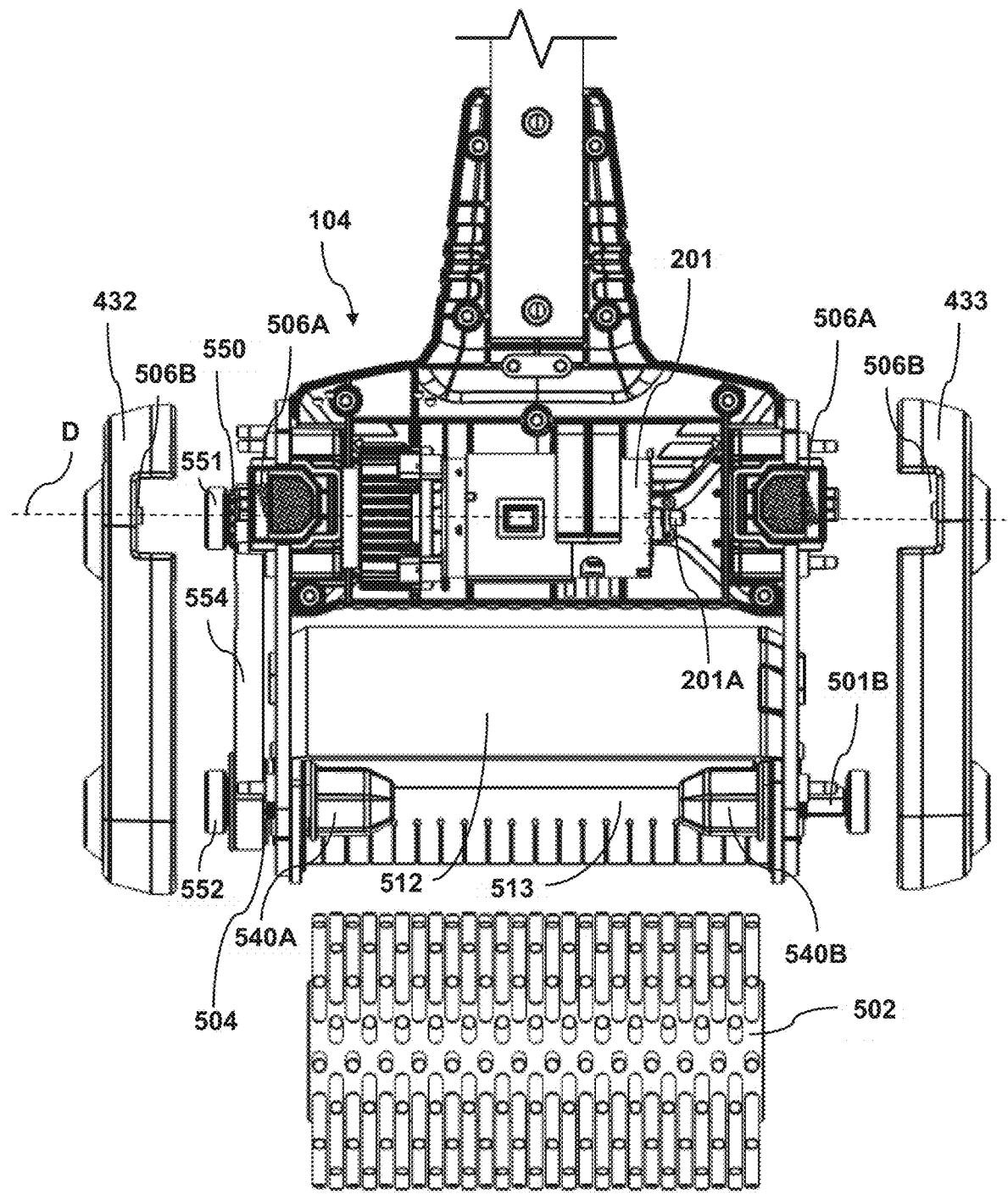
FIG. 5 is a front view of an internal construction of the front end (front of the housing removed) of the outdoor surface cleaning apparatus of FIG. 1 with the roller brush disassembled.

FIG. 5 shows the internal construction of the front end 100B of the apparatus 100. The drive assembly of the power head 104 may include any types of prime movers, preferably a motor 201, with gear transmission unit. The power head 104 includes coupling member for coupling with the corresponding coupling member on the transmission assembly 500. The drive assembly of the power head 104 can be oriented differently, e.g., with the motor shaft 201A extending at an angle to horizontal or even vertically. In certain embodiments, electrical connection between the drive assembly of the power head 104 and the transmission assembly 500 may also be established as the mechanical connection is established.

As viewed from the front of the apparatus 100 as shown in FIGS. 4 and 5, a first end cap 432 of the transmission assembly 500 is coupled to the left lateral end 104A of the power head 104 and a second end cap 433 of the side cover 430 is coupled to the right lateral end 104B of the power head 104. To connect the first end cap 432 of the transmission assembly 500 to the power head 104, the user simply aligns the corresponding engagement features 506A, 506B on the power head 104 and the first end cap 432 of the transmission assembly 500, and then moves the first end cap 432 or the power head 104 relatively towards each other along the movement axis D such that the engagement features 506A, 506B engage. In this embodiment, the movement axis D is generally horizontal. To disconnect the first end cap 432 of the transmission assembly 500 from the power head 104, the user simply disengages the engagement feature 506A on the power head 104 from the engagement feature 506B on the first end cap 432 of the transmission assembly 500, then moves the first end cap 432 of the transmission assembly 500 or the power head 104 relatively away from each other along the movement axis D. The same engagement features 506A, 506B are also provided in the second end cap 433 for connecting to the power head 104. The shape and form of engagement features 506A, 506B may vary, and the number of engagement features 506A, 506B can be any number, preferably less than four on each side.

Figure 6:
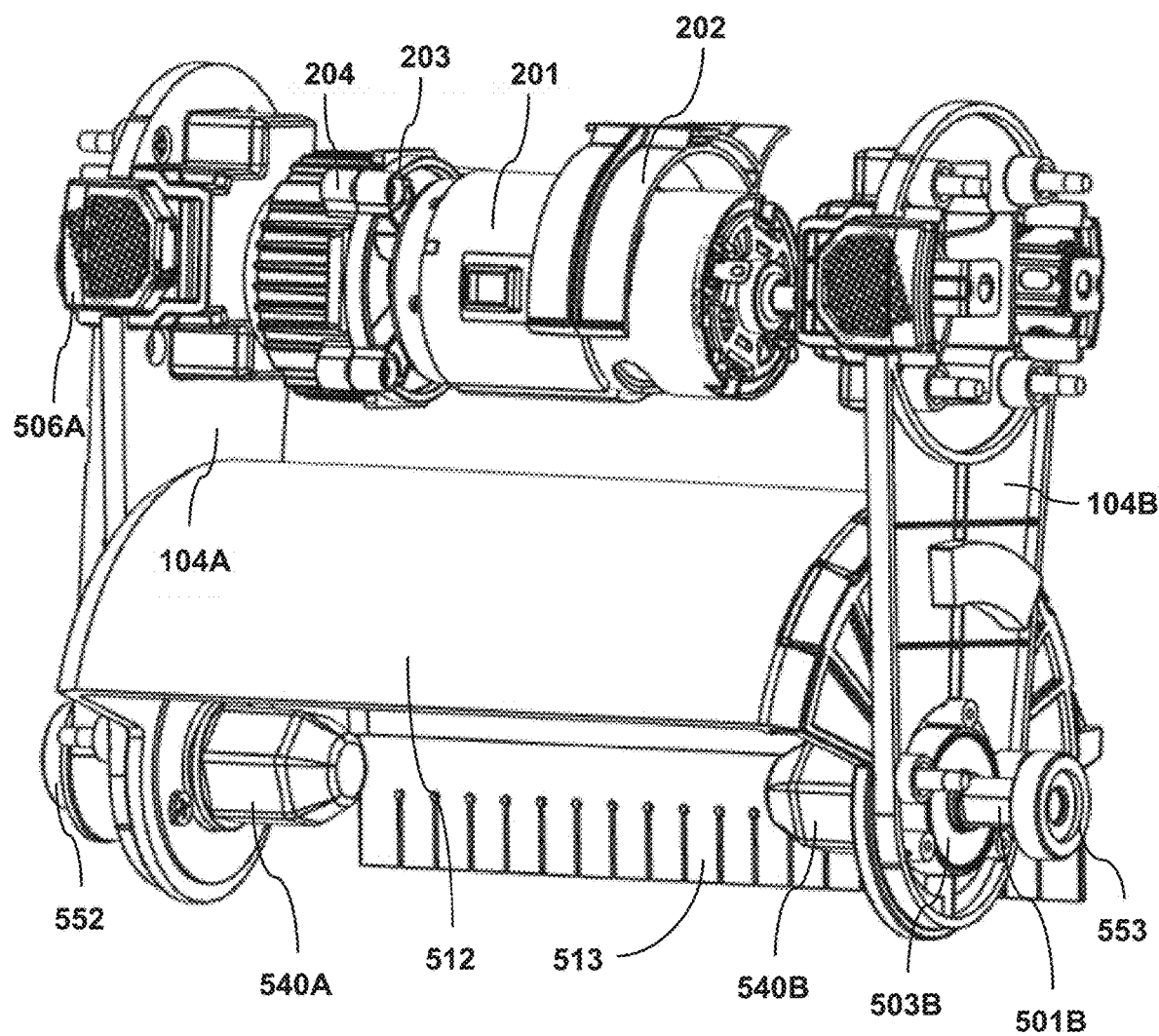
FIG. 6 is a perspective view of an internal construction of the front end (roller brush and housing removed) of the outdoor surface cleaning apparatus of FIG. 1.

As shown in FIG. 6, the left lateral end 104A and the right lateral end 104B may be extended down to the brush head 105 from the power head 104. A guard 512 is screwed between the left lateral end 104A and the right lateral end 104B at least partially covering the brush head 105. The shape and form of the guard 512 may vary but the guard 512 can generally be any type of cover that at least partly surrounds the brush head 105 to shield the power head 104 from materials that are dislodged from the surface by agitation of the brush head 105. Some embodiments also allow the guard 512 to be adjusted without having to use a tool. This arrangement further improves ease of use of the apparatus 100. The engagement and rotation mechanism for the guard 512 may provide a clicking sound (by material contact) to indicate movement of the guard 512. The guard 512 may include two roller shafts 540A, 540B, both extending generally parallel to the axis D and generally tapered towards the roller brush 502, to engage corresponding recesses 502R (shown in FIG. 7) in the roller brush 502. The roller brush 502 in this embodiment includes radially extending bristles. A rubber squeegee 513 is attached to and extended from the back side of the guard 512, which has an adjustable height for controlling the flow of cleaning solution on the floor surface. The roller shafts 540A, 540B are respectively mounted on a left drive shaft 501A and the right drive shaft 501B, which can rotate along an axis generally parallel to the axis D and extended along a through-opening on the left lateral end 104A and the right lateral end 104B. Nuts 552, 553 are used to respectively tighten the left drive shaft 501A and the right drive shaft 501B in position with respect to the left lateral end 104A and the right lateral end 104B using O-rings 503A, 503B.

Figure 7:
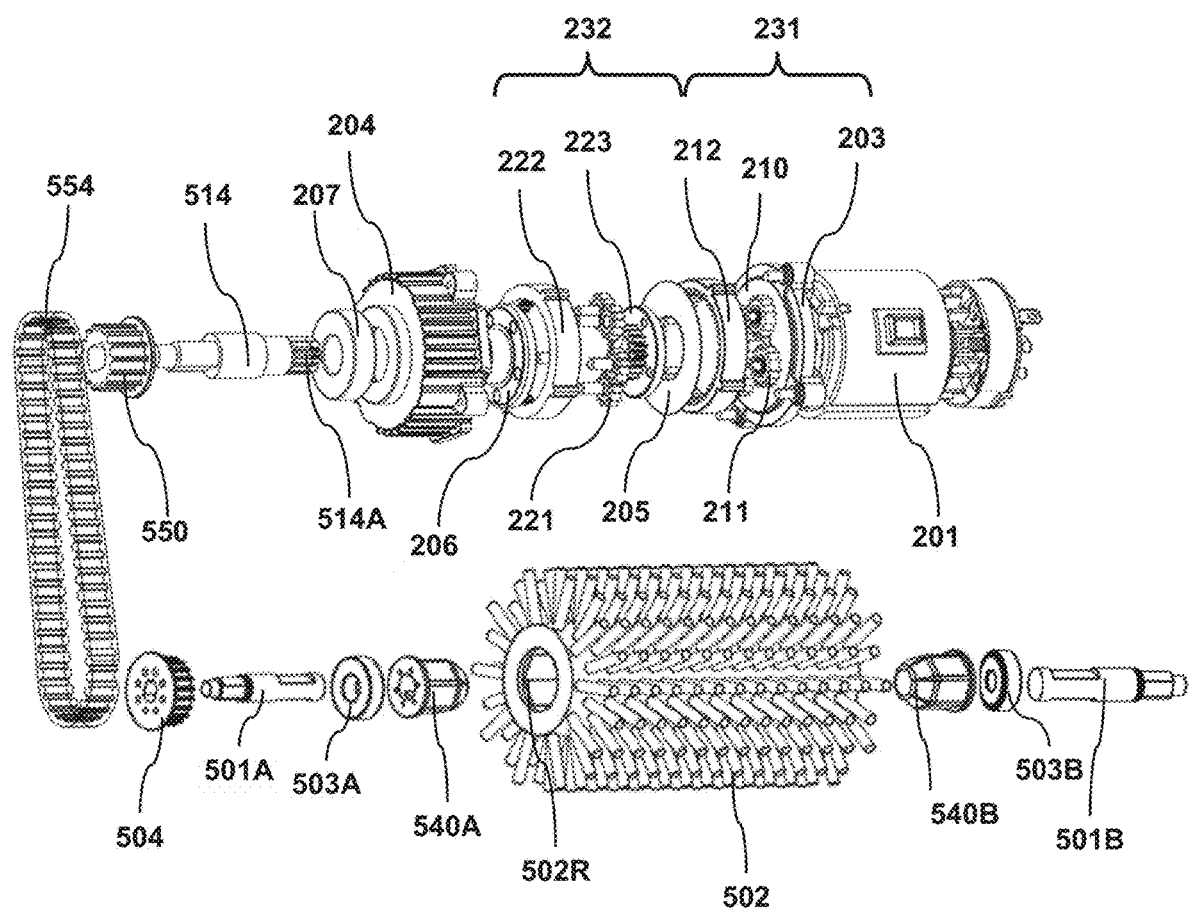
FIG. 7 is an exploded view showing the internal construction of the base part and the brushing part (with the belt from the transmission assembly included) of the outdoor surface cleaning apparatus of FIG. 1.
Figure 8:
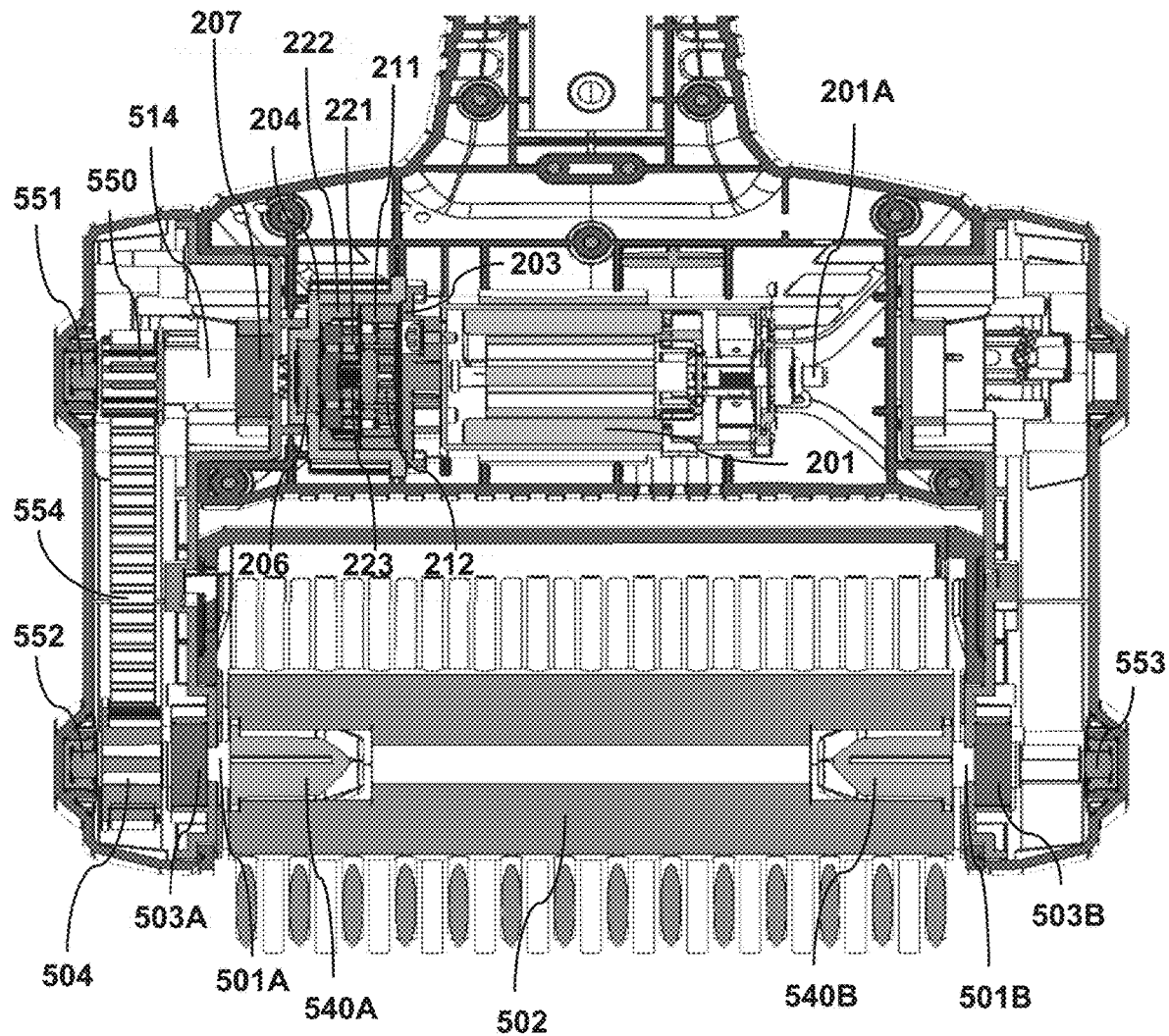
FIG. 8 is a cross-sectional front view of the front end of the outdoor surface cleaning apparatus of FIG. 1.

Certain embodiments of the internal structure of the power head 104 are shown in FIGS. 6-8. The motor 201 is fixed by a motor mount 202 and a motor housing 203 to secure the position of the motor 201 with respect to the housing 431 of the power head 104. The motor 201 may be an electric powered brushed motor and the motor shaft 201A is driven to rotate when the motor 201 is activated. The motor housing 203 has one side engaged with the motor 201, and another side engaged with a first planetary carrier 210. The gear transmission unit, comprising a plurality of gears provided within a gearbox housing 204, is driven by the motor shaft 201A of the motor 201. The plurality of gears is arranged to form a first layer of planetary gear 211 and a second layer of planetary gear 221. The first layer of planetary gear 211 is fixedly connected to the first planetary carrier 210, and engaged with the first ring gear 212 to form a first gear arrangement 231. The first gear arrangement 231 is driven by the motor 201, and drives the second gear arrangement 232. The second gear arrangement 232 comprises a second ring gear 222, the second layer of planetary gear 221, and a boss gear 223 being concentric with a washer 205 which is engaged with the first layer of planetary gear 211 of the first gear arrangement 231. The boss gear 223 drives the second layer of planetary gear 221, which is engaged with the second ring gear 222. A first bearing 206 is provided within the gearbox housing 204 and in contact with the second layer of planetary gear 221. A drive shaft 514 is fit into an O-ring 207 and is driven by the second gear arrangement 232 for driving the transmission assembly 500.

Figure 9:
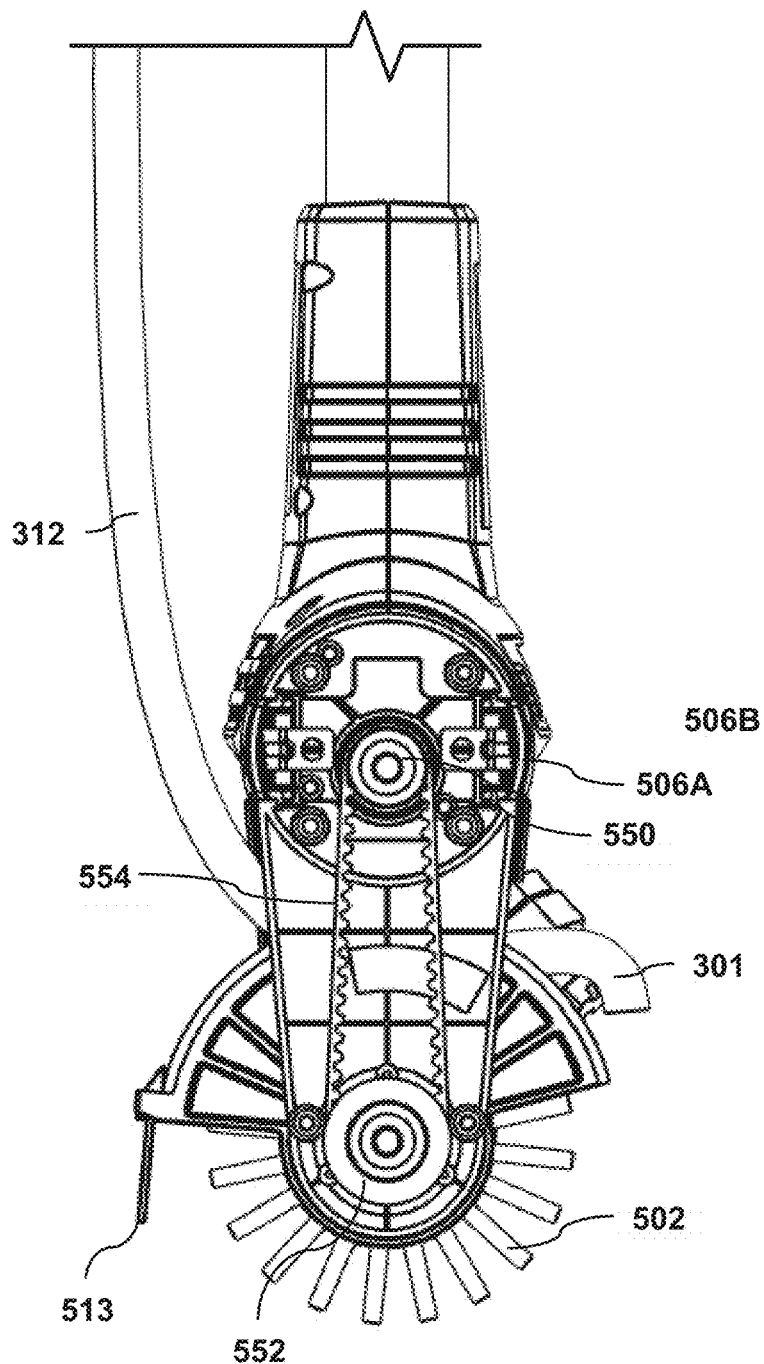
FIG. 9 is a side view of the front end of the outdoor surface cleaning apparatus of FIG. 1 showing the internal construction of the transmission assembly.
Figure 10:
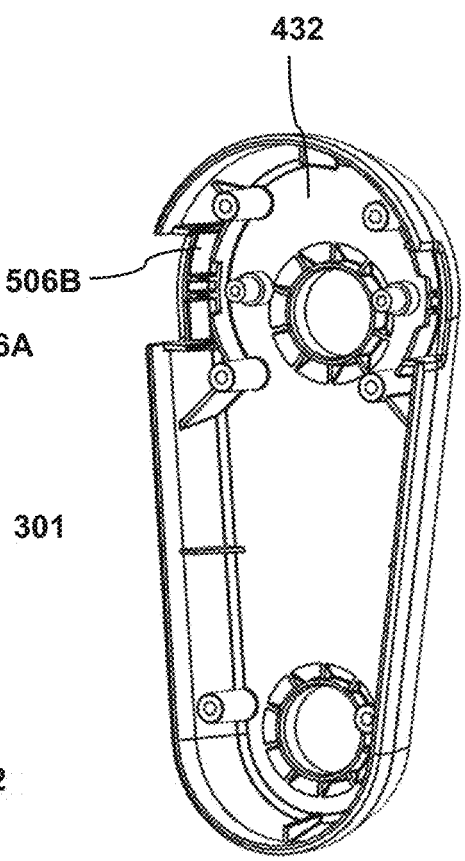
FIG. 10 is an end cap that can be assembled to cover the transmission assembly of FIG. 9.

As shown in FIGS. 7-9, the drive shaft 514 has one end comprising a spindle 514A arranged to couple with a corresponding gear in the second gear arrangement 232. The other end of the drive shaft 514 has one or more dents, which is fixedly coupled to an upper pulley 550 on an upper part of the transmission assembly 500. A nut 551 is used to secure the upper pulley 550 in position. A belt drive mechanism is arranged in the transmission assembly 500. The belt drive mechanism is formed by the upper pulley 550 connected at one end of the drive shaft 514, a corresponding lower pulley 504 at a lower part of the transmission assembly 500, and a belt 554 connecting the two pulleys 550, 504. The lower part of the transmission assembly 500 is mechanically coupled to a first end of the brush head 105. The lower pulley 504, being concentric with the roller brush 502, is arranged to rotationally drive the roller brush 502 at a speed determined by the speed of the motor 201 through the first gear arrangement 231 and the second gear arrangement 232. In certain embodiments, the belt 554 is a flat belt. The pulleys 550, 504 may each include axial ribs. The spindle 514A is arranged to allow transfer of torque from the second gear arrangement 232 to the drive shaft 514, and the drive shaft 514 is coupled to the upper pulley 550, hence the torque is transferred to the lower pulley 504 via the belt 554 to drive the roller brush 502 into rotation. FIG. 10 shows an end cap 432 that can be assembled to cover the transmission assembly 500. In this embodiment, the roller brush 502 is arranged to interact with the outdoor surface to be or being cleaned. The drive assembly in the power head 104 and the transmission assembly 500 are provided to rotate the roller brush 502 at a desired speed.

Figure 11:
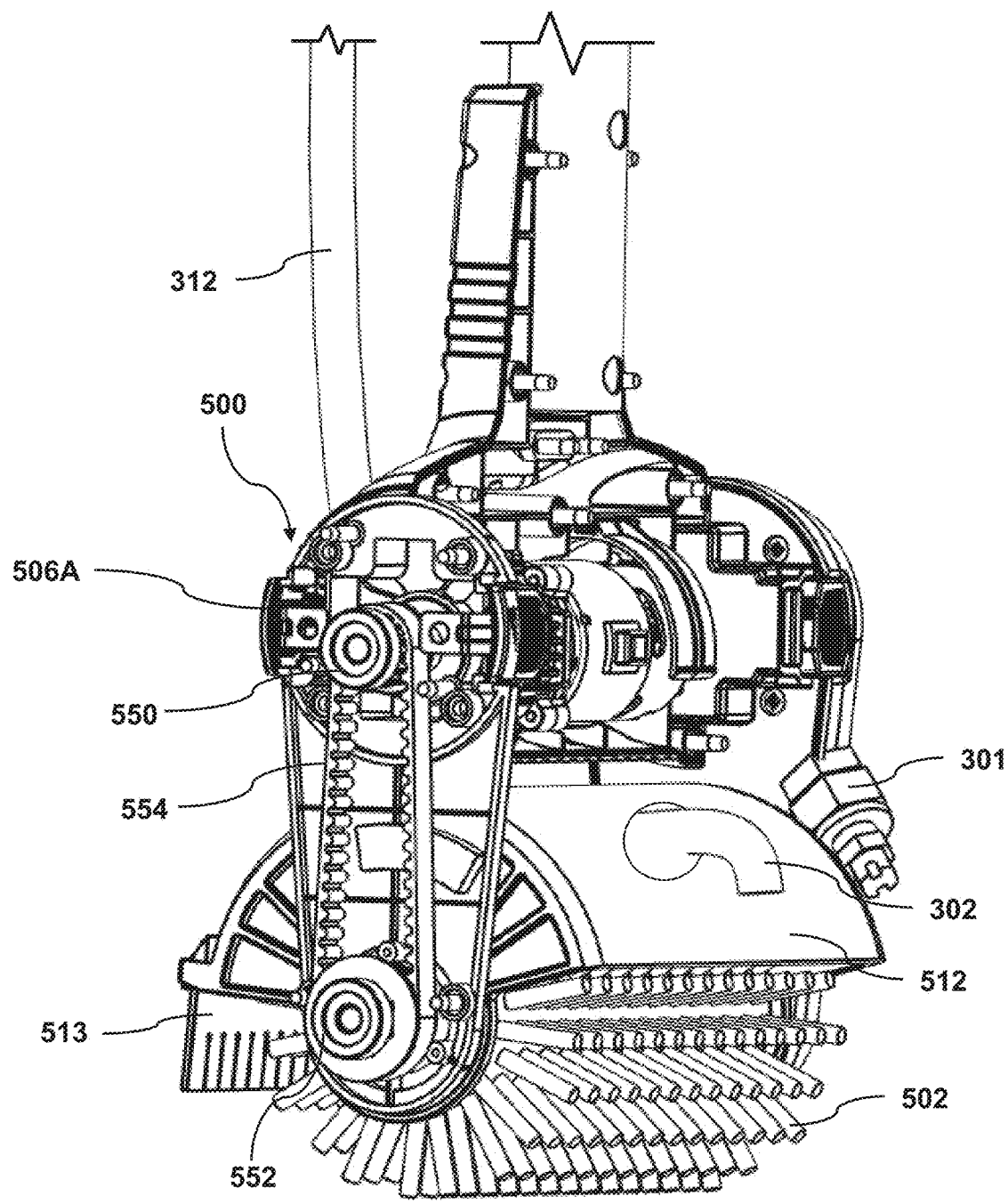
FIG. 11 is a perspective view of an internal construction of the front end (end cap and front of the housing removed) of the outdoor surface cleaning apparatus of FIG. 1.

In certain embodiments, the outdoor surface cleaning apparatus 100 can be used as a patio cleaner having a spray mechanism with a cleaning solution output at the front end 100B, which is capable of spraying cleaning solution for cleaning purposes. The cleaning solution output can be in fluid communication with a first fluid input for receiving water from an external water hose, such as a garden hose, and there is no built-in water tank. The cleaning solution output may also be in fluid communication with a second fluid input for receiving detergent. FIG. 11 shows a first configuration of the apparatus 100 illustrating how the cleaning solution is discharged. The hose 312 is an external tube for transporting cleaning solution, which is distributed to a side nozzle 301 and a brush nozzle 302. The hose 312 can have an inner diameter in a range between 5 mm and 15 mm, or in a range between 7 mm and 12 mm. The outer diameter of the hose 312 can be in a range between 9 mm and 18 mm, or in a range between 10.5 mm and 16 mm. In certain embodiments, the hose has an inner diameter of 7 mm and an outer diameter of 10.5 mm, the flow rate of water is 0.35 L/s, and the flow rate of diluted detergent (water and detergent mixed) is 0.14 L/s. The brush nozzle 302 is a sprayer, which may be positioned outside the shield 512 or alternatively within the shield 512 and above the cleaning attachment, such as the brush head 105. The brush nozzle 302 is configured to spray cleaning solution onto a surface in front of the cleaning attachment or directly to the cleaning attachment. The side nozzle 301 may not be firmly fixed on the front end 100B, and the angle of water jet from the side nozzle 301 may be adjustable. The side nozzle 301 is configured to spray cleaning solution onto a contact surface in front of the cleaning attachment, such as the brush head 105, or the adjacent surface such that cleaning solution can be discharged on the surface before the surface comes in contact with the cleaning attachment.

Figure 12:
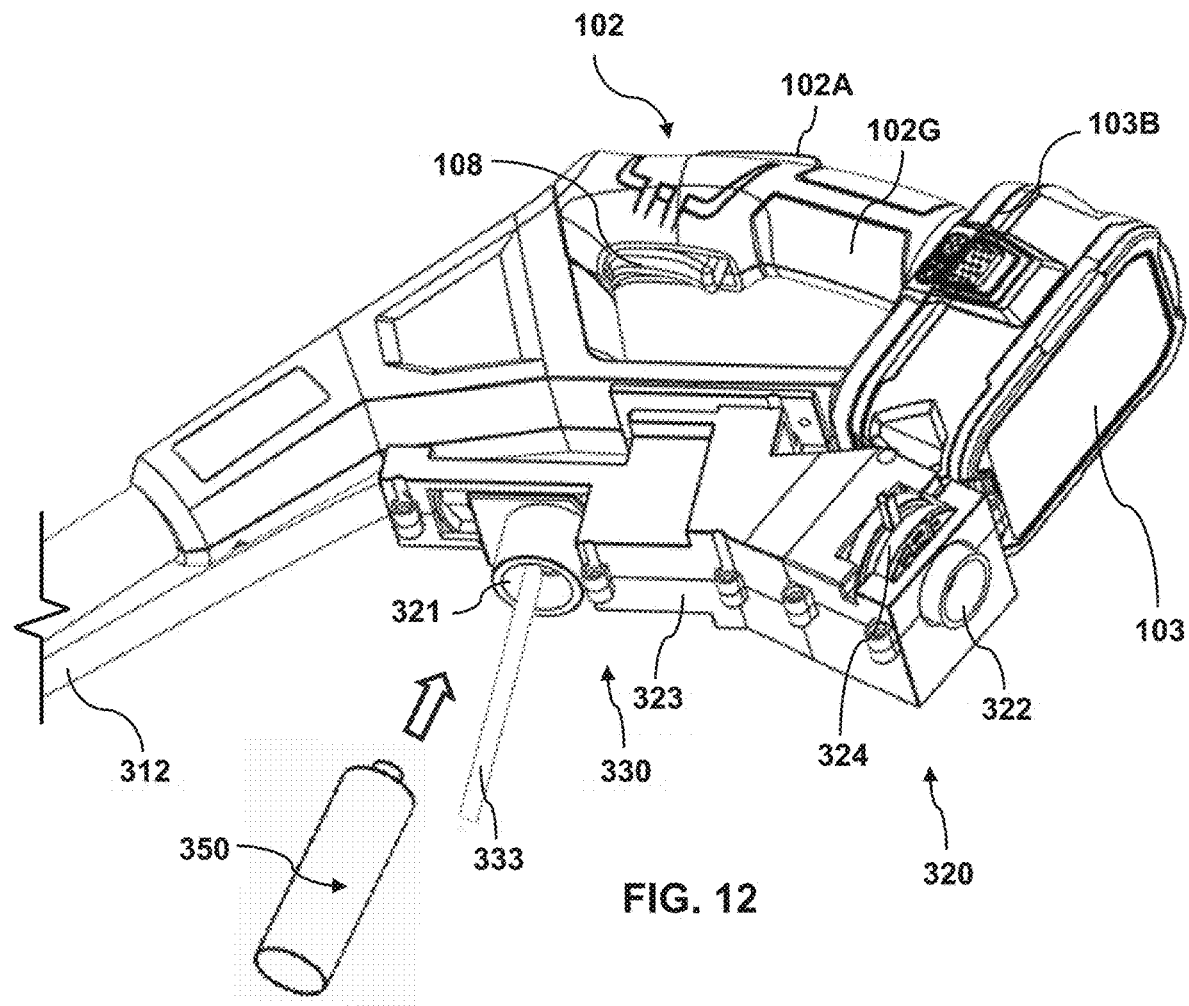
FIG. 12 is a bottom perspective view of the rear end of the outdoor surface cleaning apparatus of FIG. 1 showing the mixing assembly and the water inlet assembly.
Figure 13:
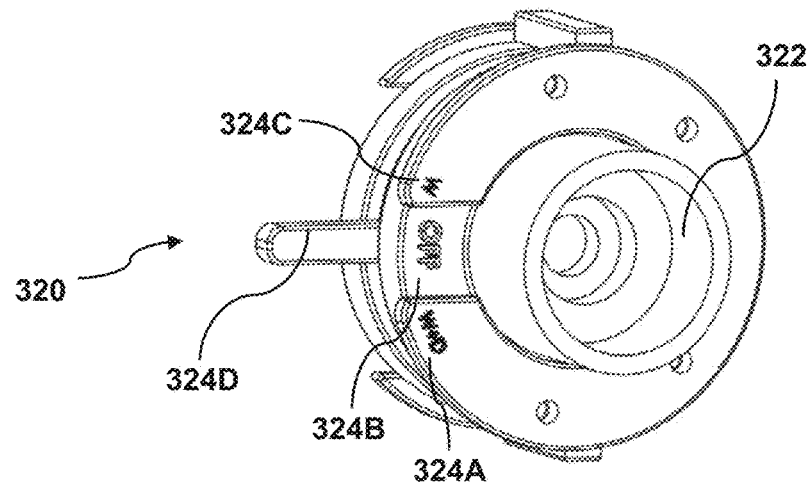
FIG. 13 is a perspective view of the water inlet assembly.

The spray mechanism can further comprise a mixing assembly 330 and a water inlet assembly 320. As shown in FIG. 12, the rear end 100A of the apparatus 100 includes the battery 103, the handle 102, the mixing assembly 330, and the water inlet assembly 320. The handle 102 is connected to the mixing assembly 300 and the water inlet assembly 320 at the bottom. Both the mixing assembly 330 and the water inlet assembly 320 are enclosed within a housing 323. At one end of the housing 323, the water inlet assembly 320 as a first fluid input is provided, comprising a hose dock 322 and a control panel 324. The hose dock 322 is a quick release dock configured for coupling with and receiving an external water hose, and is coupled to a control panel 324 having valves for controlling the water input and the mixing of detergent. The mixing assembly 300 and a second fluid input comprising a detergent dock 321 are provided at a bottom side of the housing 323, which are in fluid communication with the first fluid input for mixing the water from the external water hose with the detergent from the second fluid input. The output of the mixing assembly 300 is in fluid communication with a cleaning solution output. The detergent dock 321 is configured for attaching a detergent bottle 350 thereto. A straw 333 extends out from the detergent dock 321 and into the detergent bottle 350, with the tip of the straw 333 at the bottom of the detergent bottle 350 for receiving the detergent. As shown in FIG. 13, an exemplary implementation of the water inlet assembly 320 is depicted. The hose dock 322 is directly connected to the control panel 324 such that the amount of water entering the mixing assembly 300 from the external water hose can be controlled. The control panel 324 comprises a lever 324D that is rotatable along the circumference of the control panel 324 for selecting a mode of operation. When the lever 324D is set to the center position 324B, the valve for the hose dock 322 is closed and a waterless mode is selected. When the lever 324D is rotated up to "W" position 324C for selecting a water only mode, the valve for the hose dock 322 is opened and only water is flowed into the mixing assembly 300 for discharge at the side nozzle 301 and the brush nozzle 302. When the lever 324D is rotated down to "W+D" position 324A for selecting a diluted detergent mode, the valves for the hose dock 322 and the detergent dock 321 are opened, thereby allowing water and detergent to be mixed in the mixing assembly 300. Diluted detergent is distributed through the side nozzle 301 and the brush nozzle 302. In certain embodiments, the control panel 324 may be electrically powered and the lever 324D is replaced by one or more electric switches.

Figure 15:
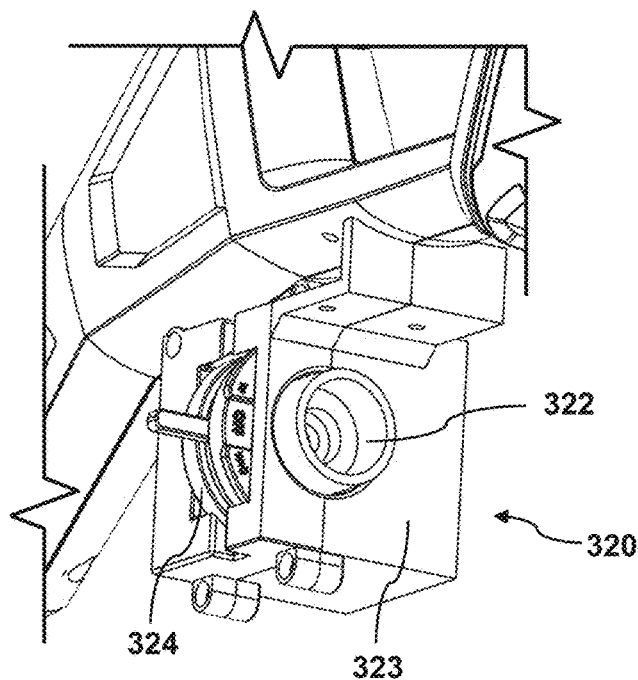
FIG. 15 is a fragmentary perspective view of the handle of the outdoor surface cleaning apparatus of FIG. 14 showing the water inlet assembly.

FIG. 14 shows the outdoor surface cleaning apparatus 100 in a second configuration with a detergent dock 321 and a respective mixing assembly 330 positioned along the tube assembly 106, and a water inlet assembly 320 positioned at the front part of the handle 102. The first fluid input is positioned at the handle 102 for receiving water from an external water hose, whereas the second fluid input comprising a detergent dock 321 is positioned along the tube assembly 106 for receiving detergent. On the first fluid input, the hose dock 322 of the water inlet assembly 320 is in fluid communication with the control panel 324, and both are enclosed within a housing 323, as shown in more details in FIG. 15.

Figure 16:
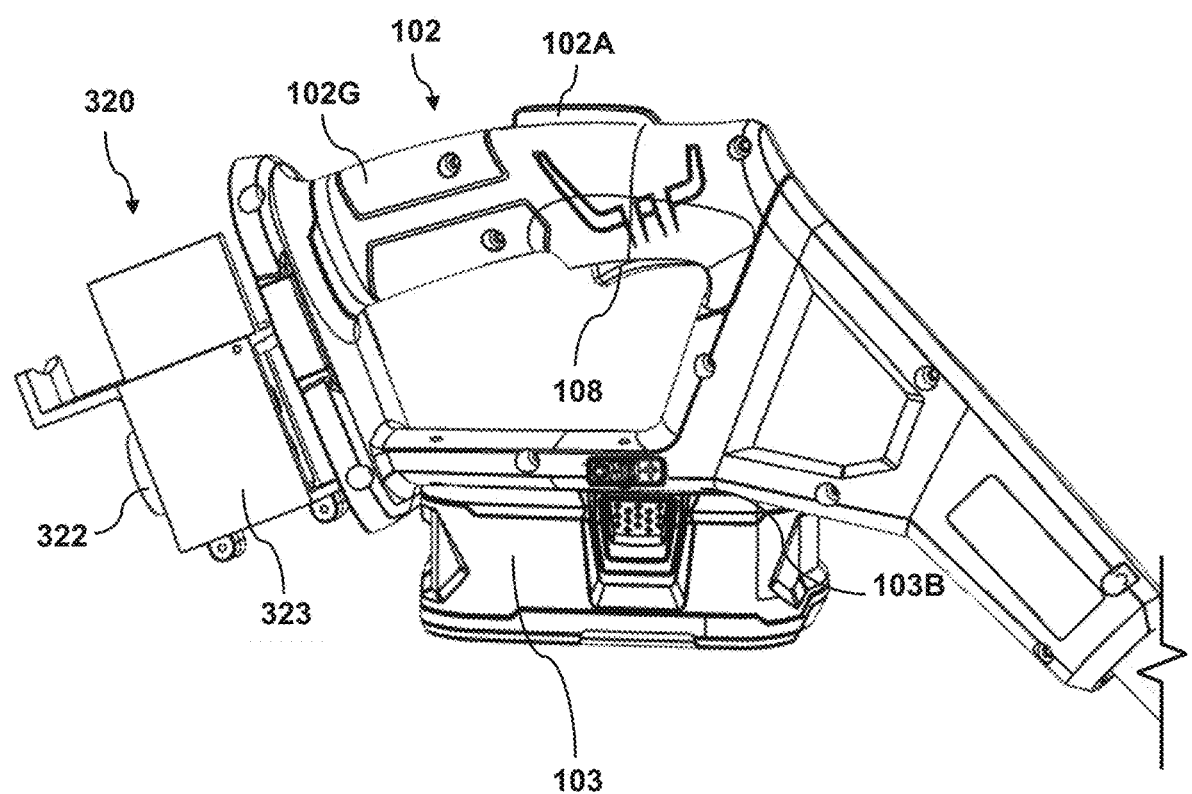
FIG. 16 is a side view of an alternative configuration of the rear end of the outdoor surface cleaning apparatus in accordance with certain embodiments of the present disclosure.

In certain embodiments, the physical position of the battery 103 and the water inlet assembly 320 may be swapped, as shown in the alternative configuration of the apparatus 100 in FIG. 16. The base part of the hand grip portion 102G, i.e., the rear-most end of the handle 102, is connected to the water inlet assembly 320. The front part of the handle 102, i.e., opposite to the hand grip portion 102G, includes a base 103B with a battery receptacle for receiving a battery pack 103. The battery 103 may be enclosed in a waterproof battery cover, such as IPX5 or IPX6, as the hose 312 for transferring water from the water inlet assembly 320 may travel within the handle 102 proximate to the battery 103.

Figure 17:
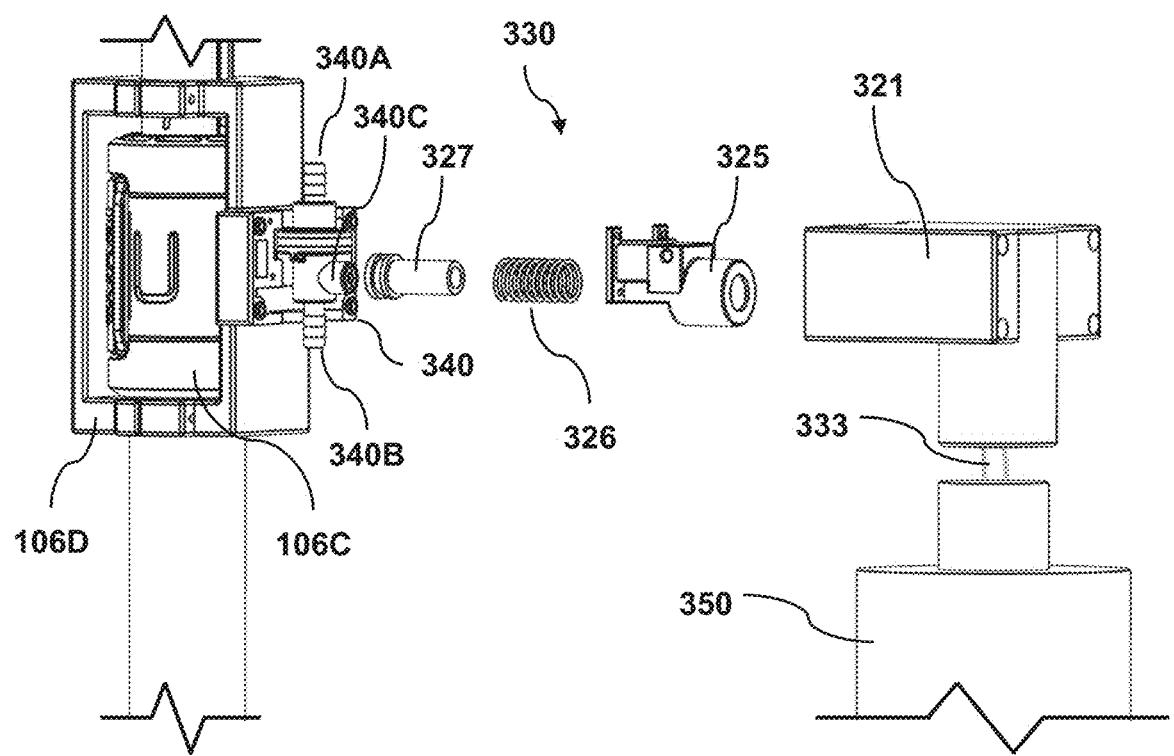
FIG. 17 is an exploded view of the mixing assembly positioned at the tube assembly of the outdoor surface cleaning apparatus of FIG. 14.

FIG. 17 shows an exploded view of the mixing assembly 330 and a second fluid input positioned along the tube assembly 106 of the apparatus 100. A detergent mount 106D is detachably mounted to the tube assembly 106. In certain embodiments, the detergent mount 106D is fastened on the tube assembly 106 at the same position as the clamp 106C. The mixing assembly 330 is mounted on the detergent mount 106D, comprising a venturi tube 340 with a contraction section 340A, a diffusion section 340B, and a throat section 340C. The contraction section 340A is connected to a first hose, which is in fluid communication with the water inlet assembly 320, and may be hidden within a hollow interior of the inner tube 106A. The diffusion section 340B is connected to a second hose, which is in fluid communication with the cleaning solution output at the front end 100B for discharging the cleaning solution. The second hose may be hidden within the outer tube 106B. The diffusion section 340B may be connected to, or otherwise comprise, a check valve 341 (not shown in the FIG. 17). The venturi tube 340 makes use of venturi effect to draw detergent out from the detergent bottle 350 and, via the throat section 340C, mix the detergent with the water flowing through the venturi tube 340. The throat section 340C is connected to a coupler 327 and a straw holder 325. A spring 326 is also provided within the detergent dock 321, such that the straw 333 can be released from the straw holder 325 by pressing the detergent dock 321 towards the detergent mount 106D.

Figure 18:
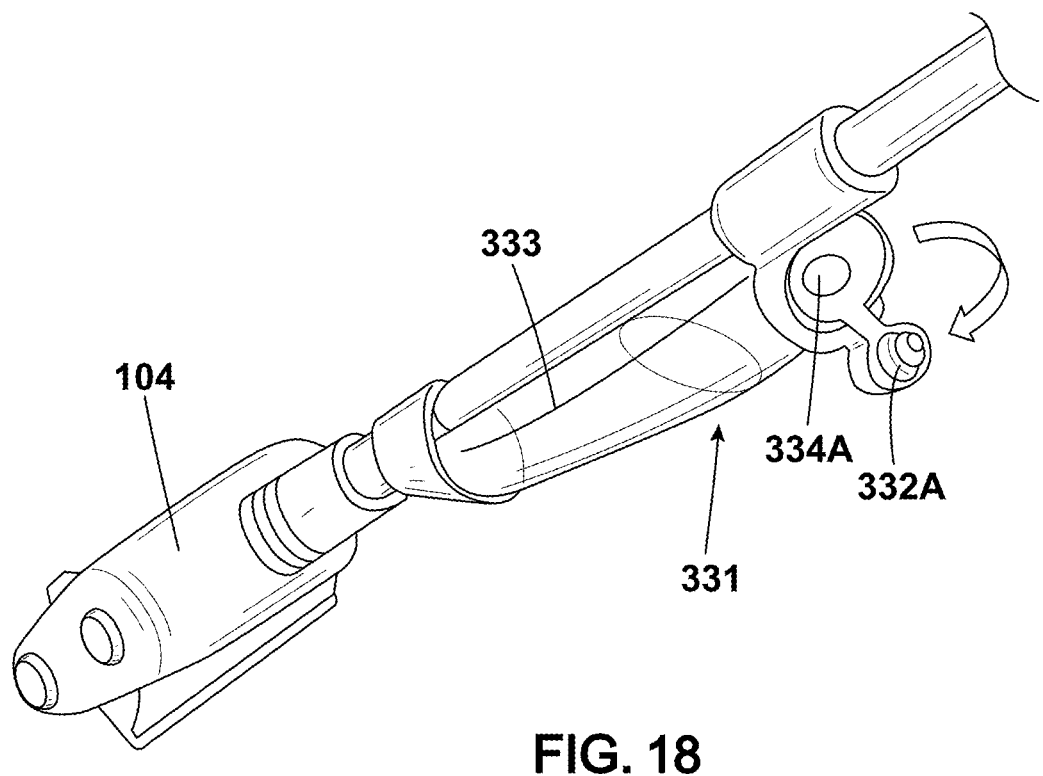
FIG. 18 is a perspective view of the front end of the outdoor surface cleaning apparatus having a first configuration of the integrated bottle.
Figure 19:
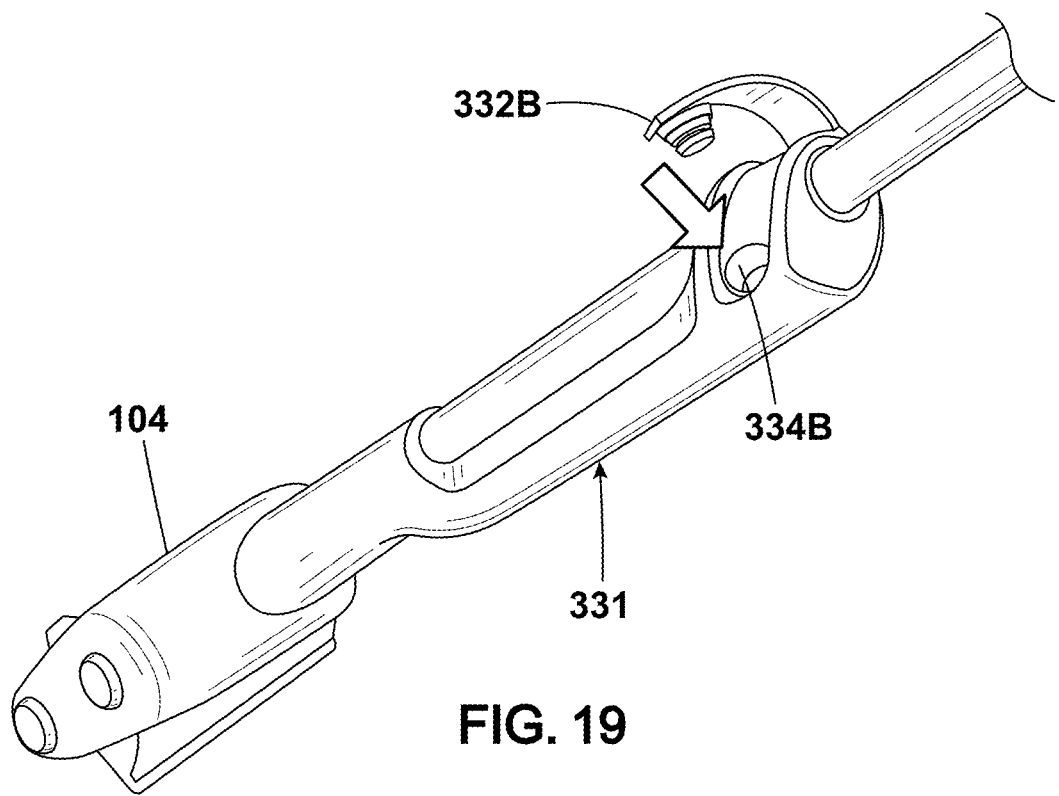
FIG. 19 is a perspective view of the front end of the outdoor surface cleaning apparatus having a second configuration of the integrated bottle.

FIGS. 18 and 19 show two configurations of the mixing assembly 330 using an integrated tank 331 arranged in-line with the outer tube 106B of the tube assembly 106. A transparent window is provided on the wall of the integrated tank 331 with volume indicators. The first configuration of the mixing assembly 330 is depicted in FIG. 18 with a hinged cap and stopper 332A at the top of the integrated tank 331. Detergent is refilled into the integrated tank 331 through the opening 334A, and detergent is drawn out from the integrated tank 331 via a straw 333 by venturi effect. In the second configuration of the mixing assembly 330 shown in FIG. 19, the hinged cap and stopper 332B are provided at the front side. The opening 334B is provided on the front side. With both configurations, the detergent is poured into the integrated tank 331 and there is no limitation on the compatibility of the detergent bottle 350 for attaching to the detergent dock 321.

In certain embodiments, the mixing of the detergent and water can also be achieved using gravitational force or a pump without departing from the spirit of the present disclosure. For example, a connection tube may be arranged at the bottom-most end of the detergent bottle 350 or the integrated tank 331, such that the detergent flows downwardly by gravitational force to mix with the water using a Y-shape connector. In another example, the pumping mechanism is provided to draw the detergent out of the detergent bottle 350 or the integrated tank 331 through the straw 333. The pumping power is adjustable for controlling the amount of detergent needed. The detergent pumped out is then mixed with the water using a Y-shape connector.

Figure 20:
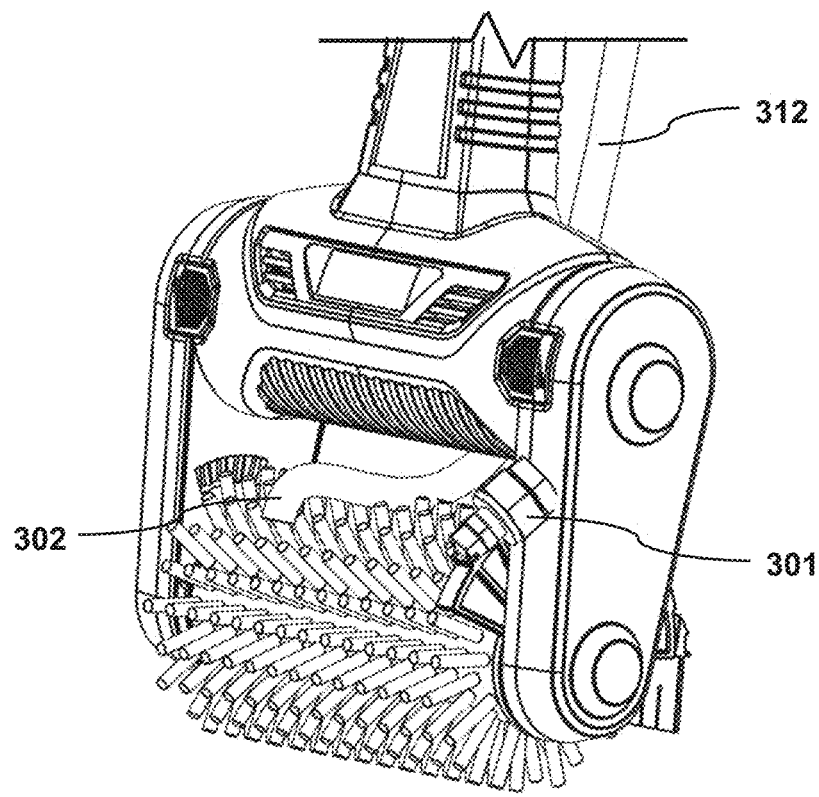
FIG. 20 is a perspective view of the front end (guard removed) of the outdoor surface cleaning apparatus with a first configuration of the spray nozzles.

FIG. 20 shows the first configuration of the spray mechanism at the front end 100B of the apparatus 100 of FIG. 1. The hose 312 is an external tube for transporting cleaning solution, which is distributed to a side nozzle 301 and a brush nozzle 302. The brush nozzle 302 is configured to spray cleaning solution onto a surface in front of the roller brush 502 or directly to the roller brush 502. The side nozzle 301 is configured to spray cleaning solution onto a contact surface of the roller brush 502, or the adjacent surface to the roller brush 502 such that cleaning solution can be discharged the surface before contacting the surface with the roller brush 502.

Figure 21:
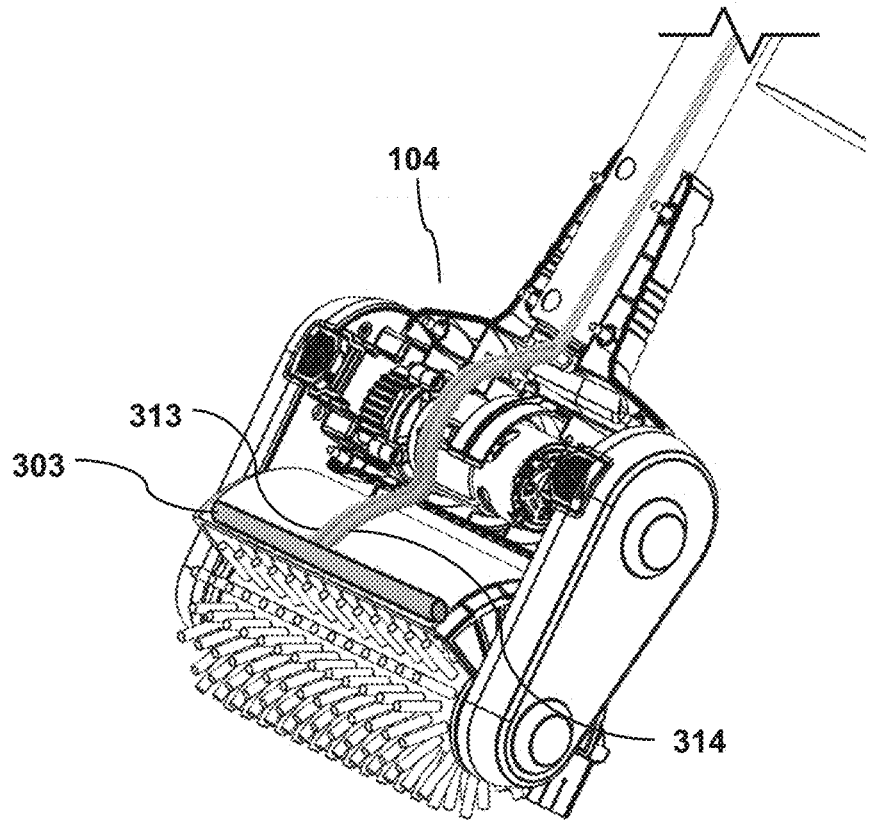
FIG. 21 is a perspective view of an internal construction of the front end of the outdoor surface cleaning apparatus with a second configuration of the spray nozzles.

FIG. 21 shows the second configuration of the spray mechanism at the front end 100B of the apparatus 100. A water hose 313 and a diluted detergent hose 314 are respectively used for transporting water and diluted detergent, which is distributed to a discharging bar 303. Both the water hose 313 and the diluted detergent hose 314 are hidden within the tube assembly 106. The discharging bar 303 has holes arranged horizontally along the longitudinal length of the discharging bar 303, such that the cleaning solution may be discharged to the roller brush 502.

Figure 22:
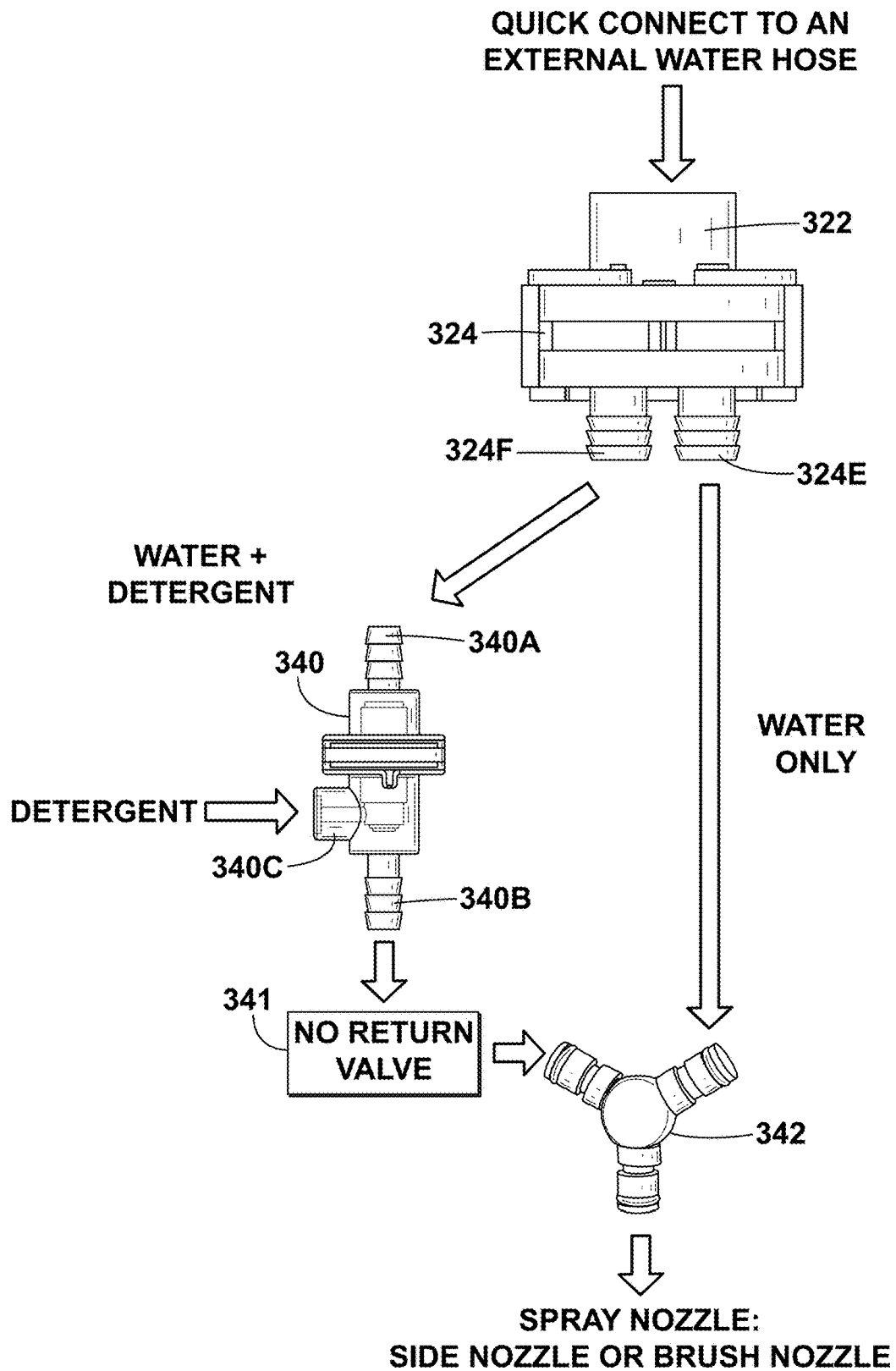
FIG. 22 is a schematic diagram showing the flow of water and detergent.

FIG. 22 is a simplified schematic diagram illustrating the flow of water and detergent in the apparatus 100. The hose dock 322 is a quick release dock configured for coupling with and receiving an external water hose. The hose dock 322 is directly coupled to a control panel 324 having valves for controlling the water input and the mixing of detergent. The control panel 324 provides two outlet ports 324E, 324F. The first outlet port 324E is coupled to a first inlet port of a Y-shape connector 342 for transporting water. The second outlet port 324F is coupled to the contraction section 340A of the venturi tube 340. The venturi tube 340 makes use of venturi effect to draw detergent into the venturi tube 340 via the throat section 340C, such that the detergent and the water are mixed to obtain diluted detergent. The diffusion section 340B is coupled to a check valve 341 and a second inlet port of the Y-shape connector 342 for transporting the diluted detergent to the front end 100B. When the control panel 324 is switched to "W", the water from the hose dock 322 is directed to the first outlet port 324E. Therefore, the Y-shape connector 342 receives water for discharge. When the control panel 324 is switched to "W+D", the water from the hose dock 322 is directed to the second outlet port 324F. Therefore, the water is mixed with the detergent at the venturi tube 340, and the Y-shape connector 342 receives the diluted detergent for discharge.

Figure 23:
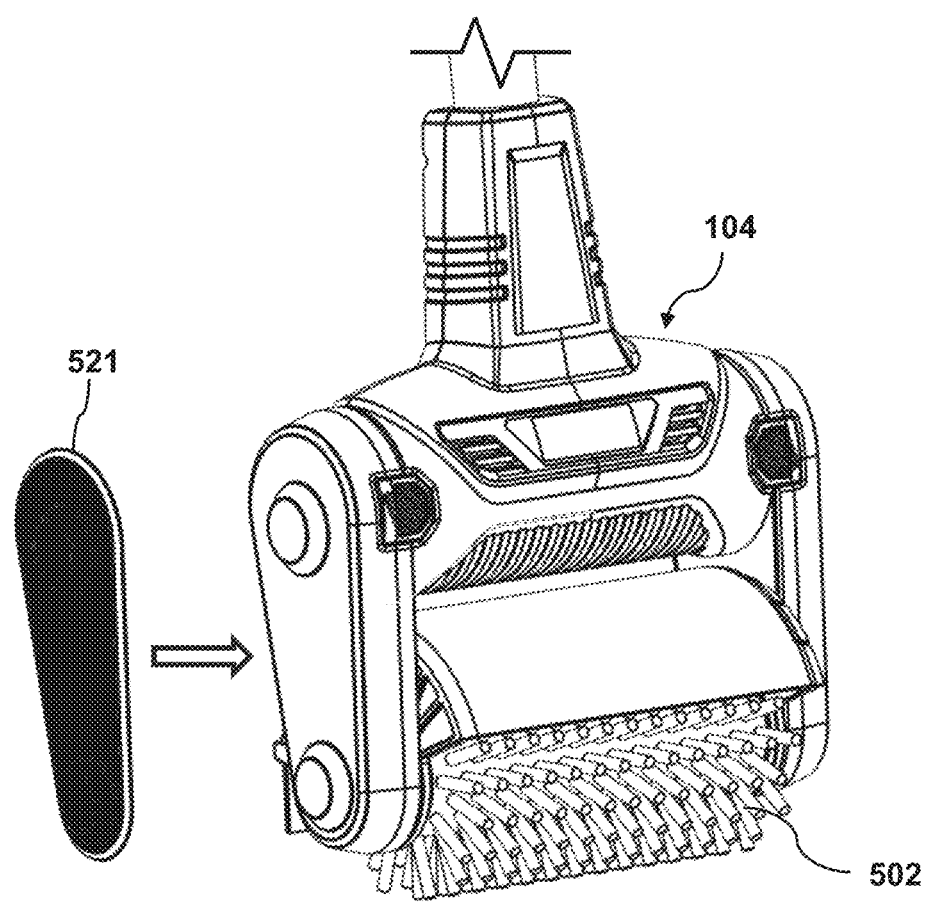
FIG. 23 is a perspective view of the front end showing a side brush attachable to the outdoor surface cleaning apparatus of FIG. 14.

FIG. 23 shows a side brush 521 attachable to a side of the front end 100B that is generally perpendicular to an axis of rotation of the roller brush 502. In other words, as viewed from the front of the apparatus 100, the side brush 521 is coupled to the left lateral end of the transmission assembly 500, or to the right lateral end of the side cover 430. To attach the side brush 521, the user simply aligns the side brush 521 and the transmission assembly 500 or the side cover 430, and moves the side brush 521 or the apparatus 100 relatively towards each other. Velcro may be used to secure the side brush 521. To detach the side brush 521, the user simply pulls the side brush 521 out from any side to separate the side brush 521 from the apparatus 100. The side brush 521 provides a brush in the lateral direction for scrubbing the surface of a wall, or the riser of a stair.

Figure 25:
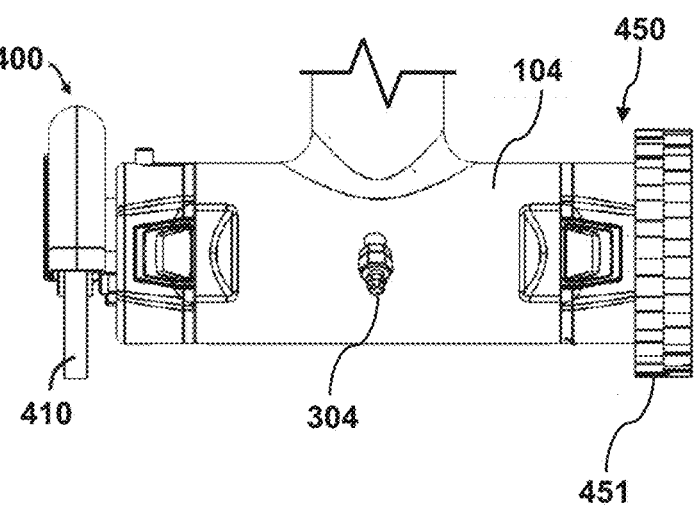
FIG. 25 is a front view of the front end of the outdoor surface cleaning apparatus of FIG. 24.

FIG. 24 shows an outdoor surface cleaning apparatus 100 in a third configuration, comprising a power head 104, a disc brush assembly 400, and a wheel assembly 450. The power head 104 includes two lateral end portions 104A, 104B and each may be arranged to be coupled with an attachment head having a cleaning attachment directly. The attachment head may comprise a disc brush assembly 400 as the cleaning attachment. The disc brush assembly 400 is driven by the drive assembly in the power head 104. On the front of the power head 104, a cleaning solution output (front nozzle 304) may be provided for discharging the cleaning solution. The wheel assembly 450 is attached to right lateral end portion 104B of the power head 104, and the disc brush assembly 400 is attached to left lateral end portion 104A. As viewed from the front of the apparatus 100, as shown in FIG. 25, the disc brush assembly 400 is coupled to the left end of the power head 104, and the wheel assembly 450 is coupled to the right end of the power head 104. To connect the disc brush assembly 400, the user simply aligns the corresponding engagement features on the power head 104 and the disc brush assembly 400, and then move the disc brush assembly 400 or the power head 104 relatively towards each other. To disconnect the disc brush assembly 400, the user simply disengages the engagement features on the power head 104 and the disc brush assembly 400, then move the disc brush assembly 400 or the power head 104 relatively away from each other. In certain embodiments, the power head 104 is arranged to couple with the disc brush 402 in the disc brush assembly 400 to drive the disc brush 402. The wheel assembly 450 can be mounted similarly, but from the other side of the power head 104, and with or without driving connection between the wheel 451 and the power head 104.

Figure 26:
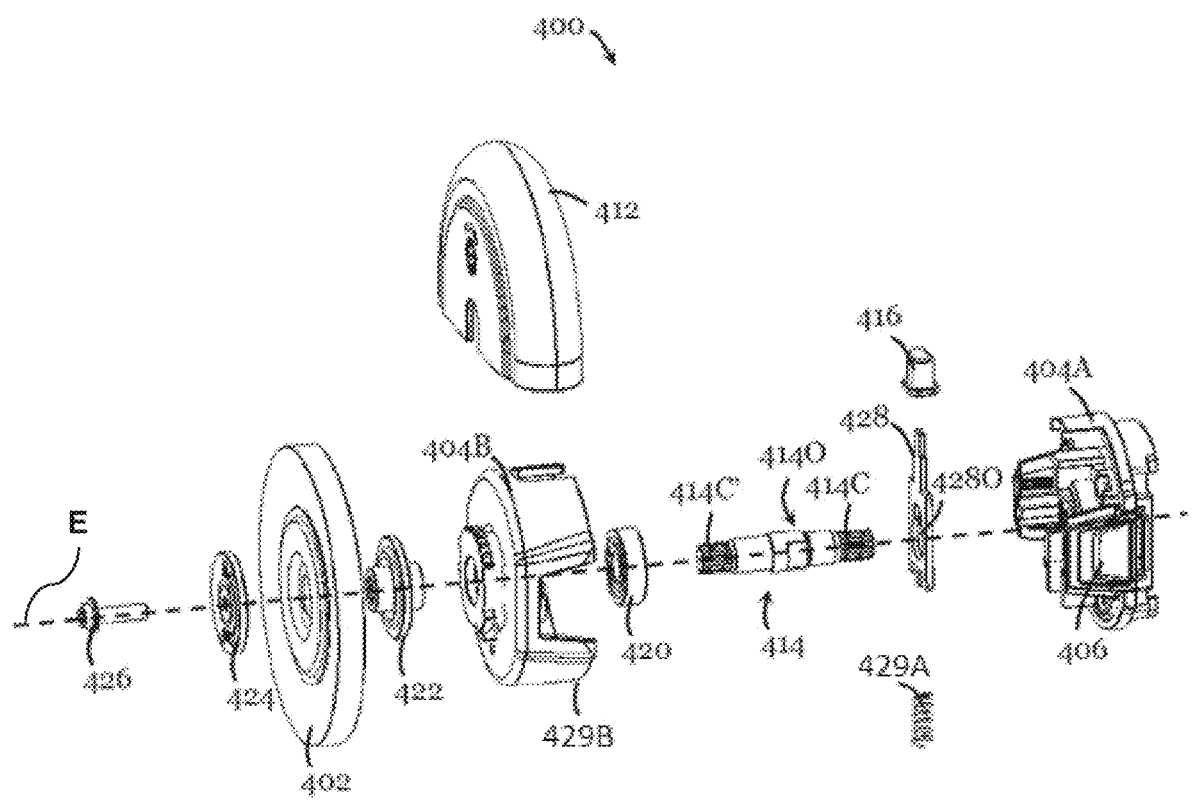
FIG. 26 is an exploded view of the disc brush assembly of the outdoor surface cleaning apparatus of FIG. 24.

FIG. 26 illustrates, in more detail, the construction of the disc brush assembly 400. The disc brush assembly 400 includes a housing formed by two housing parts 404A, 404B. The first housing part 404A is for mounting the actuator 406 and the second housing part 404B is for mounting the disc brush 402. A guard or cover 412 for the disc brush 402 is attached to the second housing part 404B to which the disc brush 402 mounts. The two housing parts 404A, 404B define aligned through-holes through which the spindle 414 extends. Bearings 420, 421 are provided in the housing for supporting rotation of the spindle 414 about the axis E. The spindle 414 includes at both ends, keyed surfaces 414C, 414C'. One end 414C of the spindle 414 away from the disc brush 402 is for coupling with a drive shaft 514 in the power head 104. The other end 414C' of the spindle 414 is for coupling with a disc brush support sleeve 422 (an inner flange). This end 414C' of the spindle 414 also defines an opening for removably (e.g., threadedly) receiving a hex key head 426. The spindle 414 is generally long and cylindrical, but has a portion 414O with opposed flat surfaces defining an obround cross section. The disc-like disc brush 402 is arranged to be mounted on an axially extending cylindrical part of the support sleeve 422. An outer disc member 424 (outer flange) is arranged on the opposite side of the disc brush 402. The hex key head 426 rotatably supports the disc brush 402 between the inner and outer flanges 422, 424. A spindle locking mechanism is arranged in the housing. The spindle locking mechanism is formed by a spindle lock button 416 protruding from the housing, a spindle lock plate 428 biased by a compression spring 429A supported by a supporting flange 429B in the second housing part 404B. The spindle lock plate 428 defines an opening 428O with an upper portion and a lower portion of different sizes. The upper portion is sized to correspond to (e.g., slightly larger than) the short axis of the obround portion 414O and is smaller than the long axis of the obround portion 414O, while the lower portion is sized to correspond to the long axis of the obround portion 414O (also the diameter of the remaining cylindrical portion). The spindle lock assembly is used for facilitating replacement or removal of the disc brush 402. To remove the disc brush 402, the user has to actuate the spindle lock actuator 416, depress it such that the upper portion of the opening on the spindle lock plate surrounds the obround portion 414O. In this way, the spindle 414 cannot rotate as the upper portion of the opening 428O is sized smaller than a long axis of the obround portion 414O. When the actuator 416 is actuated, the user can use a hex key to engage with and rotate the hex key head 426, to release the hex key head 426 from the spindle 414, thereby removing or replacing the disc brush 402, or the inner and outer flanges 422, 424, if needed.

Figure 28:
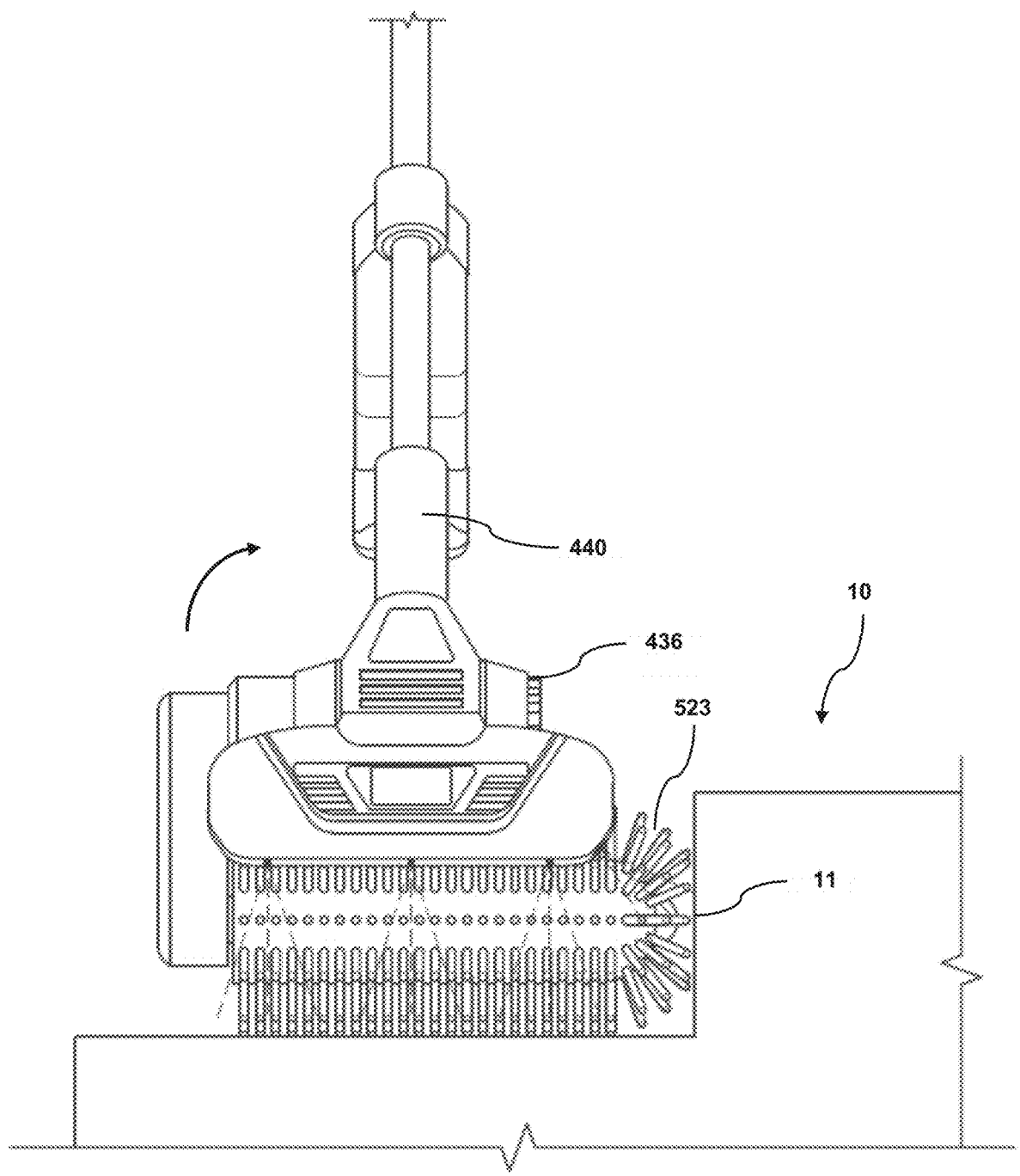
FIG. 28 is a front view of the front end of an outdoor surface cleaning apparatus of FIG. 27 with a dome-shaped brush attached.

FIGS. 27 and 28 show the front end 100B of an outdoor surface cleaning apparatus 100 in a fourth configuration, comprising a power head 104, a transmission assembly 500, a brush head 105, and a circular side brush 522 or a dome-shaped brush 523. The front end 100B of the apparatus 100 is in a cantilever configuration, therefore the power head 104 includes only one lateral end portion 104A arranged to be coupled with an attachment head having a cleaning attachment (brush head 105 and the attached circular side brush 522 or dome-shaped brush 523) indirectly through the transmission assembly 500. The transmission assembly 500 is mechanically coupled to the left lateral end portion 104A of the power head 104 and the brush head 105. The drive assembly in the power head 104 is arranged to couple with the transmission assembly 500, and the lower part of the transmission assembly 500 is coupled to a first end of the brush head 105 for driving the roller brush 502 in the brush head 105. The apparatus is in a cantilever configuration having the transmission assembly 500 for connecting the power head 104 and the brush head 105. In certain embodiments, the power head 104 may include a rotary knob 436, which is provided on an opposite side to the transmission assembly 500 for adjusting the flow of the cleaning solution. The rotary knob 436 may control a valve on the hose 312, which is configured to control the flow rate from fully open to fully closed. The cleaning solution output may include one or more front nozzles 304 and a side nozzle 305. In certain embodiments, a nozzle selector 435 may also be provided. The nozzle selector 435 is a slider for selecting between the front nozzles 304 (or the brush nozzle 302) and the side nozzle 305.

Referring to FIG. 27, a circular side brush 522 is attached to an engagement end 501C on a second end of the brush head 105, which is coupled to the right drive shaft 501B for transferring the torque from the transmission assembly 500. Therefore, when the roller brush 502 is driven to rotate by the power head 104, the circular side brush 522 is also rotated with the same speed. Unlike the prior configurations having symmetric design of the left and right lateral end portions 104A, 104B, the fourth configuration has an asymmetric design of the left and right lateral end portions 104C, 104D. The right lateral end portion 104D has an opening to receive the shaft of the roller brush 502 and allows the shaft to pass through for receiving the circular side brush 522. A bearing is also provided to allow the shaft to rotate relative to the right lateral end portion 104D. The right lateral end portion 104D can increase the bending strength of the roller brush so that the right lateral end portion 104D would not bend towards the power head 104 during use. To connect the circular side brush 522 to the engagement end 501C, the user simply aligns the circular side brush 522 and the engagement end 501C, and then moves the circular side brush 522 or the apparatus 100 relatively towards each other. The engagement of the engagement end 501C and the circular side brush 522 may provide a click sound (by material contact) to indicate that the engagement is successful. Referring to FIG. 28, a dome-shaped brush 523 is attached to the second end of the brush head 105, such that the dome-shaped brush 523 is also driven to rotate by the power head 104 when the roller brush 502 rotates. By using the circular side brush 522 or the dome-shaped brush 523, a user can easily brush a surface in a lateral direction, which is particularly useful for cleaning the surface of a wall, or the riser 11 of a stair 10. The circular side brush 522 may be a wire brush. The circular side brush 522 may also be a disc-like blade.

Figure 29:
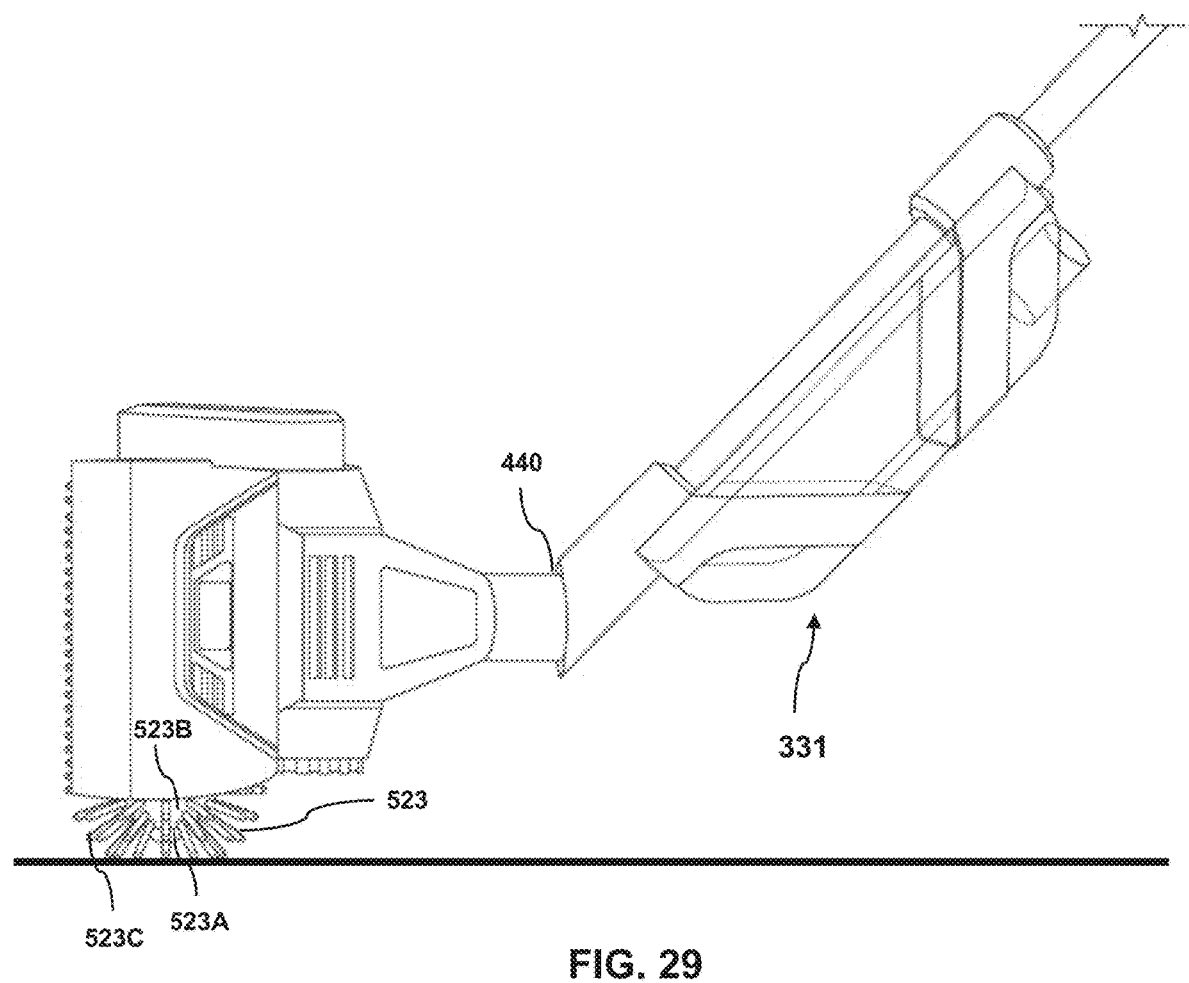
FIG. 29 is a side view of the front end of an outdoor surface cleaning apparatus of FIG. 28 in a twisting head mode.
Figure 30:
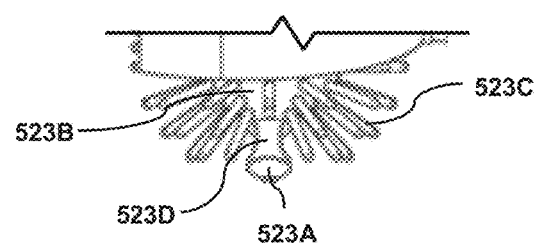
FIG. 30 is a side view of an alternative configuration of the dome-shaped brush.

FIGS. 28 and 29 show a twisting head mechanism of the front end 100B of the apparatus 100. A rotatable joint 440 may be provided between the front end 100B and the tube assembly 106. As view from the front of the apparatus 100 as shown in FIG. 28, the front end 100B at a horizontal state is rotatable clockwisely by 90 degrees to a vertical state using the rotatable joint 440, which is demonstrated in FIG. 29. When the front end 100B is twisted, the side nozzle 305 can effectively discharge cleaning solution to the circular side brush 522 or the dome-shaped brush 523. In certain embodiments, the dome-shaped brush 523 further comprises an inner dome, a plurality of bristles 523C arranged circumferentially around the inner dome 523B, and a roller ball 523A supported by a socket which is mounted on the top of the inner dome 523B. In an alternative embodiment as shown in FIG. 30, the socket and the roller ball 523A are extended out by an arm 523D having a length longer than the length of a bristle 523C, thereby the arm 523D can project the roller ball 523A out from the center of the inner dome 523B. The dome-shaped brush 523 allows brushing of a lateral surface when the apparatus 100 is at a horizontal state, or a horizontal surface when the apparatus 100 is at a vertical state.

The outdoor surface cleaning apparatus 100 may take different shapes and forms. For example, the outdoor surface cleaning apparatus 100 may include any number of handles 102. The battery receptacle may be arranged away from the handle 102, e.g., on the power head 104. The tube assembly 106 connecting between the handle 102 and the power head 104 may not be adjustable. The clamp 106C may be omitted. The handle 102 need not be arranged at the topmost end of the apparatus 100, and need not extend rearwardly. The auxiliary handle 110 may be fixedly connected to the tube assembly 106, or may even be omitted. The auxiliary handle 110 may not be adjustable with respect to the tube assembly 106. The power head 104 may include more than one motor 201. The roller brush 502, the circular side brush 522, or the dome-shaped brush 523 may have different shape and form. For example, the roller brush 502 may include any brittles arrangement.

Figure 31:
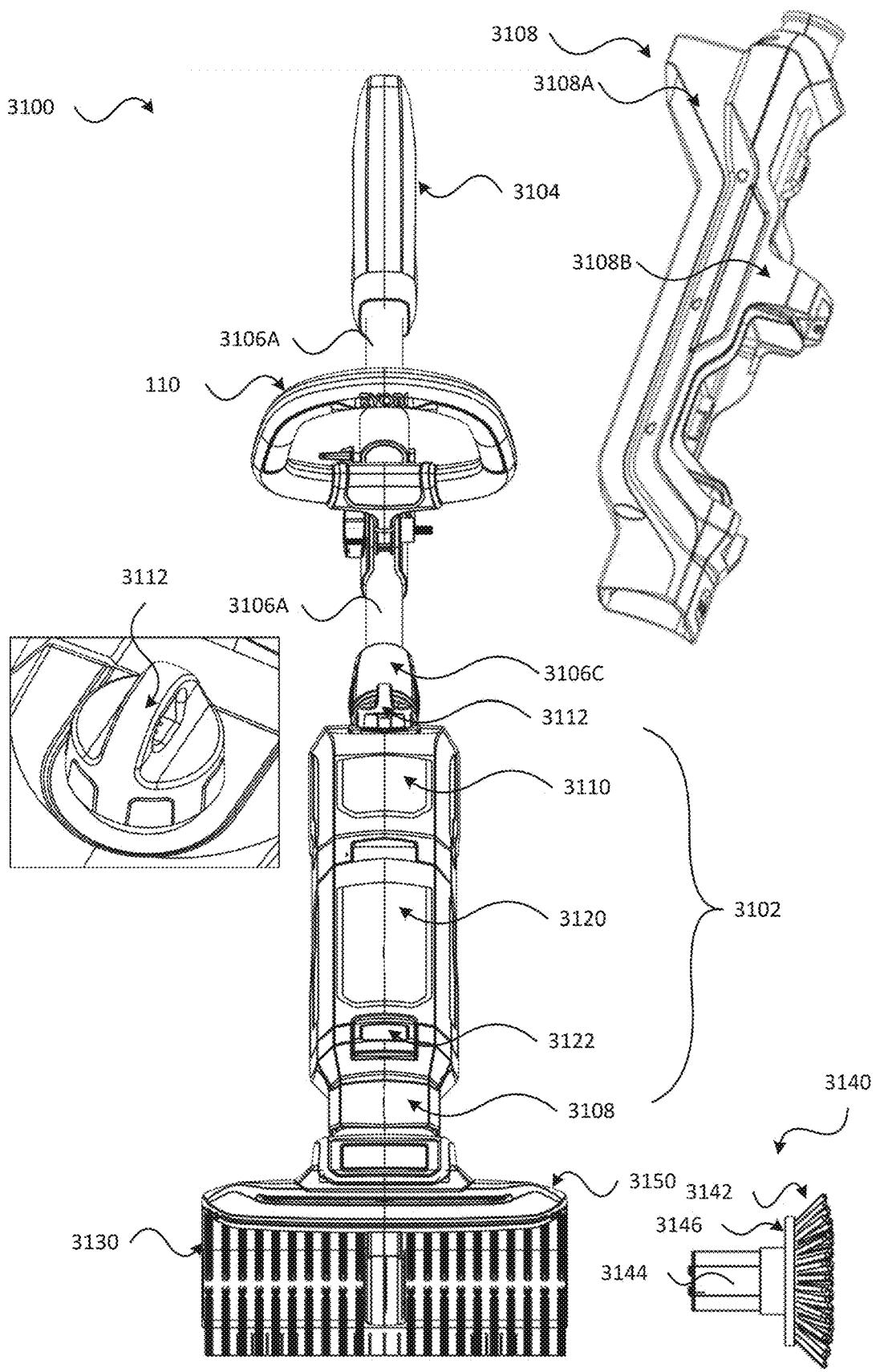
FIG. 31 is a front view of an outdoor surface cleaning apparatus in accordance with certain embodiments of the present disclosure.
Figure 32:
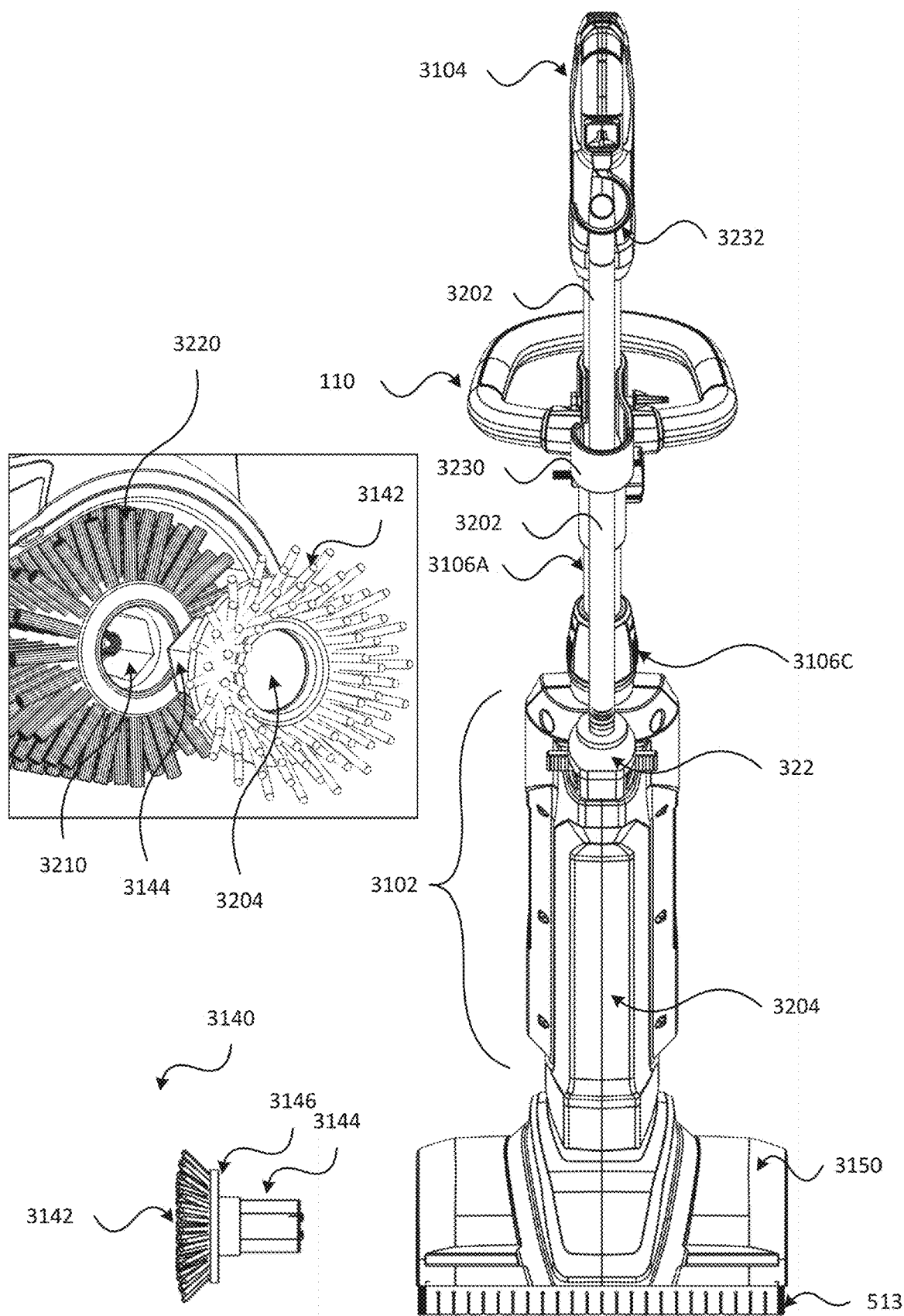
FIG. 32 is a back view of an outdoor surface cleaning apparatus in accordance with certain embodiments of the present disclosure.
Figure 33:
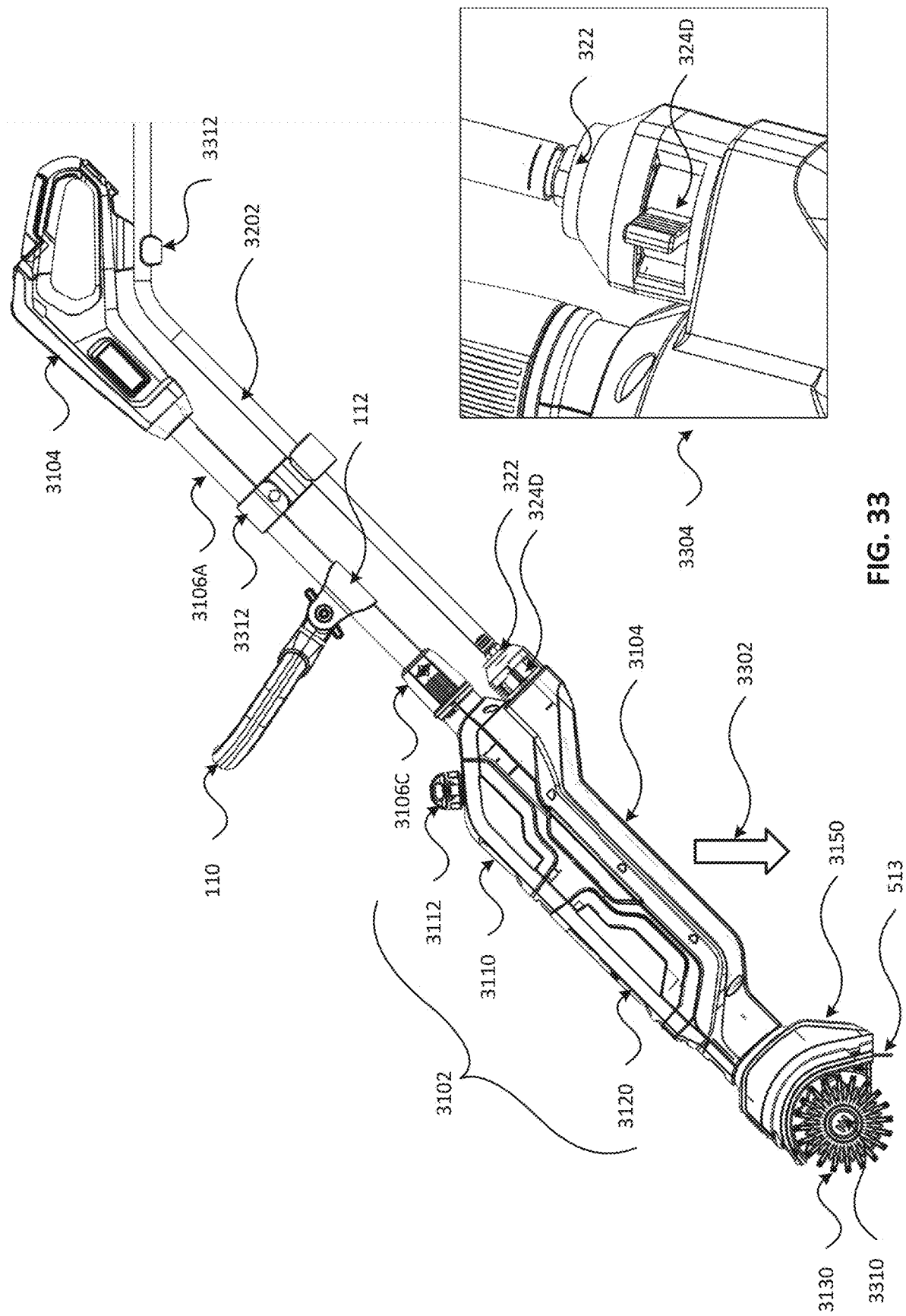
FIG. 33 is a side view of an outdoor surface cleaning apparatus in accordance with certain embodiments of the present disclosure.

Referring to FIGS. 31 to 33, aspects of an outdoor cleaning apparatus according to embodiments of the present disclosure is shown as an outdoor cleaning device 3100. It is noted that FIG. 31 shows a front view of the outdoor cleaning device 3100, FIG. 32 shows back or rear view of the outdoor cleaning device 3100, and FIG. 33 shows a side view of the outdoor cleaning device 3100. The outdoor cleaning device 3100 includes a main body 3102 having a main body structure 3108, a first handle 3104, a longitudinal shaft 3106A, a second handle 3110, and a roller brush 3130. As shown in FIGS. 31 and 33, the longitudinal shaft 3106A may be attached to the main body 3102 via an attachment mechanism 3106C. The attachment mechanism 3106C may be configured to secure the longitudinal shaft 3106A to the main body 3102 via a snap fit (e.g., the attachment mechanism 3106C may include an opening having a groove on an interior surface of the opening and an end of the longitudinal shaft 3106A may include a ridge that may snap into the groove to secure the longitudinal shaft 3106A to the main body 3102), a compression fit and/or a friction fit (e.g., the attachment mechanism 3106C may include an opening having a tapered profile that gets narrow towards an end of the longitudinal shaft 3106A such that the end of the longitudinal shaft 3106A is compressed as the longitudinal shaft 3106A is pressed into the attachment mechanism 3106C and secured in place by the compressive force or friction force), threaded engagement (i.e., an end portion of the longitudinal shaft 3106A may have male threads and the attachment mechanism 3106C may include female threads or the end portion of the longitudinal shaft 3106A may have female threads and the attachment mechanism 3106C may include male threads), a pin (e.g., the attachment mechanism 3106C and an end of the longitudinal shaft 3106A may each include two apertures that are axially aligned so that a pin, such as a cotter pin, may be inserted through a first one of the apertures of the attachment mechanism 3106C and then through both apertures of the longitudinal shaft 3106A and out the other aperture of the attachment mechanism 3106C), or other techniques, such as a clamp (e.g., the clamp 106C).

As illustrated in FIGS. 31-33, the first handle 3104 may be attached to the longitudinal shaft 3106A at an end of the longitudinal shaft 3106A opposite an end of the longitudinal shaft 3106A attached to the attachment mechanism 3106C. In an aspect, the first handle 3104 may include features similar to the handle 102 of FIGS. 1-3, 12, and 16, such as an activation means for controlling operation of the outdoor cleaning device 3100. As described above, the activation mechanism may include the trigger 108, the speed control switch 102A, a forward-reverse button to switch the rotation direction of the roller brush 3130, and the like. One difference between the handle 3104 and the handle 102 is that the handle 3104 may not include features for attaching a detergent bottle to the first handle 3104. An auxiliary handle 110 may be attached to the longitudinal shaft 3106A between the first end of the longitudinal shaft 3106C (e.g., the end to which the first handle 3104) and the main body 3102. The auxiliary handle 110 may be attached to the longitudinal shaft 3106C as described above with reference to FIG. 3.

Figure 46:
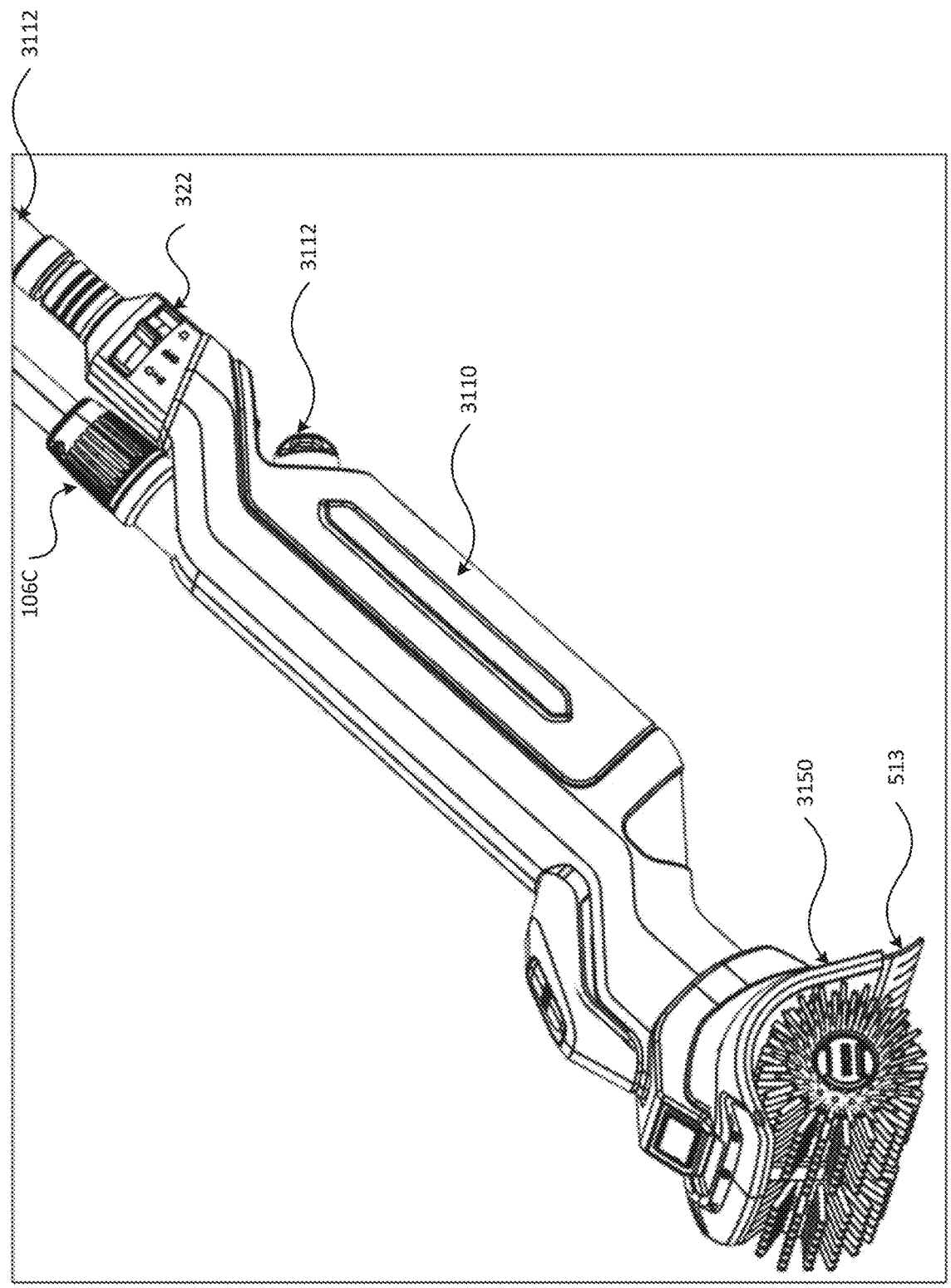
FIG. 46 is a fragmentary perspective views illustrating an alternative embodiment of the outdoor surface cleaning apparatus having a fluid tank on the back of the outdoor cleaning device in accordance with certain embodiments of the present disclosure.
Figure 47:
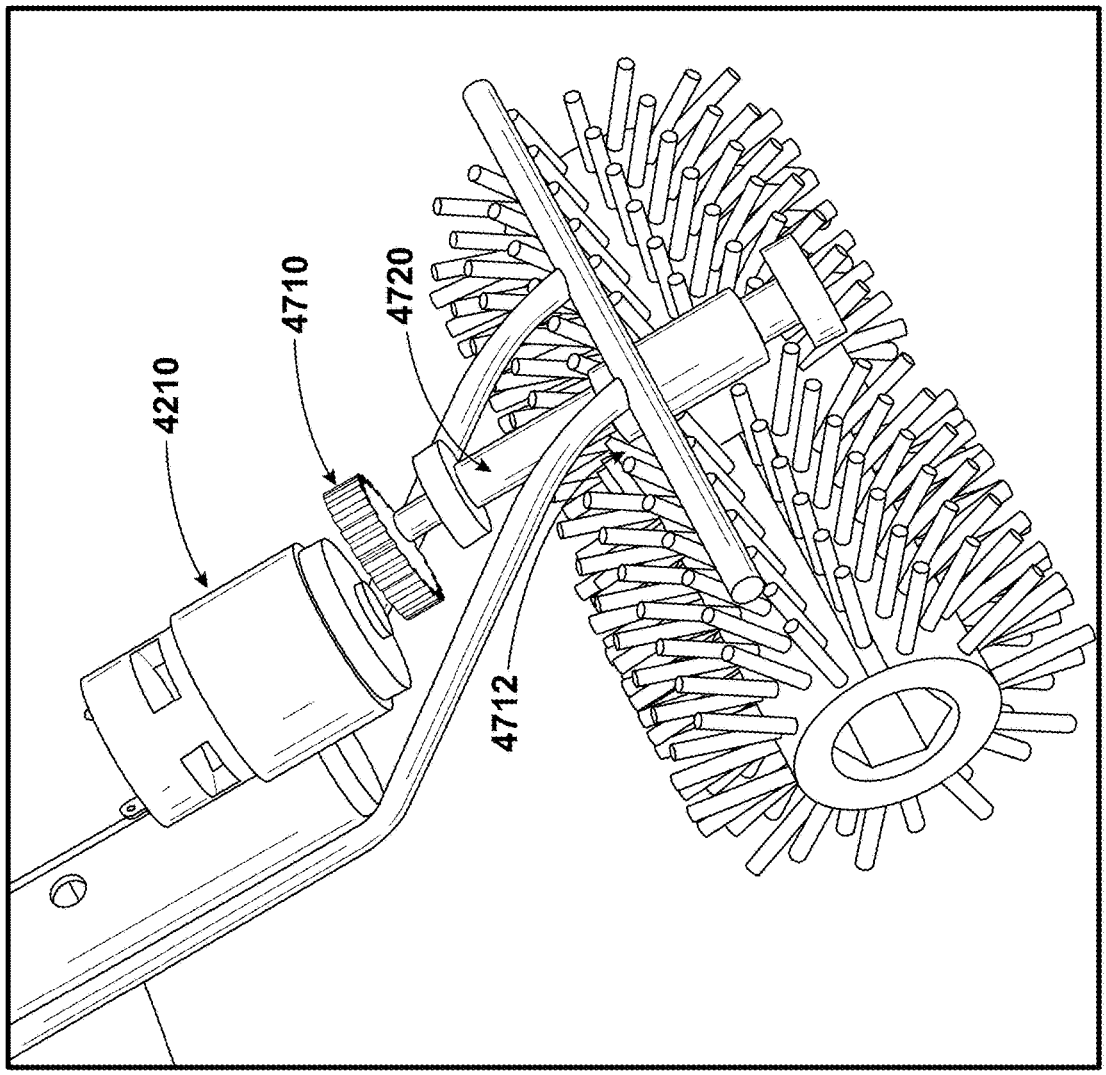
FIG. 47 is a fragmentary perspective views illustrating additional aspects of the driving mean of an outdoor surface cleaning apparatus in accordance with aspects of the present disclosure.

Instead of attaching the detergent bottle to the first handle 3102, the main body 3102 may be configured to receive a fluid tank 3110. The fluid tank 3110 may be configured to store a volume of a cleaning solution, such as a detergent or concentrated cleaning solution. In some aspects, the fluid tank 3110 may be positioned on a front side (FIG. 31) of the main body 3102, as can be seen in FIGS. 31 and 33. In additional or alternative aspects, the fluid tank may be positioned on a back side 3204 of the main body 3102, as shown in FIG. 46.

Figure 34:
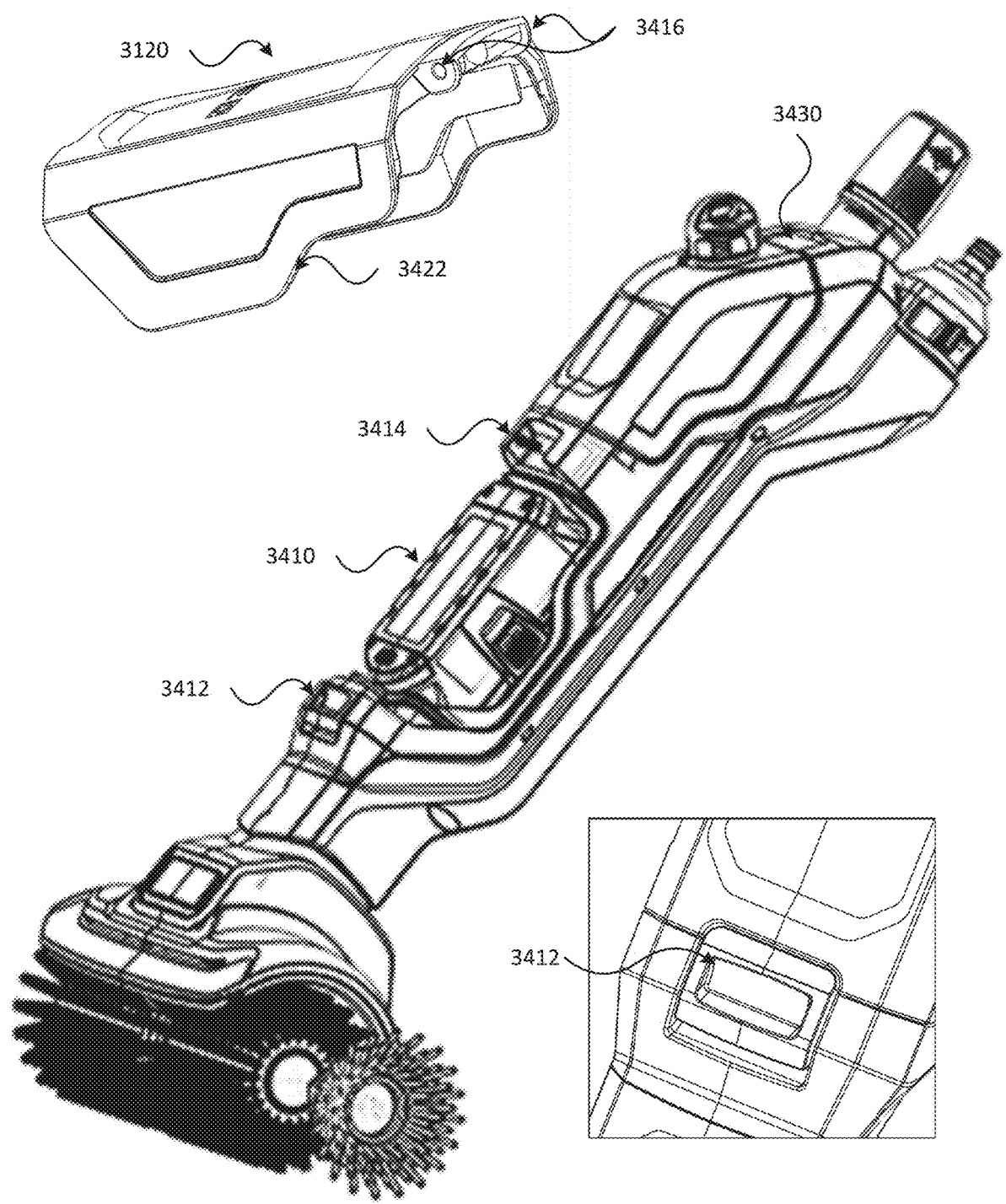
FIG. 34 is a perspective view of an outdoor surface cleaning apparatus in accordance with certain embodiments of the present disclosure.

In an aspect, the main body structure 3108 may be formed from a body structure 3108A and a body structure 3108B. The body structures 3108A, 3108B may be formed from a hard plastic material, metal, or other materials and may be secured together via screws, a snap fit, or other techniques. The body structures 3108A, 3108B may define cavities within the main body structure 3108 to allow various control and operational features to be provided, such as wiring from a battery to the activation means located on the handle 3104 to activate the outdoor cleaning device 3100 or to route tubes within the main body structure 3108 to establish fluid communication between one or more fluid sources and at least one nozzle of the outdoor cleaning device 3100, as described in more detail below. The main body structure 3108 may include a battery compartment, shown in FIGS. 31 and 33 as being covered by a battery cover 3120. A battery cover locking mechanism 3122 may be provided to secure the cover in place and protect a battery used to provide operational power to the outdoor cleaning device 3100. A locking mechanism similar to the battery cover locking mechanism 3122 may be provided to secure the fluid tank 3110 to the main body, as shown in FIG. 34. Referring briefly to FIG. 34, the battery cover 3120 may enclose a battery compartment in which a battery 3410 may be provided. The battery 3140 may be a battery pack, a battery cell, or other type of battery. Once secured within the battery compartment, the battery 3410 may provide operational power to the outdoor cleaning device. The battery cover locking mechanism 3122 may be a buckle or clip that snaps closed to secure the battery cover 3120 in place. It is noted that securing the battery cover 3120 in place using a buck or clip has been described for purposes of illustration, rather than by way of limitation and the other mechanisms may be utilized to secure the battery cover 3120 in place according to embodiments of the present disclosure.

In an aspect, a gasket or seal formed of a soft waterproof material (e.g., rubber, silicone, etc.) may be provided on an edge 3422 of the battery cover 3120 or alternatively on a surface of the battery compartment (e.g., a surface that comes into contact with the battery cover 3120) in order to provide a water tight seal and prevent water or other liquids from getting inside the battery compartment and potentially damaging the battery 3410 or other electrical components. In an aspect, the battery cover 3120 may be secured to the main body 3102 via a hinge mechanism. For example, the battery cover 3120 may include two apertures 3416 and the main body 3102 may include one or more pins 3414 that may be inserted through the apertures 3416. Once secured to the main body 3102, the battery cover 3120 may open by pivoting about a longitudinal axis of the pin(s) 3414 to provide access to the battery compartment and the battery 3410, such as to remove the battery 3410 for charging on a charging dock and securing the battery 3410 in place prior to use of the outdoor cleaning device 3100. It is noted that while FIGS. 31-34 illustrate the battery cover 3120 as pivoting upward, in some aspects the battery cover 3120 may pivot downward to expose the battery compartment and the battery 3410 (e.g., by switching the locations of the battery cover locking mechanism 3122 and the two apertures 3416 located on the battery cover 3120 and the one or more pins 3414 coupled to the main body 3102). Moreover, the battery cover 3120 may also be configured to open to the side, rather than upward or downward, in some configurations of outdoor cleaning devices of embodiments.

As can be seen in FIGS. 31-34, the battery is positioned low on the main body 3102. Due to its low positioning proximate the roller brush 3130, a weight of the battery 3410 may provide a downward force, shown in FIG. 33 by arrow 3302, on the roller brush 3130. The downward force 3302 provided by the weight of the battery 3410 (FIG. 34) may enhance a cleaning capability of the roller brush 3130 and/or reduce the need for a user to apply a downward force to the outdoor cleaning device 3100, thereby simplifying operation of the outdoor cleaning device 3100. For example, the downward force 3302 may cause the bristles of the roller brush 3130 to apply more pressure to the surface being cleaned and may allow more dirt, grease, or other substances to be removed from the surface. A weight of the fluid within the fluid tank 3110 may further increase the downward force 3302—however, the fluid within the fluid tank 3110 will decrease over time as it is dispensed during operation of the outdoor cleaning device 3100.

As shown in FIG. 31, the brush head 3130 may be positioned at a base of the main body 3102. As shown in FIG. 32, the brush head 3130 includes a plurality of bristles 3220. The brush head may be attached to the main body 3102 via a rotatable joint (e.g., the rotatable joint 440 of FIGS. 28 and 29) or another mechanism (e.g., a ball joint, etc.). In certain aspects, at least one side brush 3140 may be provided. The at least one side brush 3140 may be configured to removably attach to a longitudinal end of the brush head 3130. For example, the at least one side brush 3140 may include a shaft 3144 and the longitudinal end of the brush head 3130 may include a receptacle 3210 configured to receive the shaft 3144, as illustrated in FIG. 32. In an aspect, a release button 3310 (shown in FIG. 33) may be configured to cover the receptacle 3210 when the at least one side brush 3140 is not in use and to secure the at least one side brush 3140 to the brush head 3130, as described in more detail below. The release button 3310 may be adapted to be removably inserted or attached to the receptacle 3210 through an aperture 3204 on the at least one side brush 3140. The release button 3310 may be depressed to remove the at least one side brush from the receptacle 3210 to provide access to the receptacle 3210 and enable insertion of the shaft 3144 of the at least one side brush 3140. As shown in FIG. 32, the at least one side brush 3140 may include a plate 3146, a plurality of bristles 3142 disposed on a first side of the plate 3146 and extending outward from the plate 3146. The shaft 3144 may be disposed on a second side of the plate 3146 opposite the first side of the plate 3146 and may extend from the second side of plate 3146 in an axial direction that is perpendicular to the surface of the plate 3146. In some aspects the shaft 3144 and the receptacle 3210 may have cooperating form factors. For example, in FIG. 32 the form factor shown for the shaft 3144 is a hexagonal rod and the receptacle 3210 may have a hexagonal opening to receive the hexagonal rod. It is noted that while a hexagonal form factor is shown in FIG. 32, such description has been provided for purposes of illustration rather than by way of limitation and that other form factors may be utilized according to the concepts disclosed herein, such as square shapes, rectangular shapes, irregular shapes, etc. In an aspect, the at least one side brush 3140 may be secured into the receptacle 3210 via a snap fit, a friction fit, a compression fit, a threaded fit, etc. depending on the particular configuration of the attachment means 3142 and the receptacle 3210. An exemplary embodiment of securing elements to the brush head 3130 using the release button 3310 is described in more detail below.

As illustrated in FIG. 33, a hose 3202 may be provided. The hose 3202 may be configured to transport a first fluid to the outdoor cleaning device 3100. For example, the hose 3202 may be a water hose that brings water to the cleaning device 3100. The main body 3102 may include a hose connector or hose socket 322 for connecting the hose 3202 to the main body 3102. As described above, the outdoor cleaning device 3100 may include a mixing means for mixing the first fluid provided by the hose 3202 with a second fluid stored in the fluid tank 3110, which is shown in insert 3304. The mixing means may be disposed within the main body 3102. In an aspect, the mixing means may be a venturi, such as the venturi described above with reference to FIG. 22 and may be in fluid communication with the hose 3202 via the hose socket 322 to allow fluid transported by the hose 3202 to reach the mixing means. It is noted that utilizing a venturi to provide mixing may eliminate the need to include a pump, thereby reducing the complexity and cost of manufacturing the outdoor cleaning device 3100 and minimizing the number of components that may fail during operation. Additionally, the fluid mixing means may be in fluid communication with the fluid tank 3120, thereby allowing the mixing means to mix the fluid transported by the hose 3202 with the fluid stored in the fluid tank 3120. In aspects, a mixing controller may be provided to control mixing of different fluids, such the fluid stored in the fluid tank 3120 and the fluid transported by the hose 3202. In an aspect the mixing controller may include the control panel 324 and lever 324D, as described and illustrated above with reference to FIGS. 12, 13, and 15. The mixing controller may also enable the outdoor cleaning device 3100 to forego mixing fluids, such as to dispense only one fluid (e.g., the fluid transported by the hose 3202, the fluid stored in the fluid tank 3120, etc.). In an additional or alternative aspect, the mixing controller may also enable the outdoor cleaning device 3100 to be operated without any dispensing of fluids (i.e., a dry mode of operation). In still other aspects, the mixing controller may enable the outdoor cleaning device 3100 to be operated while only dispensing the cleaning solution stored in the fluid tank 3120, such as to dispense concentrated cleaning solution onto surfaces soiled by materials that may be difficult to clean effectively with diluted cleaning solution. In such a scenario, the concentrated cleaning solution may be dispensed and worked into the soiled surface first and then a diluted mixture of the cleaning solution and the fluid transported by the hose 3202 may be used to perform a final cleaning or the final cleaning may only utilize the fluid transported by the hose 3202. In such an implementation, the fluid tank 3120 may include a first output that is in fluid communication with the mixing means and a second output that is in direct communication with at least one nozzle.

As shown in FIG. 33, the hose 3202 may be secured in place by one or more retention components 3312. In an aspect, the one or more retention components 3312 may include straps, hooks, or other components that may be used to secure the hose 3202 in a desired orientation relative to the outdoor cleaning device 3100. In some aspects, the outdoor cleaning device 3100 may include a rubber squeegee 513, which may be attached to a rear lower portion of a guard 3150. Exemplary aspects of the guard 3150 are shown and described in more detail with reference to FIGS. 35 to 38.

Figure 35:
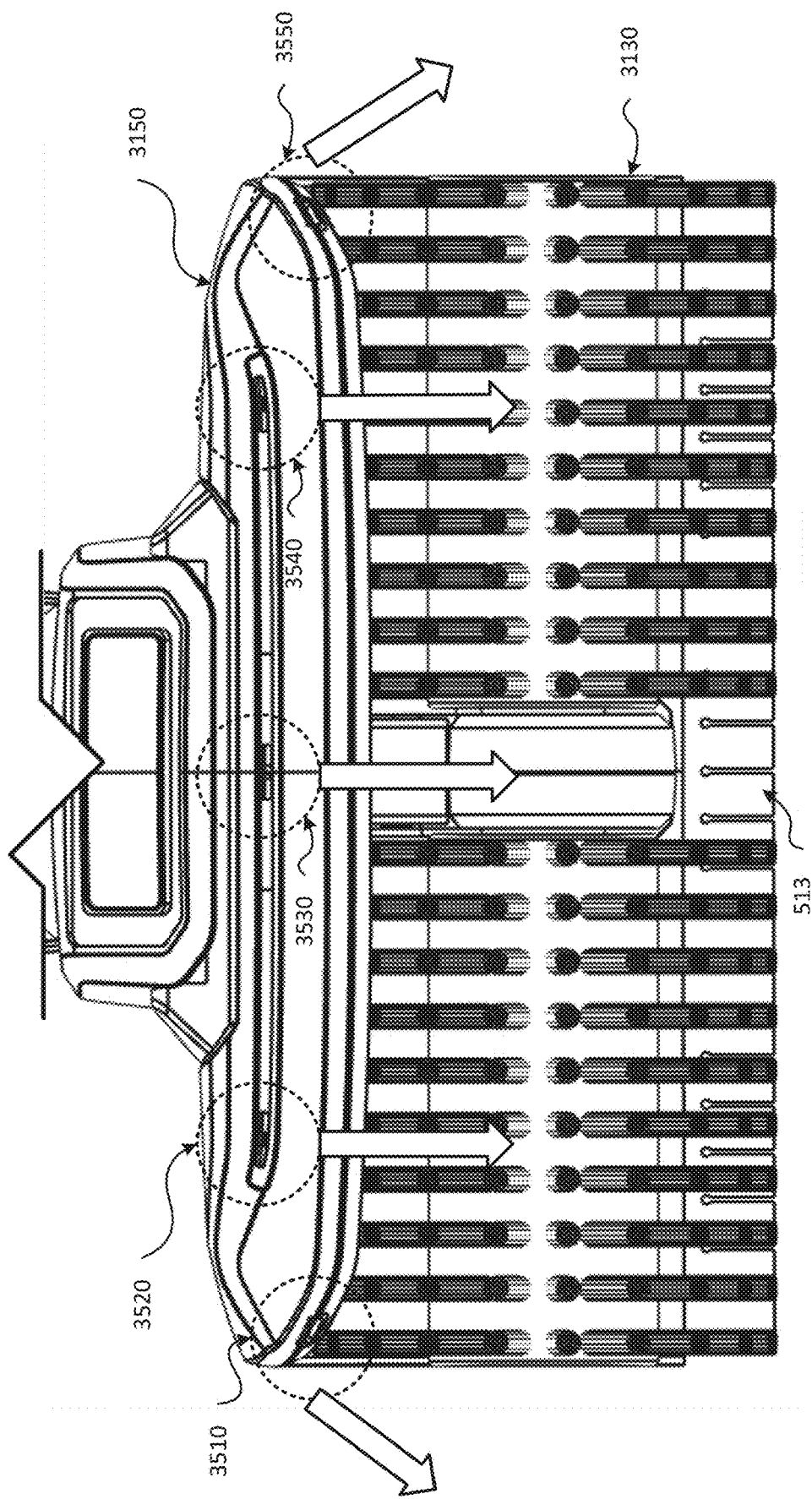
FIG. 35 is a fragmentary perspective view of the nozzles of the outdoor surface cleaning apparatus of FIGS. 31-34 showing the nozzle locations.

Referring to FIG. 35, a fragmentary perspective view of the nozzles of the outdoor surface cleaning apparatus of FIGS. 31-34 showing exemplary nozzle locations is provided. As shown in FIG. 35, the guard 3150 may at least partially surround the brush head 3130. A plurality of nozzles may be disposed on the guard 3150. The plurality of nozzles may include nozzles 3510, 3520, 3530, 3540, 3550. Each nozzle may be in fluid communication with an output of the mixing means to enable the nozzles to dispense fluids from the hose 3202 and/or the fluid tank 3120. The plurality of nozzles may be configured to spray fluids onto a surface to be cleaned, directly or indirectly. For example, as shown by the large arrows in FIG. 35, the nozzles 3520, 3530, and 3540 may spray fluids in front of the brush head 3130 and the nozzles 3510 and 3550 may spray fluids to the sides of the brush head 3130. Alternatively, the nozzles 3520, 3530, and 3540 may spray fluids to the bristles of the brush head 3130, or first to the upper surface of the guard 3150 and then to the bristles of the brush head 3130; and the nozzles 3510, 3550 may spray fluids to the bristles of the side brush 3140. In some aspects, some of the nozzles 3510, 3520, 3530, 3540, 3550 may be configured to spray fluids onto the bristles of the brush head 3130 while other ones of the 3510, 3520, 3530, 3540, 3550 may be configured to spray fluids onto the surface to be cleaned. It is noted that while FIG. 35 illustrates the plurality of nozzles as including 5 nozzles (i.e., the nozzles 3510, 3520, 3530, 3540, 3550), outdoor cleaning devices in accordance with aspects of the present disclosure may include more than 5 nozzles or less than 5 nozzles in some embodiments. Moreover, outdoor cleaning devices in accordance with the present disclosure may include a single nozzle if desired. Thus, it is to be understood that outdoor cleaning devices configured in accordance with the embodiments disclosed herein include at least one nozzle.

As explained above, the spraying of fluids may be controlled via the mixing controller, which may facilitate selectively mixing of different fluids, such as a first fluid transported by the hose 3202 and a second fluid (e.g., from the fluid tank 3120) for output via the plurality of nozzles. In a first configuration the mixing controller may be configured to control output of only the first fluid by the plurality of nozzles, in a second configuration the mixing controller may be configured to control output of mixed fluid (e.g., a fluid produced by mixing the first fluid and a second fluid) by the plurality of nozzles, and in a third configuration the mixing controller may be configured to prevent any outputting of fluids by the plurality of nozzles (i.e., a dry-run or dry operation mode). It is noted that while 3 modes of operation (i.e., 1 fluid, 2 fluid, and no fluid) have been described, outdoor cleaning devices in accordance with embodiments of the present disclosure may include mixing controllers that enable operation in more than three modes (e.g., the dispensing of cleaning solution only mode described above) or less than three modes if desired (e.g., a water only mode, a water and cleaning solution mixture mode, but no dry mode).

Figure 36:
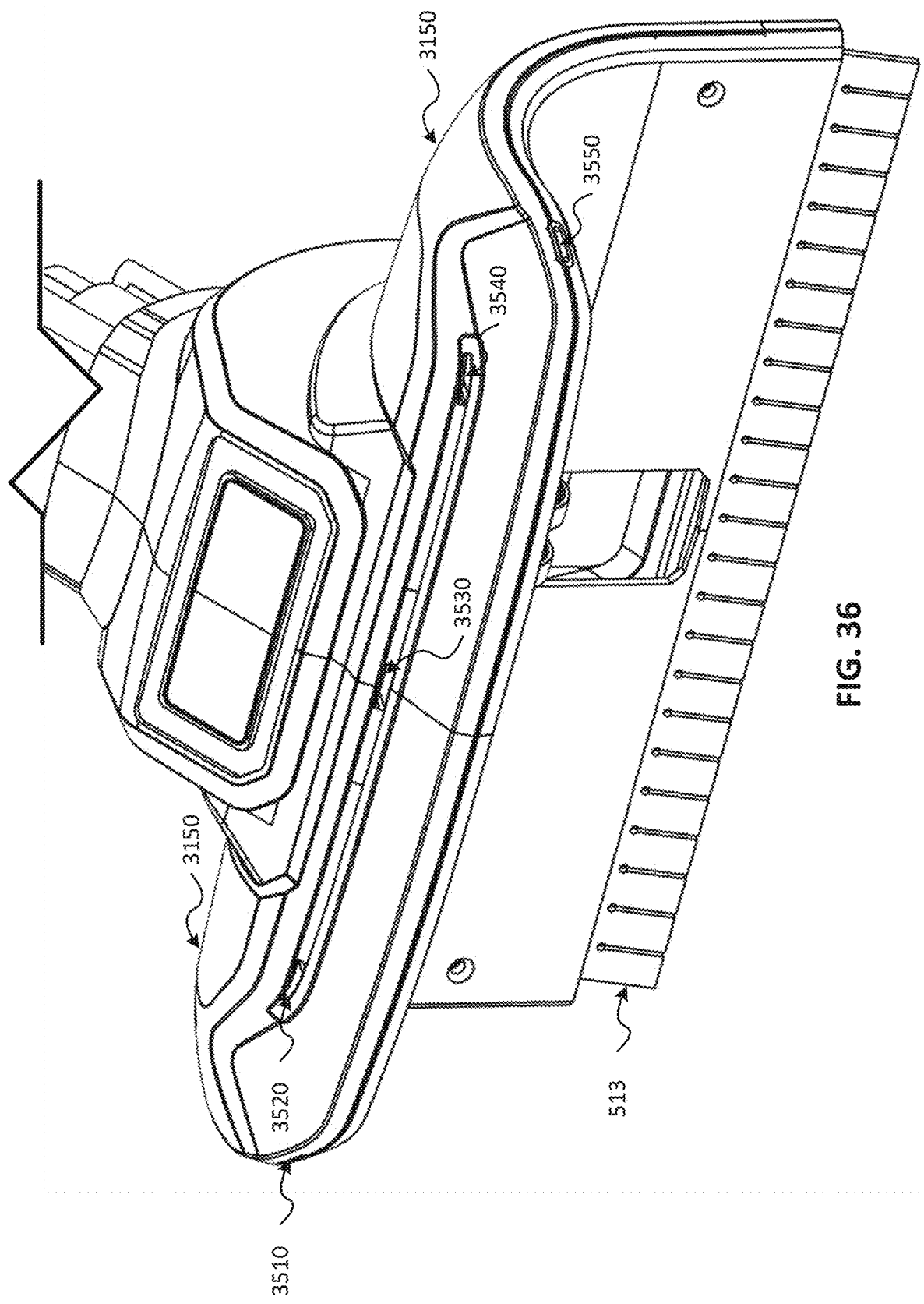
FIG. 36 is a fragmentary perspective view illustrating additional aspects of the nozzles of the outdoor surface cleaning apparatus of FIGS. 31-34 showing the nozzle locations.
Figure 37:
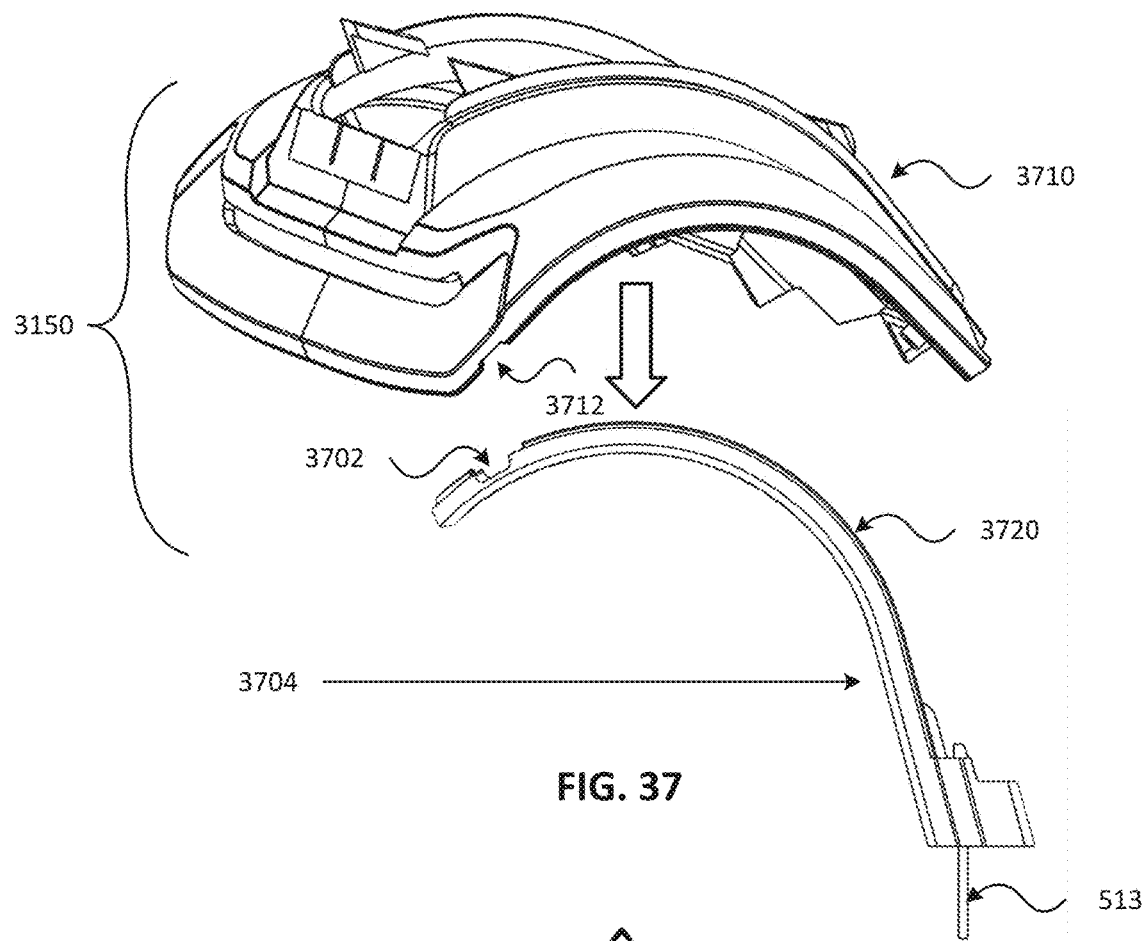
FIG. 37 is a fragmentary perspective view illustrating additional aspects of the nozzles of the outdoor surface cleaning apparatus of FIGS. 31-34 showing the nozzle locations.
Figure 38:
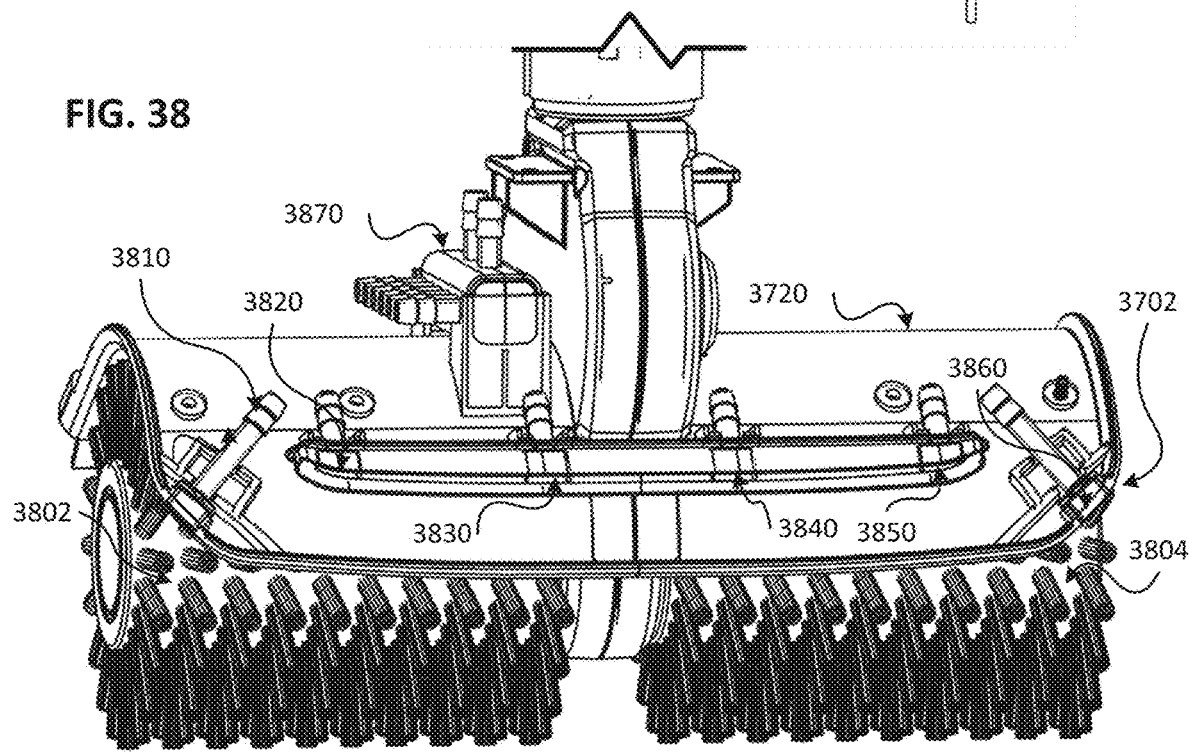
FIG. 38 is a fragmentary perspective view illustrating additional aspects of the nozzles of the outdoor surface cleaning apparatus of FIGS. 31-34 showing the nozzle locations.

Additional aspects of the guard 3150 and the plurality of nozzles of FIG. 35 are shown in FIG. 36. For example, FIG. 36 illustrates the orientation of the nozzle 3150 and how it points to the side (at least partially) of the outdoor cleaning device 3100. The nozzle 3510 may have an orientation similar to the orientation of the nozzle 3550. As illustrated in FIG. 37, the guard 3150 may be formed as a multi-part guard. The multi-part guard may include an inner guard cover 3720 and an outer guard cover 3710. The inner guard cover 3720 and an outer guard cover 3710 together defines an inner space therein. The inner space may facilitate routing of other components of the outdoor cleaning devices of embodiments, such as tubing for establishing fluid communication between one or more of the nozzles and the mixing device and the hose socket, as described in more detail with reference to FIG. 64.

Additionally, the inner space between the inner guard cover 3720 and the outer guard cover 3710 may include additional structures that may be utilized to secure or mount components of the outdoor cleaning device in place, such as one or more of the nozzles. For instance, a peripheral edge of the inner guard cover 3720 may define grooves 3702 and a peripheral edge of the outer guard cover 3710 may define grooves 3712. The grooves 3702 of the inner guard cover 3720 and the grooves 3712 of the outer guard cover 3710 may be configured to secure the plurality of nozzles in place. To illustrate and referring to FIGS. 65-67, a series of images demonstrating features for securing nozzles in place using an inner guard cover and an outer guard cover in accordance with aspects of the present disclosure are shown. As shown in FIG. 65, the outer guard cover 3710 includes the groove 3712, a cradle 6510, and a notch 6512. Similarly, FIG. 65 illustrates the lower guard cover 3720 with the groove 3702, a cradle 6520, and a notch 6522. A nozzle 6530 is shown and includes a shaft 6532, a retention ring 6534, a barbed connector 6536, a tip portion 6538, and an opening 6540. The barbed connector 6536 may be configured to secure tubing (e.g., tubing transporting a fluid received from the mixing device or a fluid received from the hose connected to the hose socket 322) to the nozzle 6530, as described and illustrated in more detail with respect to FIG. 64 below. It is noted that FIG. 65 shows the nozzle 6530 as including the barbed connector 6536 for purposes of illustration rather than by way of limitation and that other types of connectors (e.g., threaded connectors, quick connect fittings, etc.) may be used to secure tubing to the nozzle 6530 and establish fluid communication between the nozzle 6530 and one or more sources of fluids. The retention ring 6534 may be formed as a ridge that extends perpendicularly from an external surface of the nozzle 6530 proximate the tip portion 6538. The ridge may be present along the entirety of the external surface of the nozzle 6530 or may be only be present on one side (e.g., a side proximate the notch 6512 or 6522) of the nozzle 6530, two adjacent or opposing sides (e.g., top and bottom, left and right sides, top and left sides, top and right sides, bottom and left sides, bottom and right sides, etc.) of the nozzle 6530, or on three sides (e.g., top/bottom/left sides, top/bottom/right sides, top/left/right sides, bottom/left/right sides, etc.).

Figure 65:
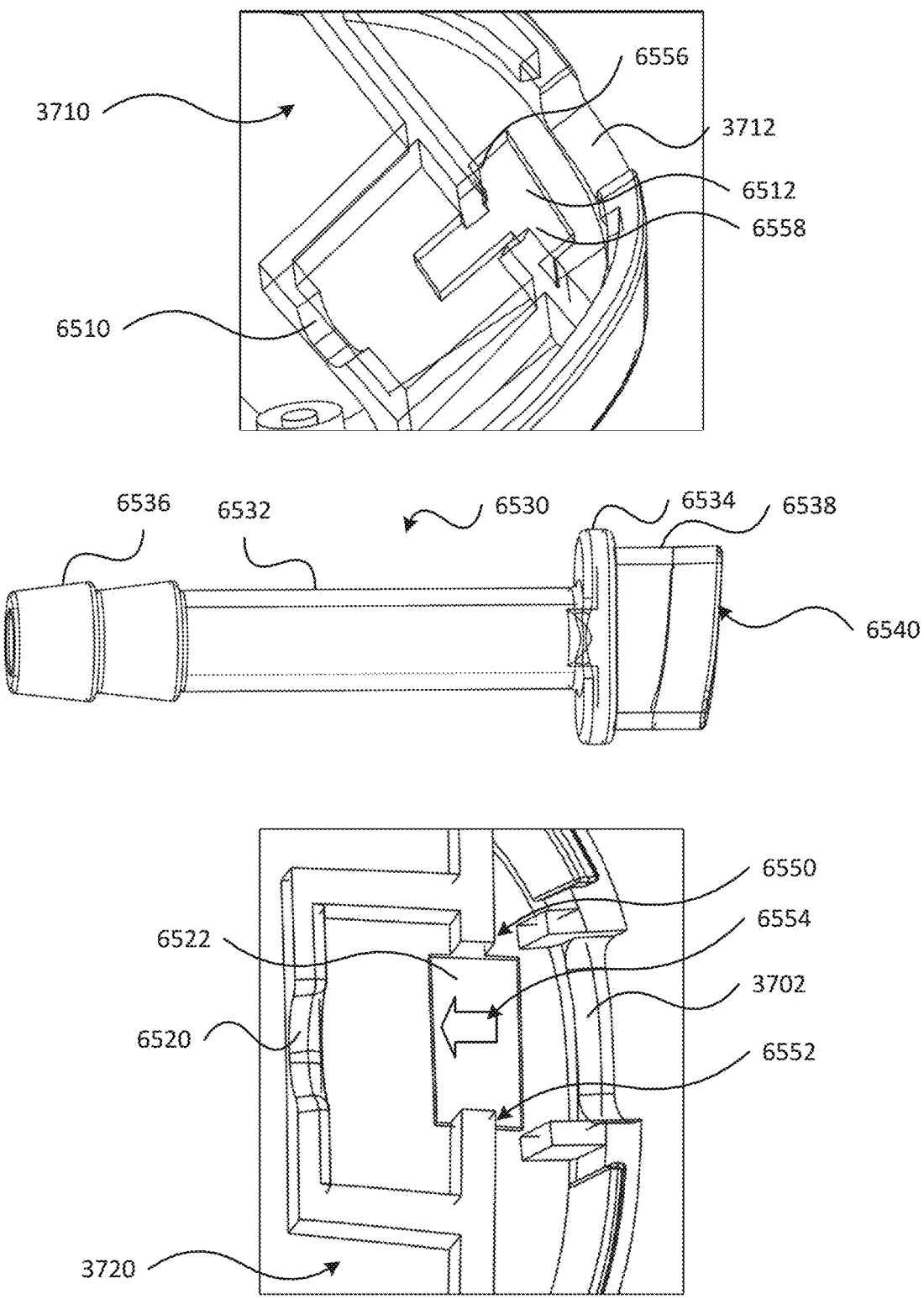
FIG. 65 shows images illustrating exemplary aspects of securing a nozzle to a guard cover of an outdoor surface cleaning apparatus in accordance with certain embodiments of the present disclosure.
Figure 66:
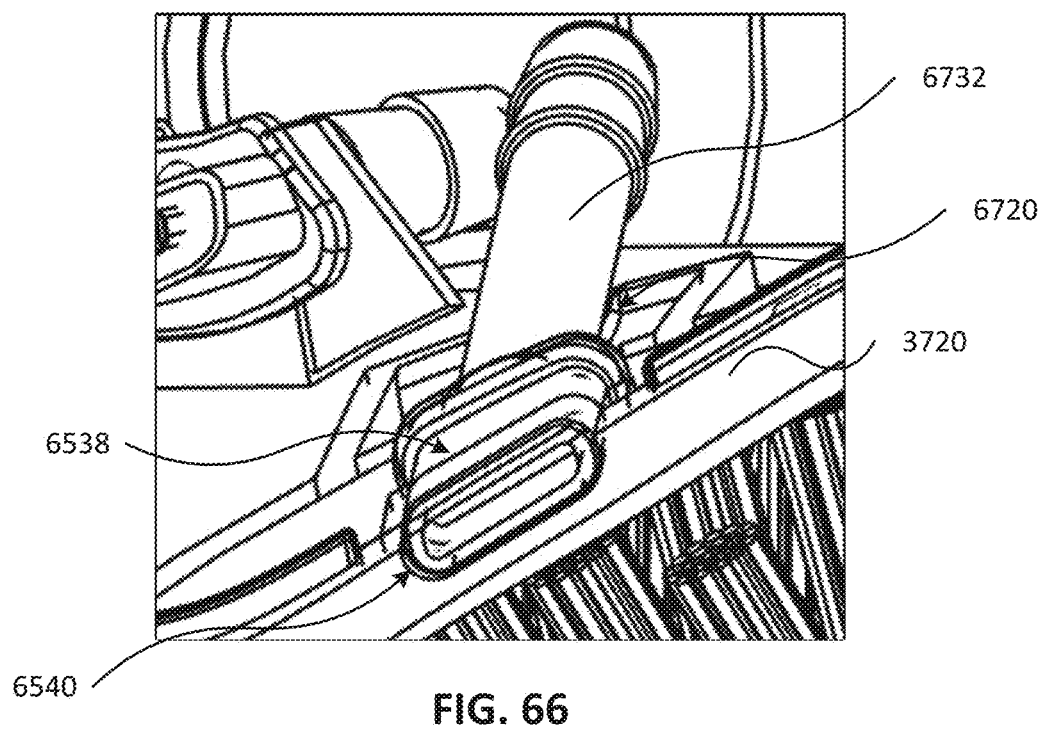
FIG. 66 shows images illustrating exemplary aspects of securing a nozzle to a guard cover of an outdoor surface cleaning apparatus in accordance with certain embodiments of the present disclosure.
Figure 67:
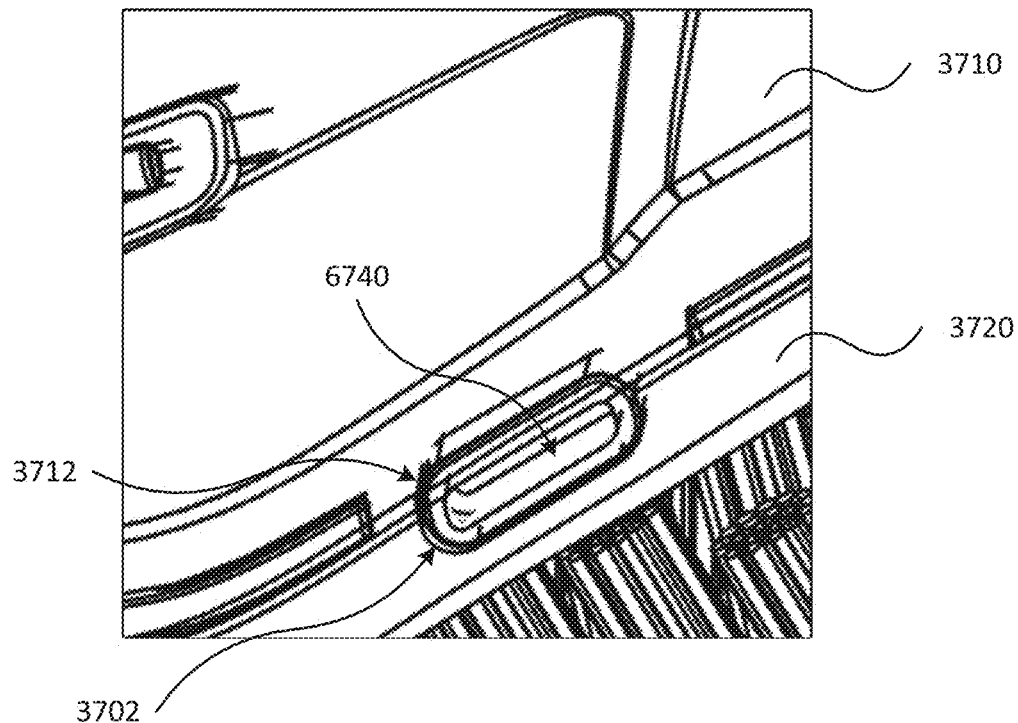
FIG. 67 shows images illustrating exemplary aspects of a nozzle secured within a guard cover of an outdoor surface cleaning apparatus in accordance with certain embodiments of the present disclosure.

The retention ring 6534 may be configured to rest within the notch 6512 and the notch 6522, as shown in FIG. 66, and a portion of the shaft 6532 may rest within the cradles 6510, 6520. It is to be appreciated that, as shown in FIGS. 66-67, when the guard cover 3150 is formed by securing the inner guard cover 3720 to the outer guard cover 3710, the shaft 6532 of the nozzle 6530 may be sandwiched between the cradles 6510, 6520 and the retention ring 6534 may be sandwiched between the notches 6512, 6522. Additionally, the tip portion 6538 may be sandwiched between the grooves 3702, 3712 such that the opening 6540 of the nozzle is flush with an exterior surface of the inner guard cover 3720 and the outer guard cover 3710, extends slightly beyond (e.g., 1 mm, 2 mm, etc.) the exterior surface of the inner guard cover 3720 and the outer guard cover 3710, or is recessed slightly inside (e.g., 1 mm, etc.) of the grooves 3702, 3712. Securing the nozzle 6530 within the guard 3150 in this manner may prevent the nozzle 6530 from moving during operation of the outdoor cleaning device. It is also noted that while FIGS. 65-67 illustrate the above-described concepts with respect to a single nozzle 6530, the inner guard cover 3720 and the outer guard cover 3710 may be configured with different sizes and shapes of grooves, notches, and cradles to accommodate nozzles of different shapes and sizes, including but not limited to multi-nozzle devices or assemblies (e.g., the multi nozzle device or assembly of FIG. 38 that includes the nozzles 3820, 3830, 3840, 3850). As shown in FIG. 67, once seated in the proper orientation (e.g., the retention ring being disposed in the notches of the inner and outer guard cover and the shaft being disposed on the cradles of the inner and outer guard cover), the tip portion 6538 may extend to, almost to, or beyond, the peripheral edge of the cover 3150 so as to allow the opening 6540 to dispense liquids delivered to the nozzle 6530 as described herein.

It is noted that the terms "top," "bottom," "left," and "right" are used to illustrate potential locations of the ridge(s) configured to rest at least partially within the notches 6512, 6522 relative to each other. For example, the "bottom" side of the nozzle 6530 may be a side situated proximate the inner surface of the inner guard cover 3720, such that a ridge resting within the notch 6522 is located on the "bottom" of the nozzle 6530, and the "top" side of the nozzle 6530 may be a side situated proximate the outer guard cover 3710, such that a ridge resting within the notch 6512 is located on the "top" of the nozzle. Alternatively, the "bottom" side of the nozzle 6530 may be a side situated proximate the inner surface of the outer guard cover 3710, such that a ridge resting within the notch 6512 is located on the "bottom" of the nozzle 6530, and the "top" side of the nozzle 6530 may be a side situated proximate the inner guard cover 3720, such that a ridge resting within the notch 6522 is located on the "top" of the nozzle 6530. It is also noted that ridges disposed on one or more of the "sides" of the nozzle 6530 may be configured to prevent the nozzle 6530 from sliding back into the interior space between the inner guard cover 3720 and the outer guard cover 3710 as indicated by arrow 6554. For example, the "side" ridges may extend outwardly from the exterior surface of the nozzle 6530 and sit between ridges 6550, 6552 and the peripheral edge of the inner guard cover 3720. The side ridges of the nozzle 6530 may come into contact with the ridges 6550, 6552, thereby limiting movement of the nozzle in the direction indicted by arrow 6554. It is noted that the outer guard cover 3710 may be similarly configured, such that the ridges 6556, 6558 may similarly limit movement of the nozzle 6530 in the direction indicated by the arrow 6554.

Figure 69:
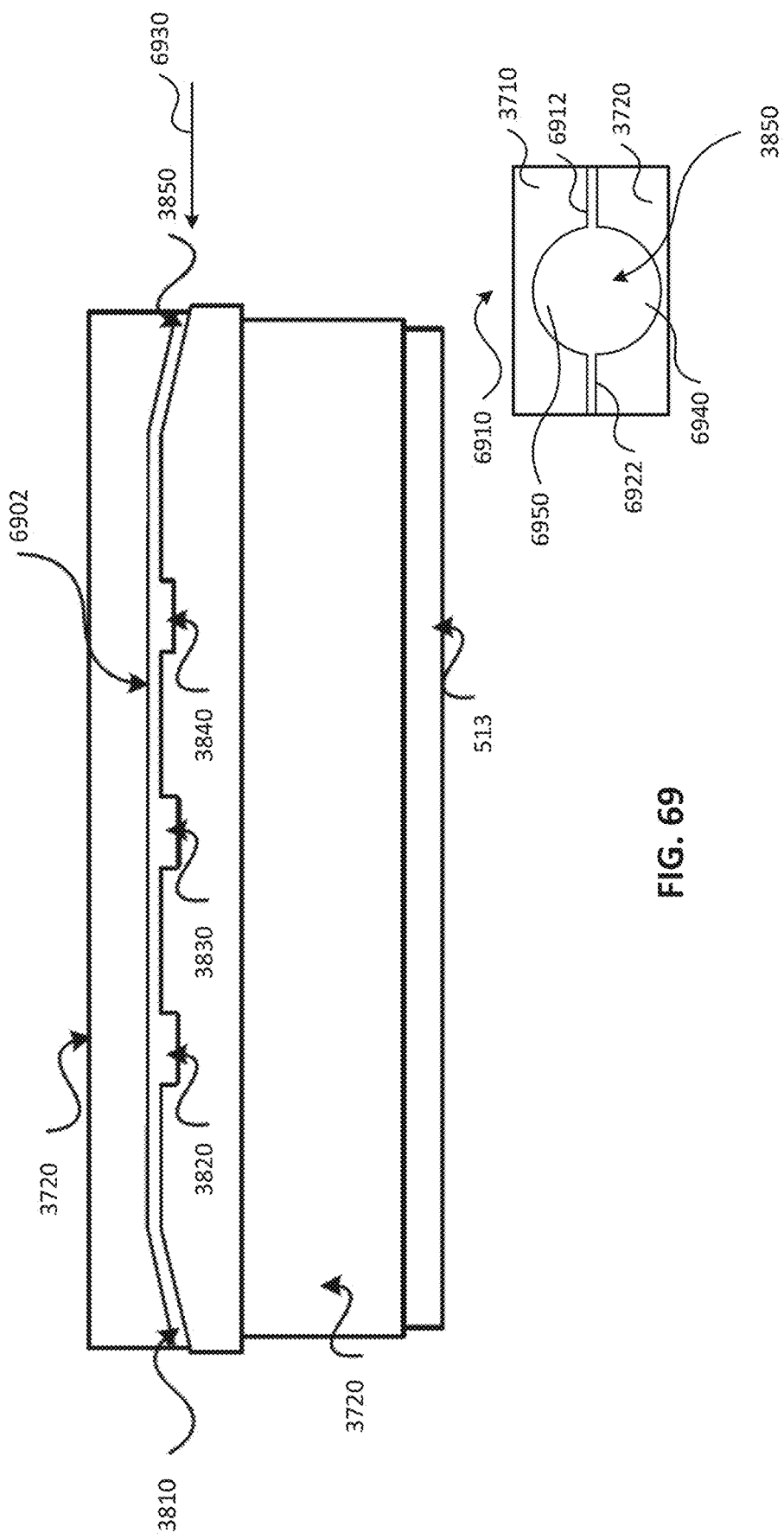
FIG. 69 is a diagram illustrating an exemplary technique for integrating nozzles within the structure of a guard cover of an outdoor cleaning device in accordance with certain embodiments of the present disclosure.

It is noted that while the description above (and FIG. 64 described below) illustrate nozzles that may be connected to tubing to deliver fluids from the fluid branching device 3870 to each nozzle, in some aspects the nozzles may be formed via grooves formed on the interior surfaces of the inner guard cover 3720 and the outer guard cover 3710. For example and referring to FIG. 69, the inner cover 3720 of FIG. 37 is shown from the perspective of looking down the length of arrow 3704 of FIG. 37 (i.e., viewing the inner cover 3720 from the front). As shown in FIG. 69, a plurality of fluid channels 6902 may be formed by grooves disposed on a top surface 6922 of the inner cover 3720 and/or a lower surface 6912 of the outer guard cover 3710. Each nozzle may correspond to an end of one of the fluid channels 6902. Thus, when the outer guard cover 3710 is secured to the inner guard cover 3720, the fluid channels 6902 may form fluid pathways that transport fluids (e.g., the output of the mixing device, the hose socket, etc.) to the nozzle(s) defined by the openings at the end of the fluid channels formed by the grooves disposed on the inner guard cover 3720 and outer guard cover 3710. It is noted that insert 6910 shows a partial view of the nozzle 3850, viewed from the direction indicated by arrow 6930, that is formed when the inner guard cover 3720 is secured to the outer guard cover 3710. For example, insert 6910 shows a groove 6940 formed on the upper surface 6922 of the inner guard cover 3720 and a groove 6950 formed on a lower surface 6912 of the outer guard cover 3710. In some aspects, the grooves forming the fluid pathways may be disposed on only one of the guard covers, rather than on both, resulting in smaller fluid pathways, which may provide greater pressure as the fluid exits the nozzle(s). It is to be appreciated that the inner guard cover 3720 and the outer guard cover 3710 are shown in insert 6910 as being separated by a small space for purposes of emphasizing the upper surface 6922 of the inner guard cover 3720 and the lower surface 6912 of the outer guard cover 3710 and that the inner guard cover 3720 and the outer guard cover 3710 may not be separated when secured together to form the cover 3150. However, in some aspects the inner guard cover 3720 and the outer guard cover 3710 may be configured to provide at least some space between them when connected. For example, a gasket or other type of sealing mechanism may be placed between the inner guard cover 3720 and the outer guard cover 3710 in order to ensure that the fluid pathways are sealed and prevent fluids from leaking between interior space between the inner guard cover 3720 and the outer guard cover 3710.

Figure 39:
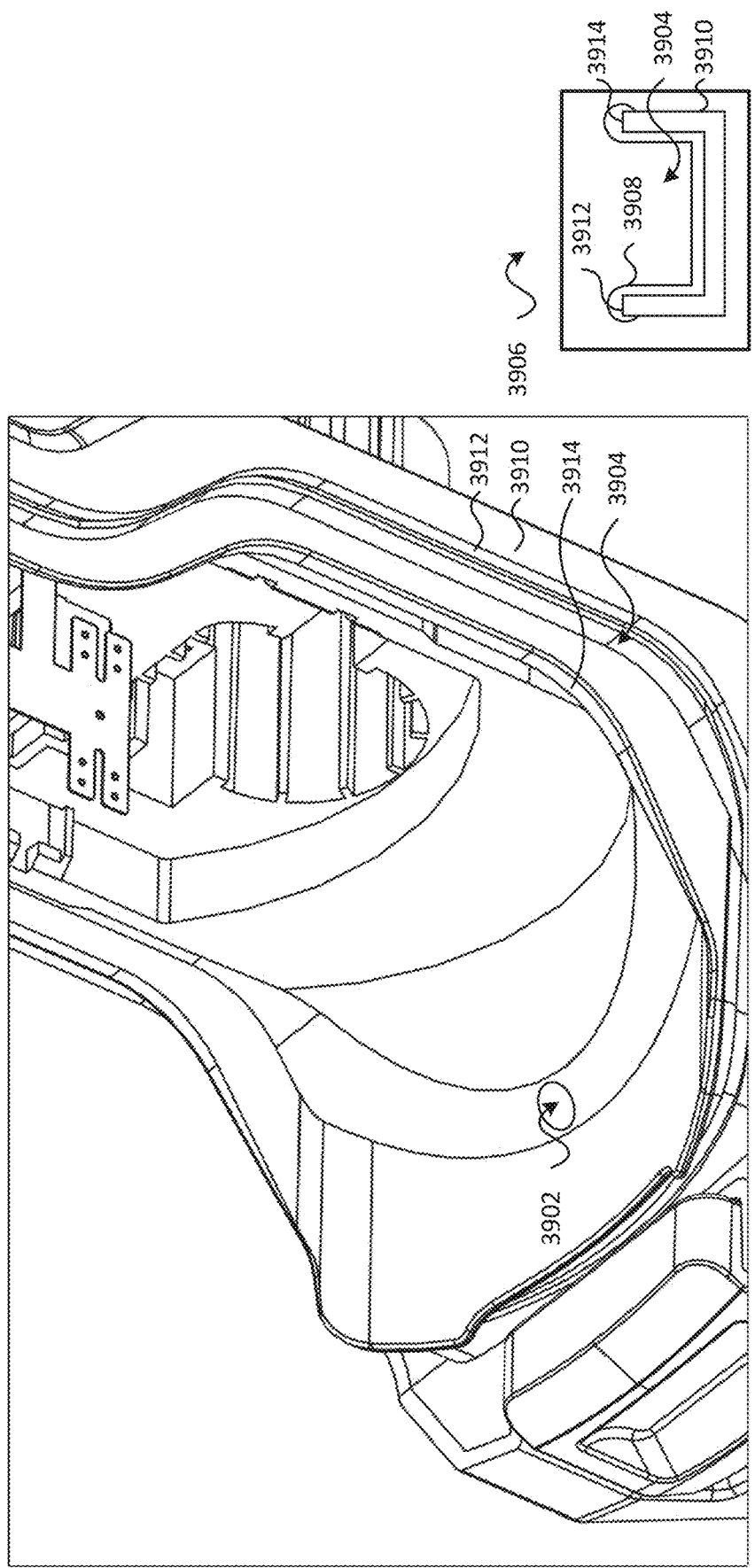
FIG. 39 is a fragmentary perspective view illustrating aspects of a battery compartment of the outdoor surface cleaning apparatus of FIGS. 31-34 showing the nozzle locations.

Referring to FIG. 39 is a fractional view of a battery compartment of an outdoor cleaning device in accordance with aspects of the present disclosure. As described above, the outdoor cleaning device 3100 may include a battery compartment configured to receive a battery. The outdoor cleaning device 3100 may include a drain hole 3902 within the battery compartment of the main body structure 3108 to enable any liquids that do enter the battery compartment to be drained quickly and prevent damage to the battery or other components. The drain hole 3902 may connect to a drain line that allows any accumulated liquids to be removed from the battery compartment rapidly and minimize the chances that the battery 3410 is damaged. For example, the drain line may be configured to allow any collected fluids to exit the outdoor cleaning device 3100 proximate the cover 3150. Any fluids exiting the drain line may then roll off of the cover 3150.

It is noted that the drain hole 3902 may be provide in addition to, or as an alternative to, the seal or gasket described above that may be provided on the edge of the battery cover 3120 or around the edge of the battery compartment. For example and as shown in FIG. 39, at 3906, a channel or groove 3904 is shown. The channel 3904 may be formed by portions of the housing 3910 forming the battery compartment, such as channel walls 3912 and 3914. The channel 3904 may completely surround the battery compartment. The channel 3904 itself may prevent at least to some ingress of water into the battery compartment. As shown at 3906, a seal or gasket 3908 may be disposed within the channel 3904. The seal or gasket 3908 may be formed of a soft material, such as rubber, and when the battery cover 3120 is put in place (and locked via the battery cover locking mechanism 3122) it may press against the seal or gasket 3908 to form a water proof seal around the battery compartment and prevent liquids from entering into the battery compartment during operation of the outdoor cleaning device 3100. The seal or gasket 3908 may be formed within the channel 3904 via an over molding process where the soft material is molded onto the portion of the housing 3910 forming the channel 3904. Alternatively, the seal or gasket 3908 may be a standalone component that may be placed within the channel 3904 and held in place via a compression fit and by the battery cover 3120 once secured into place.

Figure 41:
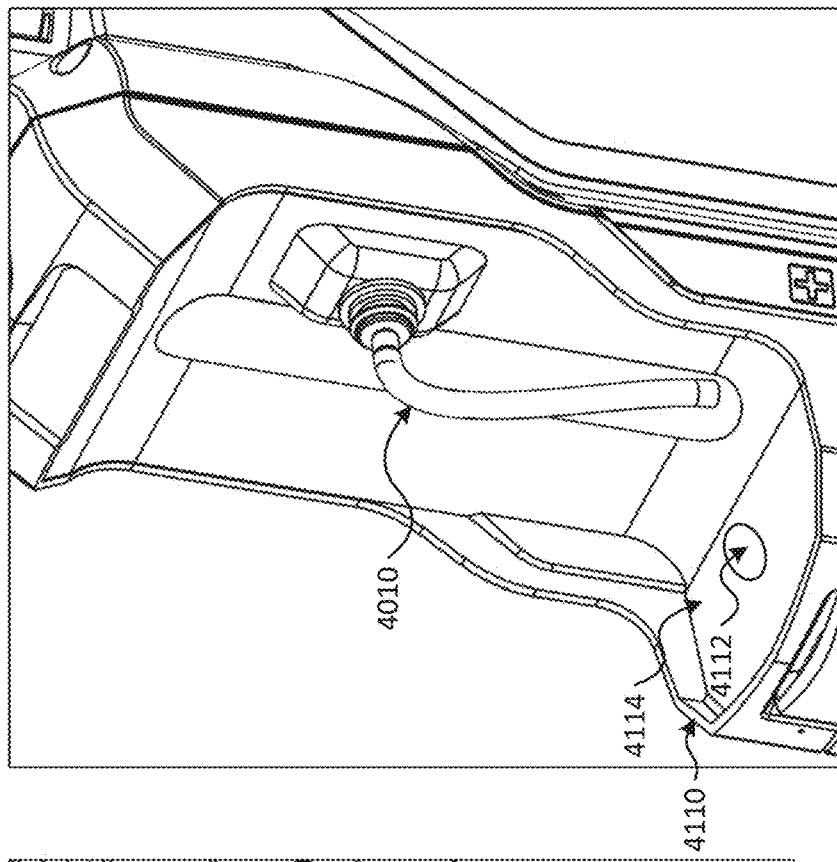
FIG. 41 is a fragmentary perspective view illustrating additional aspects of a fluid tank of the outdoor surface cleaning apparatus of FIGS. 31-34 showing the nozzle locations.
Figure 40:
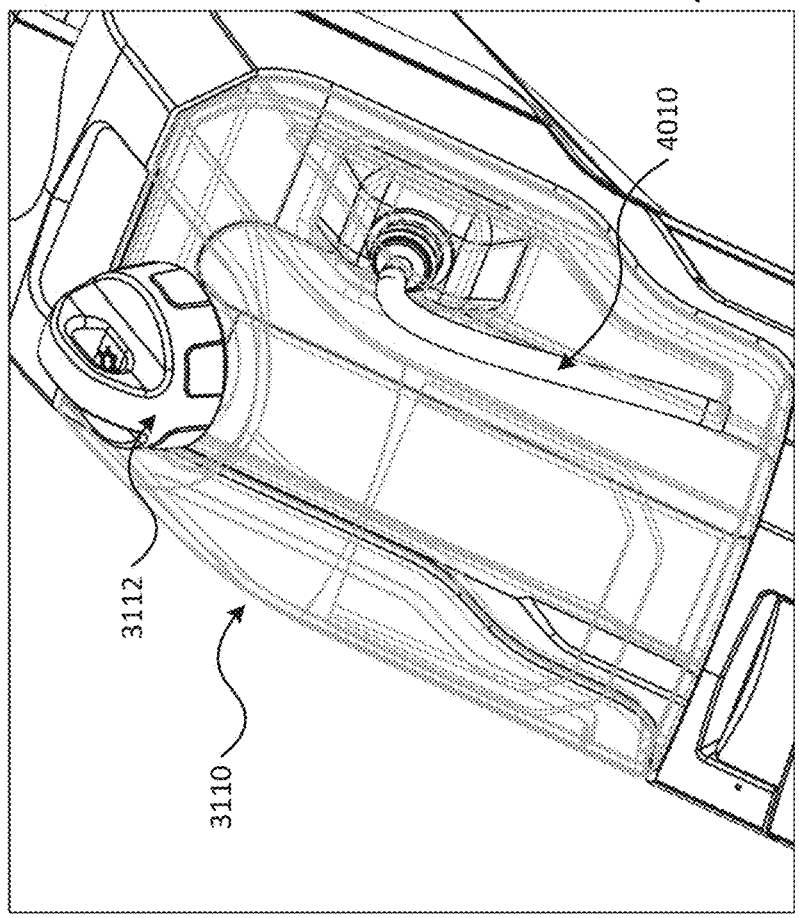
FIG. 40 is a fragmentary perspective view illustrating aspects of a fluid tank of the outdoor surface cleaning apparatus of FIGS. 31-34 showing the nozzle locations.

Referring to FIGS. 40 and 41, additional aspects of the fluid tank are shown. The fluid tank 3110 (shown as transparent to illustrate internal aspects of the fluid tank) may include a drain straw 4010 that allows fluid from within the fluid tank 3110 to be removed, such as via the mixing device or for direct delivery via the plurality of nozzles. In an aspect, a volume of the fluid tank 3110 may correspond to a battery life of the battery 3410 such that the outdoor cleaning device 3100 may be operable to continuously dispense a mixture of a first fluid (e.g., a fluid transported by the hose 3202) and a second fluid (e.g., a fluid stored in the fluid tank 3110) until the fluid tank 3110 is empty. In certain embodiments, the fluid tank has a volume of 0.3 L to 2 L or 0.5 L to 1 L. As shown in FIG. 41, a fluid tank interface may be provided to allow the fluid tank 3110 to be secured to the main body 3102. The fluid tank interface may include a recessed region 4114 surrounded by a raised lip 4110. The recessed region 4114 may receive the fluid tank or a portion thereof (as shown in FIG. 40) and the raised lip 4110 may help secure the fluid tank 3110 in position during operation of the outdoor cleaning device 3100. A drain hole 4112 may be provided at the base of the recessed region to allow any spilled liquids (e.g., liquids spilled during filling of the fluid tank 3110 or other liquids). Additional mechanisms may also be provided to secure the fluid tank 3110 in place, such as a clamping mechanism (e.g., buckle 3430 of FIG. 34).

Figure 42:
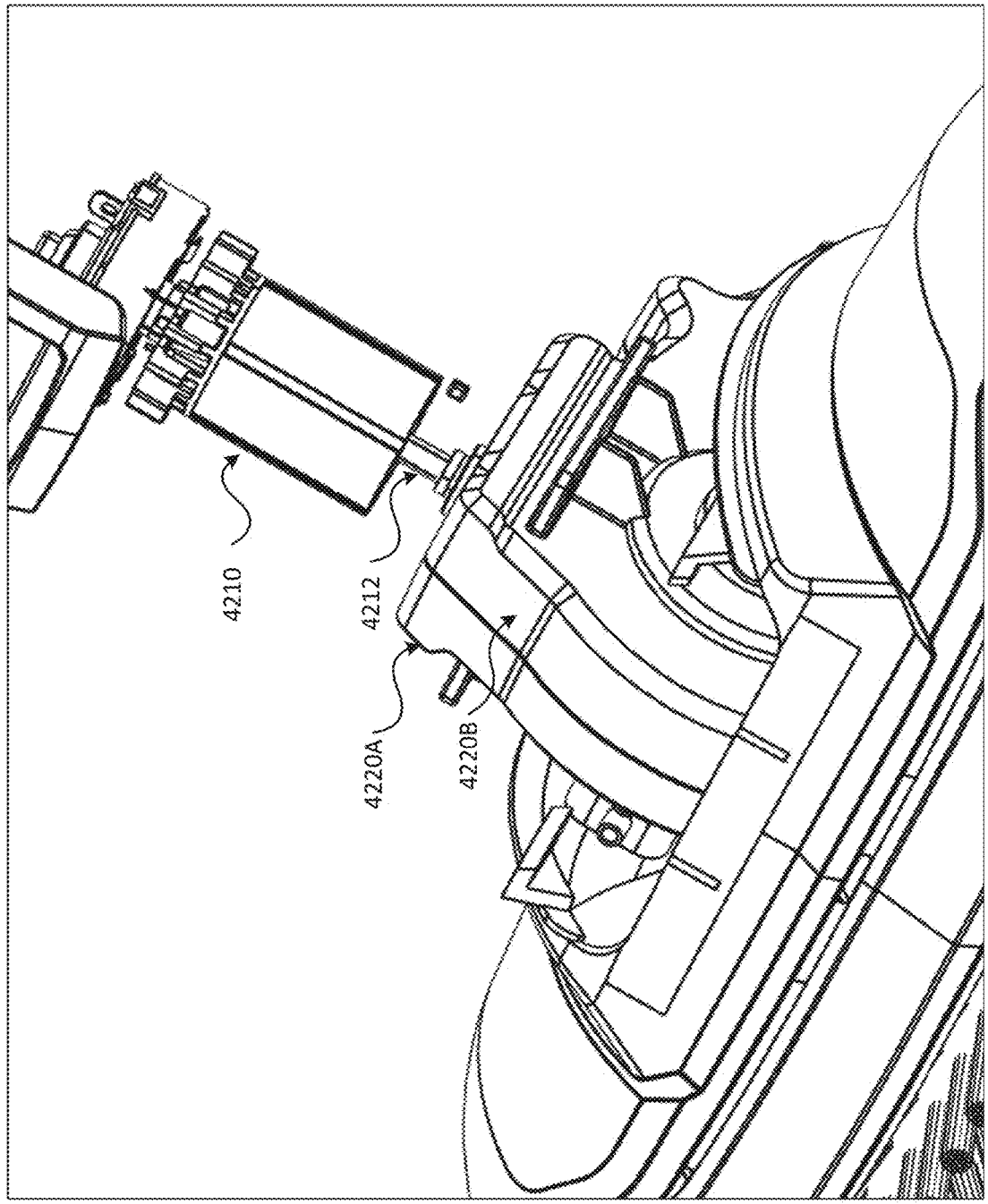
FIG. 42 is a fragmentary perspective view illustrating aspects of a driving means of the outdoor surface cleaning apparatus of FIGS. 31-34.
Figure 45:
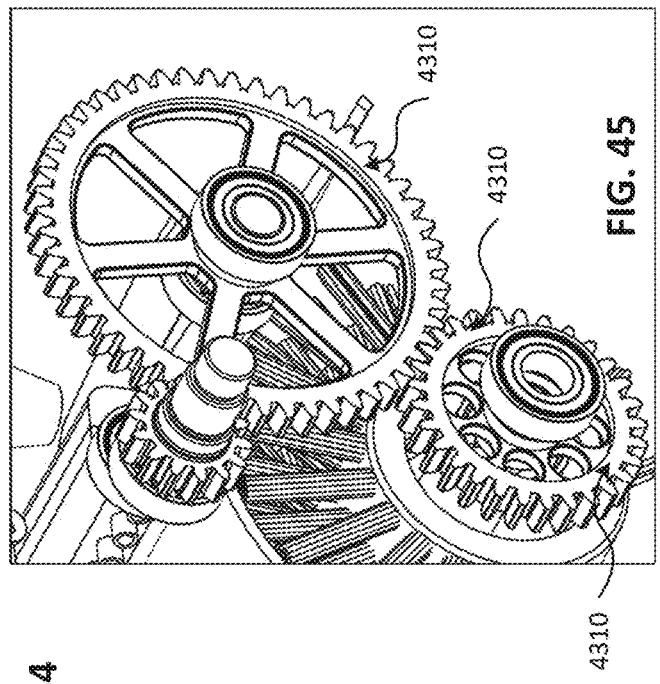
FIGS. 43-45 are fragmentary perspective views illustrating additional aspects of the driving of the outdoor surface cleaning apparatus of FIG. 42.
Figure 44:
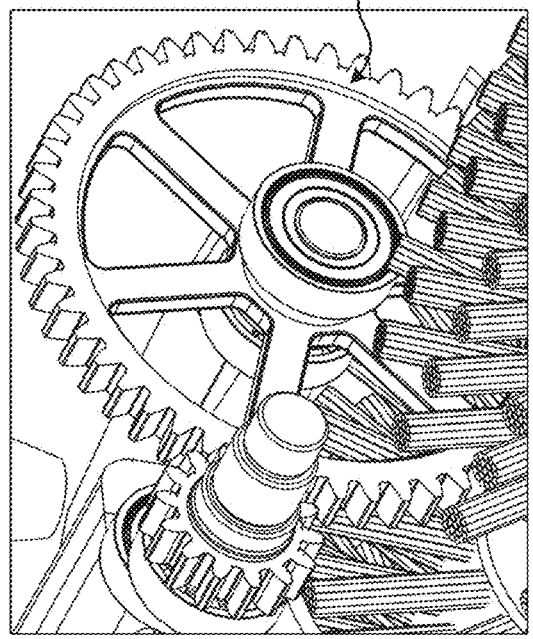
Figure 43:
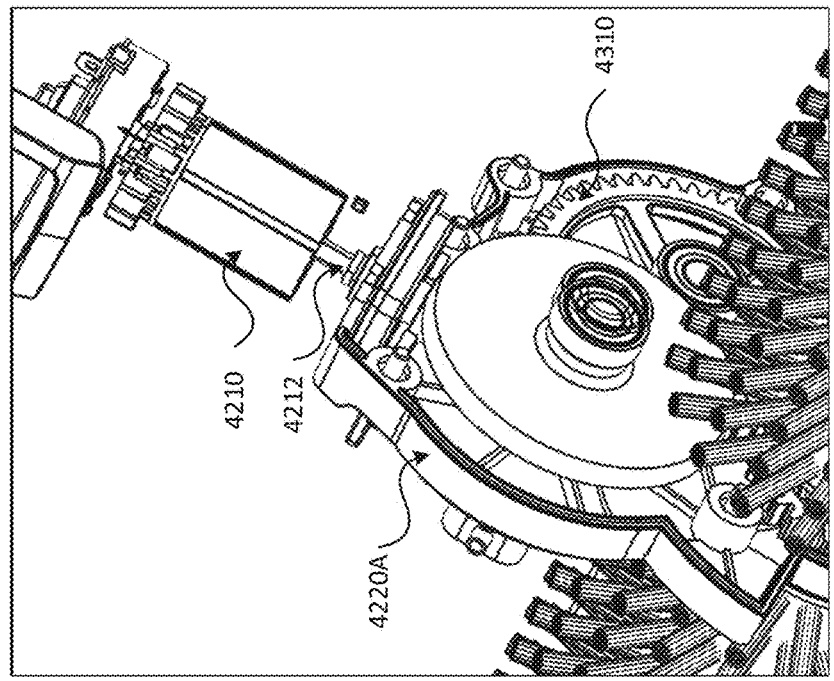

Referring to FIG. 42, aspects of a driving means for providing a driving force to the brush head of an outdoor cleaning device in accordance with aspects of the present disclosure is shown. In some embodiments, the driving means may include a motor 4210, a transmission, and a driveshaft 4212. In FIG. 42, the transmission may include a gear chain that may be protected by a cover that includes a left-side cover 4220A and a right-side cover 4220B. FIGS. 43 to 45 illustrate aspects of a gear chain transmission that includes a plurality of gears 4310. The plurality of gears may enable the motor 4210 to be disposed a threshold distance from the brush head 3130. The plurality of gears may also allow a larger torque output to the roller brush. For example, the plurality of gears of the gear chain may span at least the threshold distance, which may enable the motor 4210 to be disposed further away from the brush head 3130 in order to mitigate damage to the motor by backsplash of the fluid sprayed by the plurality of nozzles as the fluid is swept by the bristles of the brush head 3130. In contrast to the gear chain of FIGS. 43-45, the driving means may include the motor 4210 and a gear and shaft transmission. The gear and shaft transmission may include one or more gears, such as a gear 4710 and a gear 4712, and a shaft 4720. The shaft 4720 may allow the power or driving force generated by the motor 4210 to be delivered to the brush head 3130 while allowing the motor 4210 to be located further away, such as a threshold distance that may prevent damage to the motor 4210 from water splashed by the brush head 3130 during cleaning. In some embodiments, the distance between the connection between the motor 4210 and the driveshaft 4212 and the longitudinal axis of the brush head may be 104 mm. The brush head 3130 may have a radius of 51 mm. In such an embodiment, the threshold distance for distancing the motor 4210 from the brush head 3130 may be 53 mm. It is noted that while separating the motor 4210 from the brush head 3130 by the threshold distance and providing various covers (e.g., the inner guard cover 3720, the outer guard cover 3710, the left-side cover 4220A, and the right-side cover 4220B) may minimize the likelihood that liquids damage the motor 4210 and the mechanisms for transferring power generated by the motor 4210 to the brush head 3130 (e.g., the driveshaft 4212, gear chain, etc.), additional mechanisms may also be provided by outdoor cleaning devices configured in accordance with the present disclosure, as described in more detail with reference to FIGS. 63A-63C below.

Referring to FIGS. 48-53, partial views illustrating aspects of the brush head 3130 are shown. FIG. 48 illustrates a portion of the brush head 3130 and more particularly one of the roller brush portions 3802, 3804 of FIG. 38. The roller brush portions 3802, 3804 may include a cylindrical member 4810 to which bristles may be attached. It is noted that a second roller brush may be disposed proximate a first end 4812 of the cylindrical member 4810. As shown in more detail in FIG. 49, the cylindrical member 4810 may be hollow to allow an axial locking member 4830, a rotational locking member 4910, a release button 3310, and an output shaft 4920 to be inserted into the cylindrical member 4810. The output shaft 4920 may be inserted through the rotational locking member 4910 such that a distal end of the output shaft 4920 extends from a distal end 5102 of the rotational locking member 4910, as shown in FIG. 51. The portion of the output shaft 4920 extending beyond the distal end 5102 may include a conical end 5110 and an annular groove 5120. The conical end 5110 and the annular groove 5120 may be configured to secure the output shaft 4920 to the axial locking member 4830, as described and illustrated in more detail with respect to FIGS. 58-64. As shown in FIG. 52, the output shaft 4920 may include a D shaft portion 5220 having a flat surface 5210, as shown in cross-section 5302 of FIG. 53.

Figure 57A:
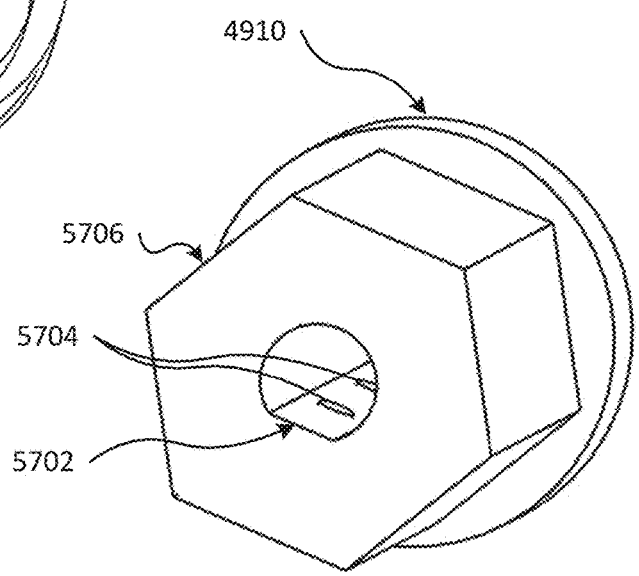

The D shaft portion 5220 may be configured to interface with a D shaped borehole 5702 extending axially through the rotational locking member 4910, as shown in FIG. 57A. In an aspect, one or more apertures 5704 extending perpendicular to a longitudinal axis of the rotational locking member 4910 may be provided. The one or more apertures 5704 may be configured to align with aperture 5212 on the D shaft portion 5220 of the output shaft 4920. When provided, one or more pins or rods may be inserted through the apertures 5212 and 5704 to secure the output shaft 4920 to the rotational locking member 4910. To provide additional structural integrity and enhance the rotational force delivered to the roller brush portions 3802, 3804, the rotational locking member 4910 may have a hexagonal form factor 5706 that may be configured to mate with a hexagonal opening on the roller brush portions 3802, 3804, as described and illustrated with reference to FIG. 32. It is noted that the hexagonal opening on the roller brush portions 3802, 3804 may be disposed at the first end 4812 of the cylindrical member 4810. The hexagonal form factor may aid in the locking of the rotational locking member 4910 in place and drive the rotation of the roller brush portions 3802, 3804. Similarly, the hexagonal form factor may also enable the cylindrical member 4810 to transfer the rotational force to the axial locking member 4930.

Figure 54:
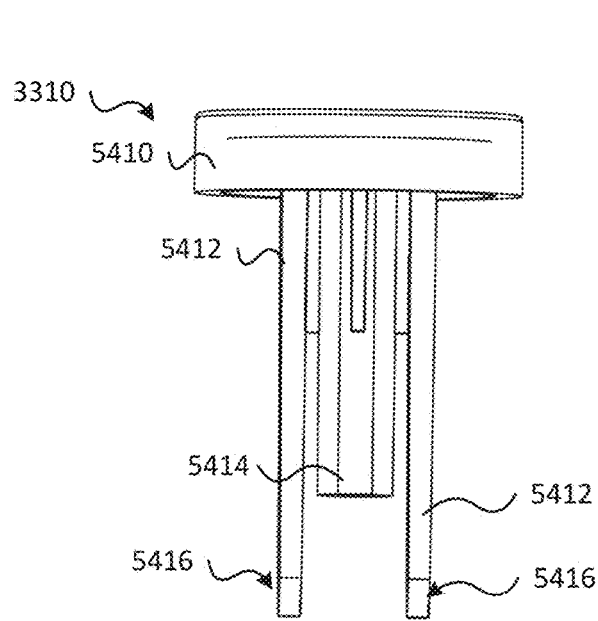
FIG. 54 is a front view illustrating aspects of a release button of an outdoor surface cleaning apparatus in accordance with certain embodiments of the present disclosure.
Figure 55:
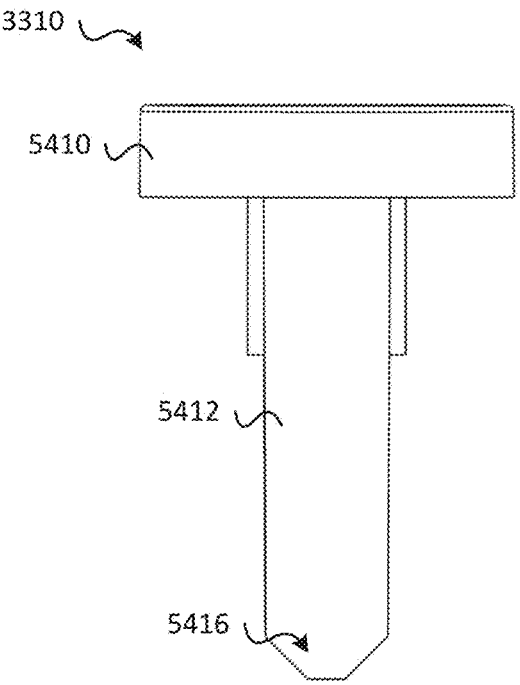
FIG. 55 is a side view illustrating aspects of a release button of an outdoor surface cleaning apparatus in accordance with certain embodiments of the present disclosure.
Figure 56:
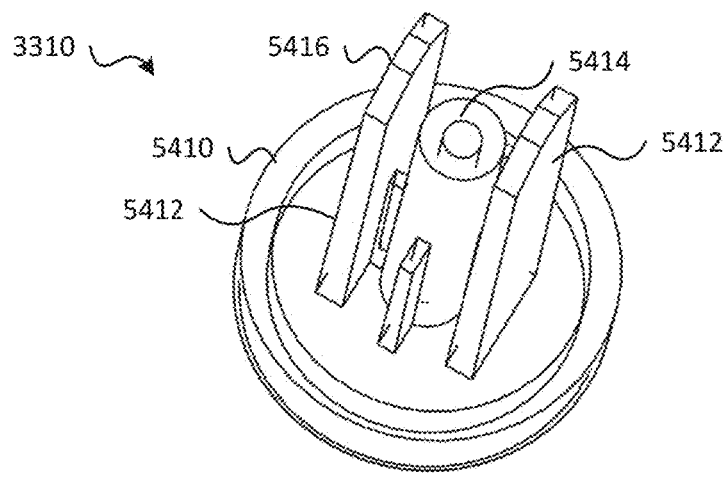
FIG. 56 is a perspective view illustrating aspects of a release button of an outdoor surface cleaning apparatus in accordance with certain embodiments of the present disclosure.

Referring to FIGS. 54-56, exemplary aspects of a release button in accordance with aspects of the present disclosure. In FIGS. 54-56, the release button 3310 of FIG. 33 is shown as including a cap 5410, tabs 5412, and a central support 5414. Each of the tabs 5412 may include an at least partially tapered portion 5416 (FIG. 55). As shown in FIG. 57B, the release button 3310 may be inserted into the axial locking member 4830 with the tapered portion 5416 of each tab 5412 being inserted first. Once inserted, the cap 5410 of the release button 3310 may rest flush with the end 5740 of the axial locking member 4830, as shown in FIG. 57D. Alternatively, the cap 5410 of the release button 3310 may be slightly raised (e.g., 1 mm, 2 mm, etc.) with respect to the end 5740 of the axial locking member 4830 or slightly depressed (e.g., 1 mm, 2 mm, etc.) with respect to the end 5740 of the axial locking member 4830.

As shown in FIG. 57C, once inserted, the tapered portions 5416 of the tabs 5412 may be disposed proximate an end 5742 of the axial locking member 4830. The end 5742 of the axial locking member 4830 may include a cavity 5750. Retention members 5752 may be disposed at peripheral edges of the cavity 5750 along a longitudinal axis of the cavity 5750. The retention members 5752 may be configured to retain a clamp. For example and as shown in FIGS. 58-60, a clamp 5800 may be provided. The clamp may include a base 5810 and a base 5820. Tapered ridges 5812 and 5814 may be disposed at opposing sides of the base 5810 and tapered ridges 5822 and 5824 may be disposed at opposing sides of the base 5820. As shown in the profile view of FIG. 59, the tapered ridges may form a valley 5902. A resilient member 5816 may be coupled with the base 5810 and a resilient member 5826 may be coupled with the base 5820. The resilient members 5816, 5826 may be configured to bias the clamp 5800 in a closed position shown in FIGS. 58-60. In an aspect, the resilient members 5816, 5826 may be leaf springs, as shown in FIGS. 58-62F. In additional or alternative aspects the resilient members 5816, 5826 may be other types of resilient structures, such as coils springs and the like. The base 5810 may include a recessed portion 6010 and the base 5820 may include a recessed portion 6020 (FIG. 60). The recessed portions 6010, 6020 may be curved as shown in FIGS. 58 and 60 or may have other form factors (e.g., square, triangular, rectangular, etc.).

When in the closed position shown in FIGS. 58 and 60, the recessed portions 6010, 6020 may define an opening

Figure 61:
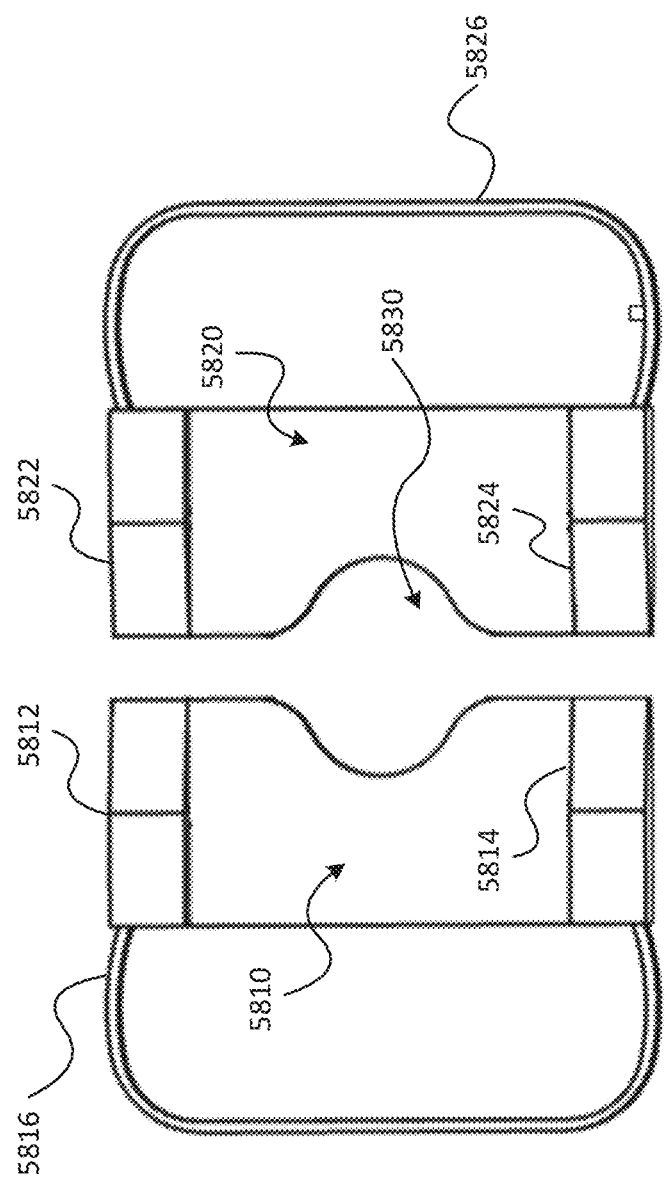
FIG. 61 is another top view illustrating aspects of a clamp of an outdoor surface cleaning apparatus in accordance with aspects of the present disclosure.
Figure 62B:
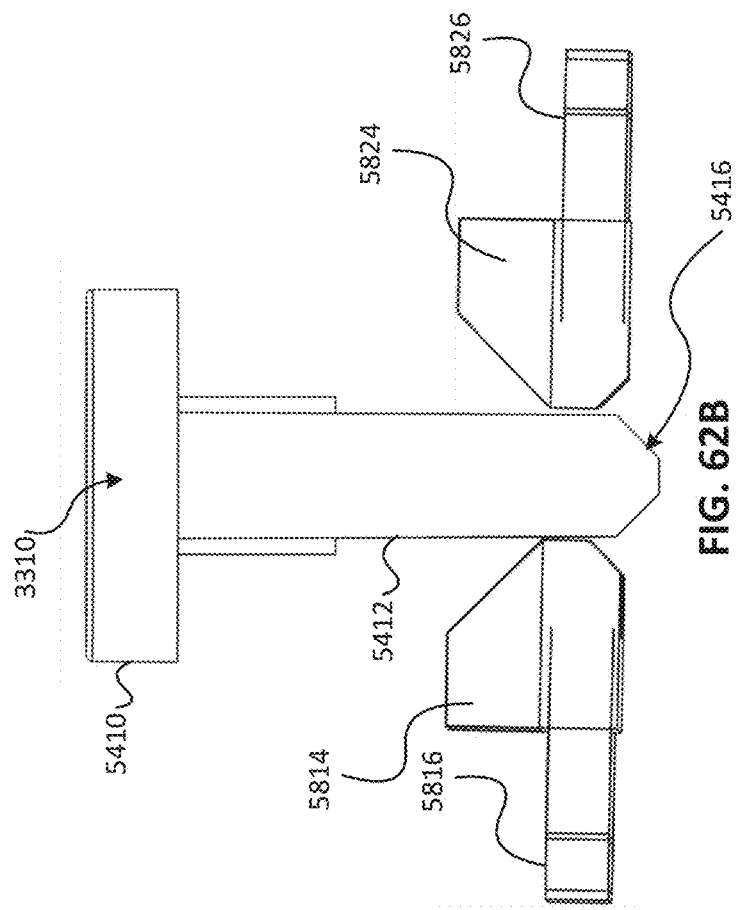
Figure 62A:
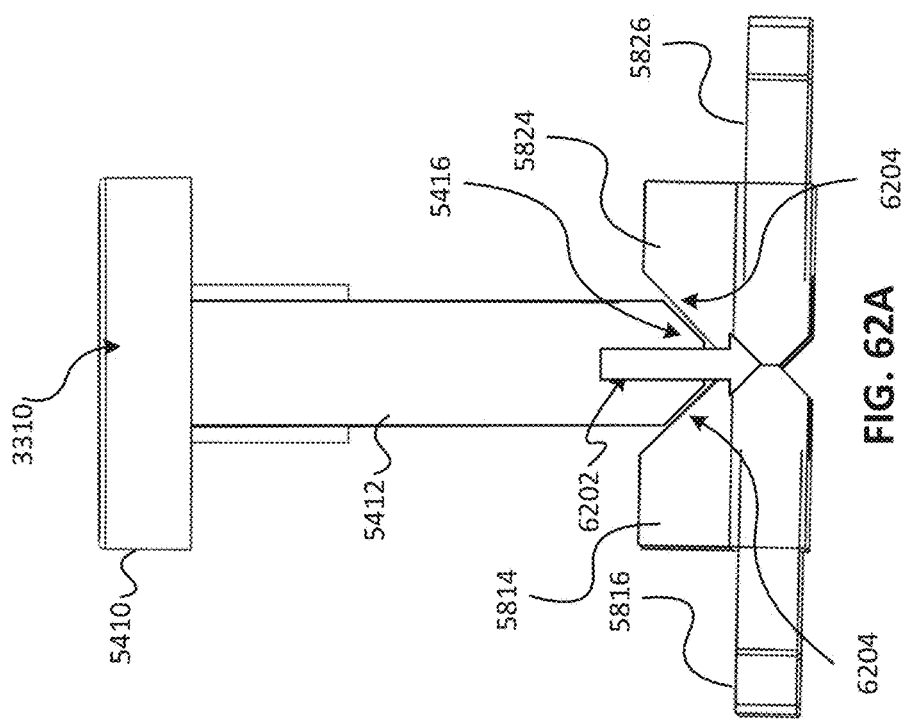

5830. The opening 5830 may be configured to allow the clamp 5800 to be closed around the annular groove 5120 of the output shaft 5920—however, the opening 5830 may be smaller than the conical end 5110 of the output shaft 5920 (e.g., the conical end 5110 may not pass through the opening 5830 unless the clamp 5800 is open). To allow the conical end 5110 to pass through the opening 5830, the clamp 5800 may be placed into an open position, as shown in FIG. 61. To open the clamp 5800, the release button 3310 may be depressed, as shown by arrow 6202 of FIG. 62A. For example, a user operating the outdoor cleaning device may press on the release button 3310 to provide the downward force. The downward force provided by the depression of the release button 3310 may cause the tapered portion 5416 of the tabs 5412 to travel into the valley 5902 defined by the opposing tapered ridges 5814, 5824 (and 5812, 5822). Upon contacting the angled surfaces 6204 of the tapered ridges 5814, 5824 (and the angled surface on the other side of the clamp), the tabs 5412 may slide downward along the angled surfaces 6204 and separate the base 5810 from the base 5820, as illustrated in FIG. 62B, placing the clamp 5800 into the open position. Once in the open position, the conical end 5110 of the output shaft 5920 may pass through the opening 5830 such that the annular groove 5112 is aligned within the opening 5830 and the conical end 5110 is positioned above the bases 5810, 5820, as shown in FIG. 62F.

Figure 62C:
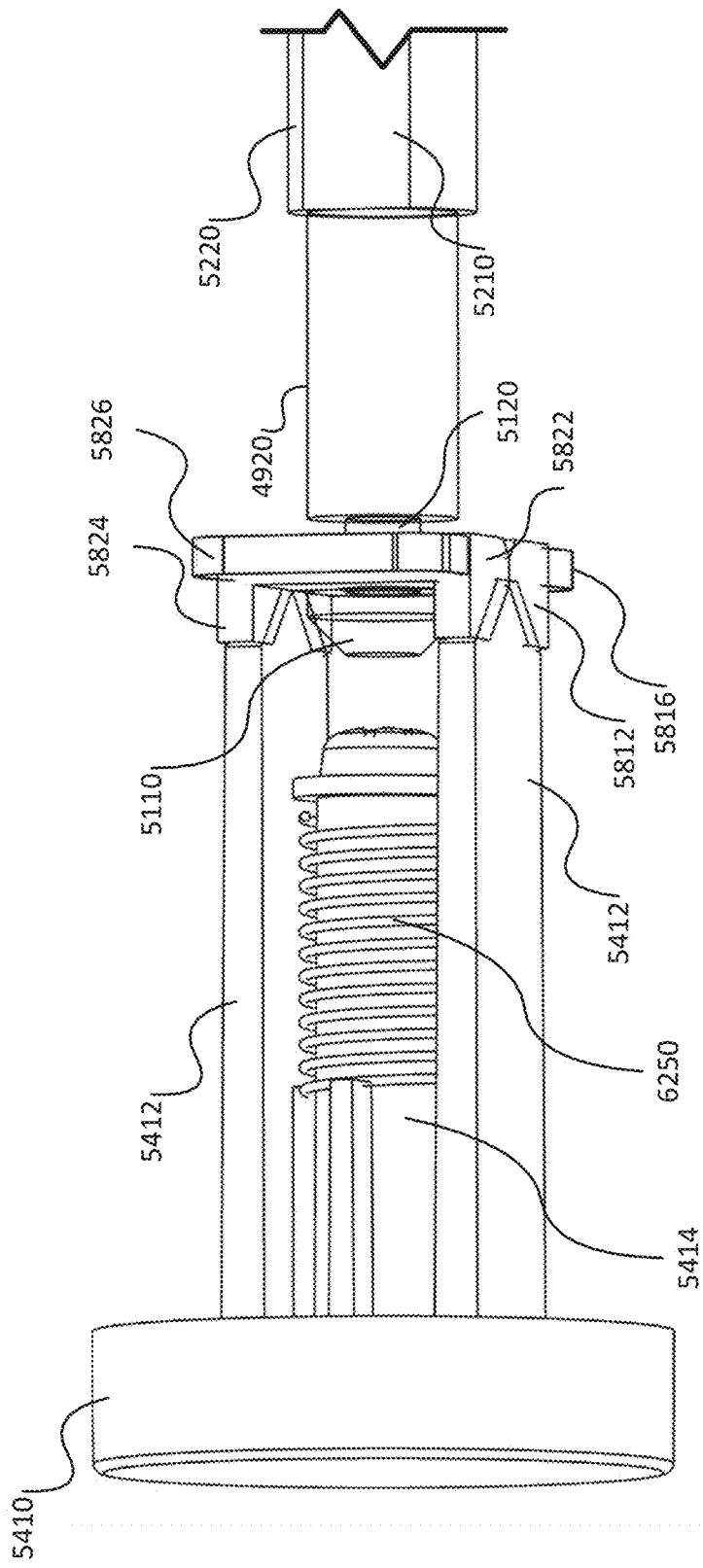

As the downward pressure on the release button 3310 is released the resilient members 5816, 5826 may bias the bases 3810, 3820 towards each other and into the closed position, thereby securing the annular groove 5112 within the opening 5830, as shown in FIGS. 62D-E. In an aspect, a resilient member 6250 may be positioned around central support 5414. The resilient member 6250 may be configured to bias the release button 3310 in a non-depressed position such that when the user stops pressing the release button 3310 the resilient member 6250 returns the release button 3310 to the non-depressed position shown in FIG. 62C. In an aspect, the resilient member 6250 may be a spring, as illustrated in FIG. 62C. In additional or alternative aspects the resilient member 6250 may not be a spring.

Figure 62G:
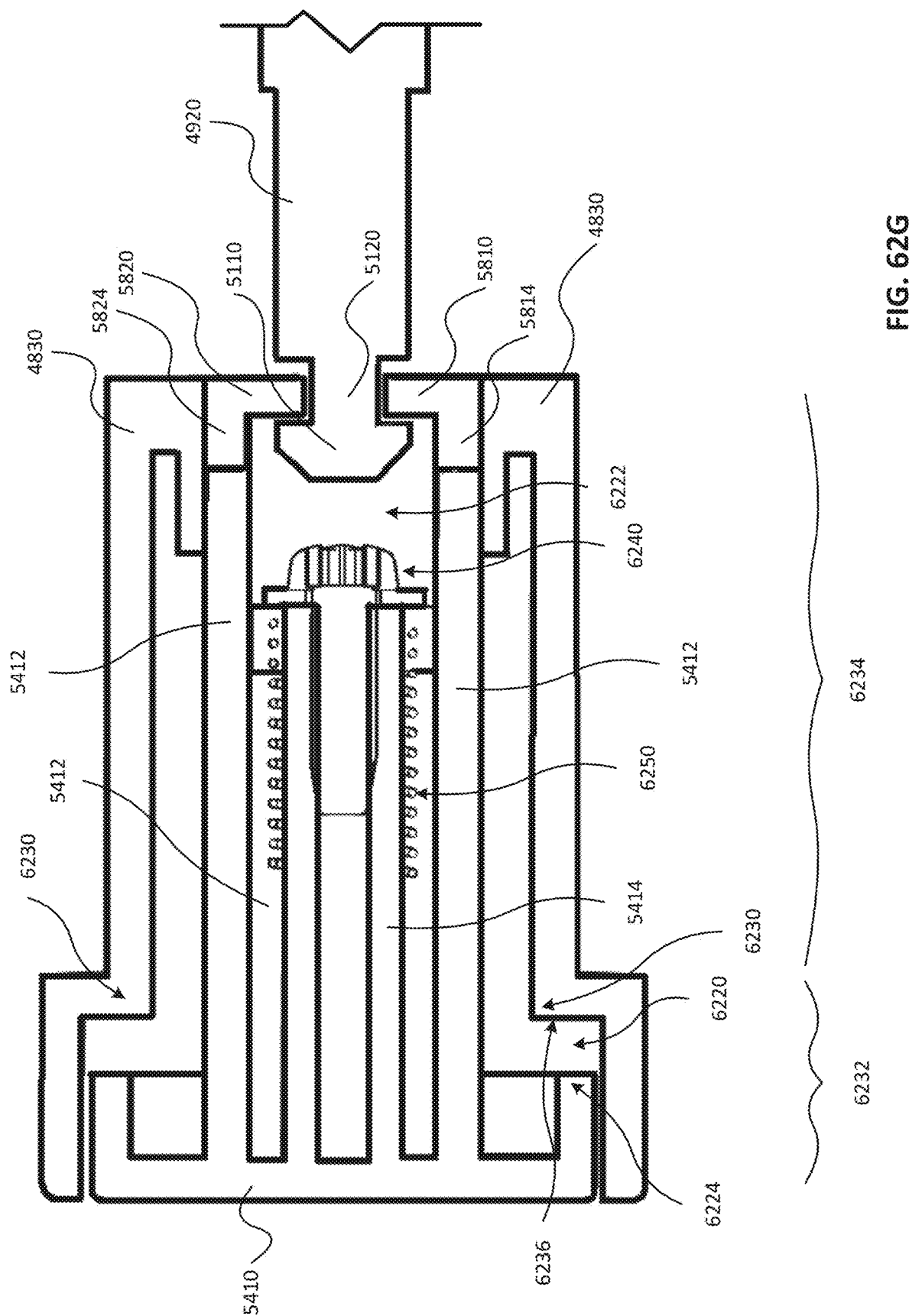

As illustrated in the cross-section view of FIG. 62G, a gap 6220 may exist between the release button 3310 and an elbow 6230 of the axial locking member 4830. The elbow 6230 may correspond to a point where a head 6232 of the axial locking member 4830 meets a shaft 6234 of the axial locking member 4830, as illustrated in the cross sectional view of FIG. 62G. Additionally, a gap 6222 may exist between a tip 6240 of the central support 5414 and the conical end 5110. When the release button 3310 is depressed, the resilient member 6250 may compress or deform, thereby allowing a lower surface of the cap 5410 to move toward an upper surface 6236 of the elbow 6230 and the tip 6240 of the central support 5414 to move toward the conical end 5110 of the output shaft 4920. Similarly, when the force used to depress the release button 3310 is withdrawn, the biasing force of the resilient member 6250 may cause the release button 3310 to move away from the upper surface 6236 of the elbow 6230 and the tip 6240 of the central support 5414 to move away from the conical end 5110 of the output shaft 4920, thereby returning the release button 3310 to its normal resting position in which the cap 5410 is separated from the elbow 6230 by the gap 6220 and the tip 6240 is separated from the conical end 5110 by the gap 6222. It is noted that the release button 3310 and the locking operations described with respect to FIGS. 62A-62G may be used to secure a side brush to one or both sides of the brush head as well as close off one or more ends of the axial locking members when the side brush(es) is not in use.

Referring to FIGS. 63A-63C, partial views illustrating exemplary aspects of a motor cover for an outdoor cleaning device in accordance with embodiments of the present disclosure are shown. In FIGS. 63A-63C, a motor cover 6310 is shown. The motor cover 6310 may be disposed proximate a middle of the guard cover 3150. As shown in FIGS. 63A, 63C, the motor cover may be configured to reside at least partially within a main body structure 3108. For example, the main body structure 3108 may overlap (as indicated by arrow 6320) an upper portion 6312 of the motor cover 6310. The overlap may prevent liquids splashed onto or otherwise present on the main body structure 3108 from entering the motor cover and potentially damaging the motor 4210. For example, due to the overlap, any liquids running down the external surface of the main body structure 3108 will fall from the main body structure 3108 and onto the external surface of the motor cover 6310 where it will then flow down to the guard cover 3150 and onto the ground. In aspects, the upper portion 6312 and a lower portion of the main body structure 3108 may have a tight fit to prevent the ingress of liquids into the motor cover 6310 and damaging the motor 4210. It is noted that the motor cover 6310 may be formed from a material such as rubber or silicone so that the motor cover 6310 may deform slightly to facilitate the tight fit accommodated by the opening at the lower portion of the main body structure 3108. The tight fit may further enhance the protection of the motor 4210 and other drive components from damage by liquids.

Figure 64:
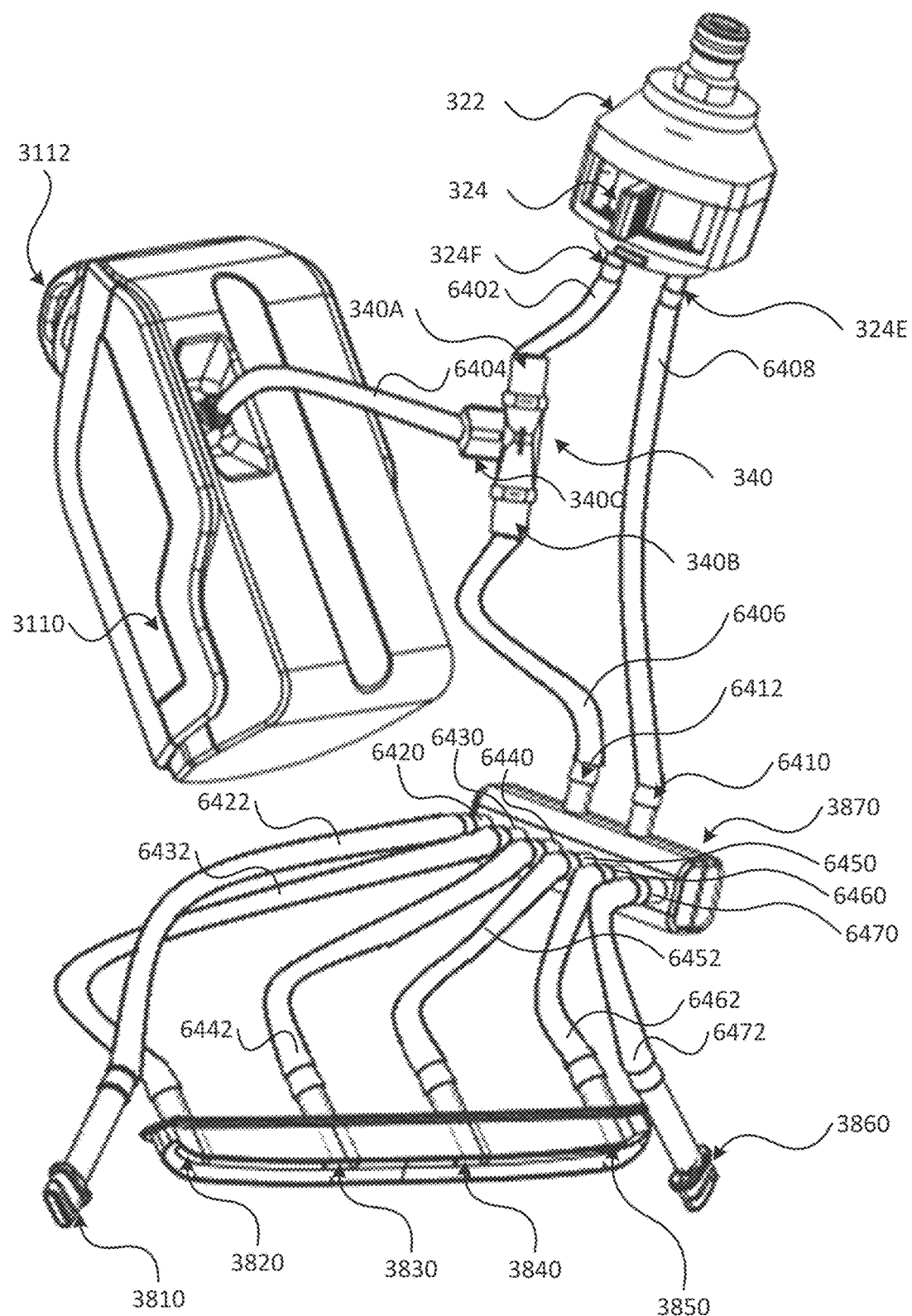
FIG. 64 is an image illustrating an exemplary configuration of a fluid distribution system of an outdoor surface cleaning apparatus in accordance with certain embodiments of the present disclosure.

Referring to FIG. 64, an image illustrating exemplary aspects of controlling the flow of liquids (e.g., mixed liquids and non-mixed liquids or no liquids) is shown. As illustrated in FIG. 64, the hose socket 322 may include outputs 324E, 324F, as described with reference to FIG. 22. The output 324F may be coupled to the input 340A of the mixing means (e.g., the venturi 340 of FIG. 22) via a tube 6402. The mixing means may include a detergent input 340C for receiving detergent from the fluid storage tank 3110 via tube 3404. An output 340B of the mixing means may be connected to an input 6412 of the fluid branching device 3870 via tube 6406 to deliver mixed fluids (e.g., detergent or cleaning solution mixed with water provided by a hose connected to the hose socket 322) to the fluid branching device 3870 and then to nozzles 3810, 3820, 3830, 3840, 3850, 3860. The fluid branching device 3870 may include outputs 6420, 6430, 6440, 6450, 6460, 6470. The output 6420 may be connected to the nozzle 3810 via a tube 6422, the output 6430 may be connected to the nozzle 3820 via a tube 6432, the output 6440 may be connected to the nozzle 3830 via a tube 6442, the output 6450 may be connected to the nozzle 3840 via a tube 6452, the output 6460 may be connected to the nozzle 3850 via a tube 6462, and the output 6470 may be connected to the nozzle 3860 via a tube 6472. The fluid branching device 3870 may improve uniform distribution of fluids among the nozzles and may ensure uniform spray pressure for fluids exiting the nozzles.

Additionally, the output 324E of the hose socket 322 may be connected to an input 6410 of the fluid branching device 3870 via tube 6408 to deliver non-mixed fluids to the nozzles 3810, 3820, 3830, 3840, 3850, 3860. As described above, the control panel 324 may also provide an option to not deliver any fluids to the fluid branching device 3870, thereby providing a dry mode of operation. It is noted that the tubes 6402, 6404, 6406, 6408, 6422, 6432, 6442, 6452, 6462, 6472 may be formed of a soft rubber or other material that enables the tubes to be flexible, which may help in routing the tubes within the outdoor cleaning devices of embodiments. It is also noted that the particular number of nozzles, tubes, and outputs of the fluid branching device 3870 shown in FIG. 64 have been provided for purposes of illustration, rather than by way of limitation and that outdoor cleaning device configured in accordance with embodiments of the present disclosure may include fewer nozzles (e.g., at least one nozzle, 2 nozzles, 3 nozzles, 4 nozzles, 5 nozzles) or more nozzles (e.g., 6 or more nozzles) than are illustrated in FIG. 64 and that the fluid branching device 3870 may include an appropriate number of outputs to deliver fluids to each nozzle.

Figure 68:
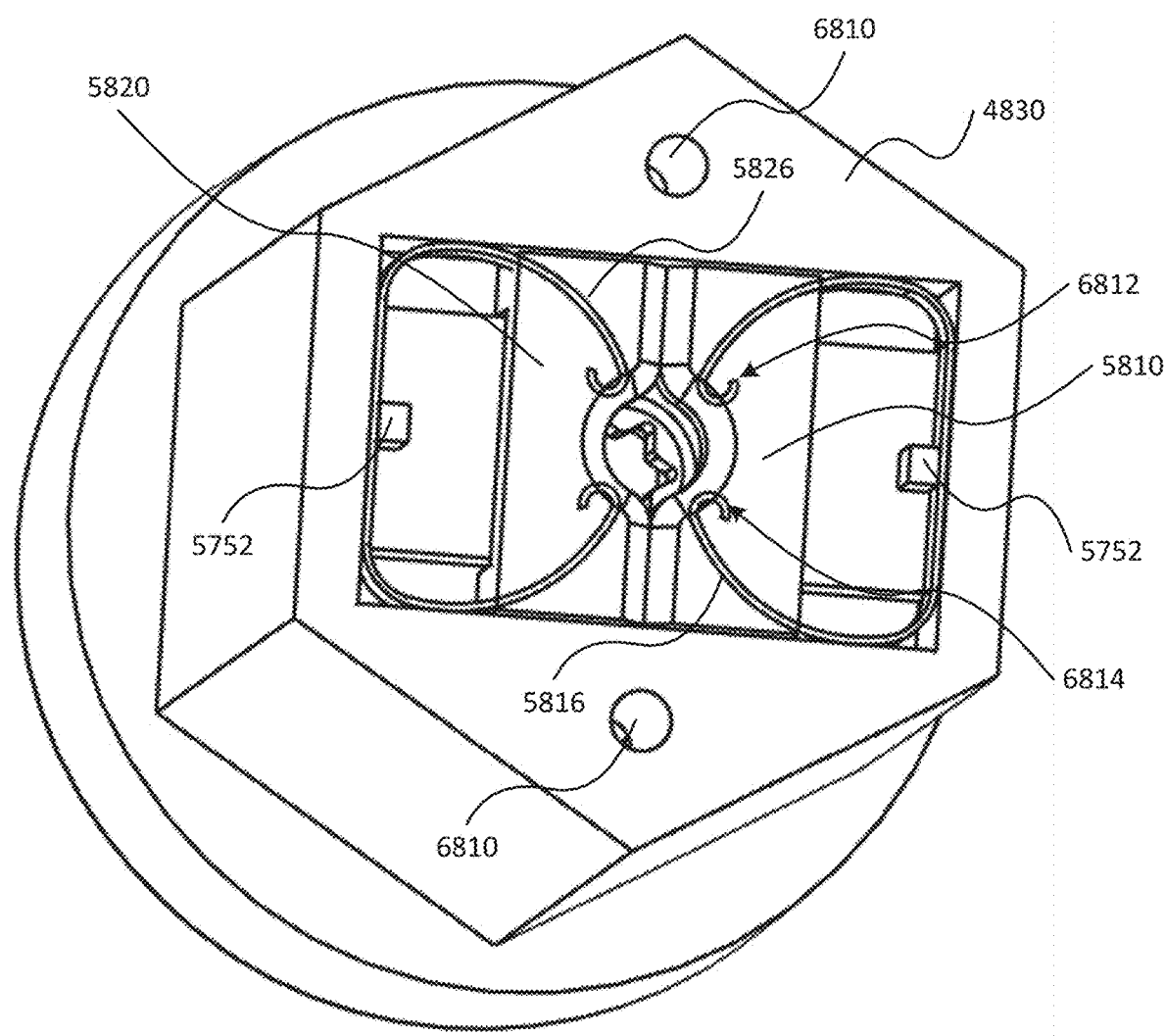
FIG. 68 is a perspective view illustrating an exemplary mechanism for securing a clamp within a brush head of an outdoor cleaning device in accordance with certain embodiments of the present disclosure.

Referring to FIG. 68, a diagram illustrating aspects of securing a clamp to an axial locking member of an outdoor cleaning device in accordance with embodiments of the present disclosure is shown. As described above, the axial locking member 4830 may include a cavity 5750 and one or more retention members 5752 may be disposed within the cavity 5750. The clamp 5800 may be inserted into the cavity 5750 such that the retention members 5752 are disposed between an interior surface of the resilient members 5816 and 5826 (i.e., the retention members 5752 are between the resilient members 5826, 5826 and the bases 5810, 5820). A portion of the resilient members 5816, 5826 may be disposed within a cavity of the bases 5810, 5820. The portions of the resilient members 5816, 5826 within the cavity may include curved ends, such as curved ends 6812, 6814. As the bases 5810, 5820 of the clamp 5800 are separated, as described above, the resilient member 5826 may remain between the retention member 5752 and the interior wall of the cavity 5750. The pressure applied to the resilient members 5816, 5826 by the bases 5810, 5820 may cause the resilient members to deform or flex internal to the cavity of the bases 5810, 5820. For example, the curved ends 6812, 6814 may slide across the cavity of the base 5820 such that the curved end 6812 slides towards the curved end 6814 and vice versa. The sliding of the curved ends 6812, 6814 (and the curved ends of the resilient member 5816) towards each other may enable the bases 5810, 5820 to become separated. In an aspect, the recessed portions 6010, 6020 may form a convex surface on an interior of the cavities of the bases 5810, 5820. The convex surface may enable the curved ends of the resilient members 5816, 5826 to slide towards each other more easily. Additionally, it is noted that the curved ends may come into contact with each other as they slide. If this occurs the curved ends may then be turned towards the retention members 5752 as the bases 5810, 5820 are separated. As the pressure applied to the release button 3310 releases, the resilient members 5816, 5826 may return to their normal resting position as the curved ends of the resilient members 5816, 5826 move away from each other, thereby providing a biasing force that urges the bases 5810, 5820 towards each other and causing the clamp 5800 to close. In an aspect, a base (not shown in FIG. 68) may be placed over the clamp 5800 and secured to the axial locking member 4830 via screws, which may be secured within screw holes 6810 located at the end 5742 of the axial locking member 4830. It is noted that FIG. 68 is described as using screws and screw holes 6810 to secure the base to the axial locking member 4830 and retain the clamp 5800 within the cavity 5750, in some embodiments other mechanisms may be used, such as pins or rods.

It is noted that the various embodiments of outdoor cleaning devices in accordance with the present disclosure, as described and illustrated with respect to FIGS. 1-68 are intended to be complimentary to one another, rather than limiting. For example, aspects of the outdoor cleaning devices illustrated with reference to FIGS. 1-29 may incorporate one or more of the features illustrated with respect to FIGS. 30-68, such as the release buttons and locking members, the use of tubes and fluid branching devices to connect nozzles to fluid sources, and the like. Thus, it is to be understood that features described with respect to any individual drawing may be incorporated into embodiments illustrated in other drawings if desired. For example, tubing similar to the tubing shown in FIG. 64 for establishing fluid communication to the plurality of nozzles may be used to establish fluid communication to nozzles of other embodiments illustrated in other drawings, which may include a different number of nozzles than shown in FIG. 64.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A cleaning device comprising:
   a first handle;
   a longitudinal shaft, the first handle attached to a first end of the longitudinal shaft;
   a brush head disposed at a second end of the longitudinal shaft opposite the first handle;

a driving means for providing a rotation force to a roller brush of the brush head;
an activation means for controlling activation of the driving means, wherein the activation means is integrated with the first handle;
at least one side brush removably coupled to a longitudinal end of the roller brush; and
a main body comprising:
a hose configured to transport a first fluid;
a hose socket configured to detachably couple to the hose;
a fluid tank positioned on the main body, the fluid tank adapted to store a volume of a second fluid;
a mixing means for mixing the first fluid with a second fluid stored in the fluid tank;
at least one nozzle in fluid communication with the hose and the fluid tank, wherein the at least one nozzle is configured to spray fluid onto a surface; and
a battery configured to provide operational power to the driving means in response to activation of the activation means, wherein the battery is situated in a lower portion of the main body and a weight of the battery provides a downward force on the roller brush, wherein the downward force provided by the battery enhances a cleaning capability of the brush head.

2. The cleaning device of claim 1, wherein the fluid tank is positioned proximate the battery such that a weight of the fluid tank provides an additional downward force on the roller brush, wherein the additional downward force provided by the fluid tank enhances the cleaning capability of the roller brush.

3. The cleaning device of claim 2, wherein the fluid tank is positioned on the main body immediately above a battery compartment configured to house the battery.

4. The cleaning device of claim 3, further comprising:
a battery cover covering the battery compartment; and
a locking mechanism configured to interface with the battery cover to lock the battery cover in a closed position.

5. The cleaning device of claim 1, further comprising:
a guard at least partially surrounding the brush head; and
a squeegee attached to a portion of the guard and configured to drag on a top of the surface.

6. The cleaning device of claim 5, wherein the at least one nozzle is retained within the guard at least partially via grooves disposed on a peripheral edge of an outer portion of the guard and an inner portion of the guard.

7. The cleaning device of claim 1, wherein the fluid tank is disposed on a same side of the main body as the battery.

8. The cleaning device of claim 1, wherein the fluid tank is disposed on an opposite side of the main body as the battery.

9. The cleaning device of claim 1, wherein the driving means comprises a motor, a transmission, and a driveshaft configured to transfer a driving force generated by the motor to the transmission, and wherein the transmission is configured to translate the driving force to the rotational force.

10. The cleaning device of claim 9, wherein the transmission comprises a gear chain, wherein the motor is disposed a threshold distance from the roller brush, and wherein the gear chain includes a plurality of gears, the plurality of gears spanning at least the threshold distance.

11. The cleaning device of claim 10, wherein the threshold distance is configured to mitigate damage to the motor by backsplash of the fluid sprayed by the at least one nozzle as the fluid is swept by the roller brush.

12. The cleaning device of claim 9, wherein the transmission comprises at least one gear and a shaft, wherein the motor is disposed a threshold distance from the roller brush, and wherein the shaft has a length spanning at least the threshold distance.

13. The cleaning device of claim 12, wherein the threshold distance is configured to mitigate damage to the motor by backsplash of the fluid sprayed by the at least one nozzle as the fluid is swept by the roller brush.

14. The cleaning device of claim 1, wherein the at least one side brush is removably coupled to a receptacle located at the longitudinal end of the roller brush.

15. The cleaning device of claim 1, further comprising an attaching means configured to secure the at least one side brush to the longitudinal end of the roller brush.

16. The cleaning device of claim 15, wherein the attaching means comprises a release button, a clamp, and an output shaft comprising a conical end and an annular groove, the release button comprising a cap configured to cover a receptacle located at the longitudinal end of the roller brush.

17. The cleaning device of claim 1, wherein the at least one side brush comprises:
a plate;
a plurality of bristles disposed on a first side of the plate and extending outward from the plate; and
a rod having a form factor compatible with a receptacle located at the longitudinal end of the roller brush, wherein the rod is disposed on a second side of the plate opposite the first side of the plate, and wherein the rod extends perpendicularly from the second side of plate.

18. The cleaning device of claim 17, wherein the form factor comprises a hexagonal rod adapted to be inserted into the receptacle.

19. The cleaning device of claim 1, further comprising a mixing controller configured to selectively control dispensing of the fluid by the at least one nozzle, wherein selective control of the dispensing of fluids comprises controlling dispensing of a mixed fluid via mixing of the first fluid and the second fluid, dispensing the first fluid only, or dispensing no fluid.

20. The cleaning device of claim 1, wherein a volume of the fluid tank corresponds to a battery life of the battery such that the cleaning device is operable to dispense a mixture of the first fluid and the second fluid continuously until the fluid tank is empty.

* * * * *